US008274929B2

(12) United States Patent
Schmidt et al.

(10) Patent No.: US 8,274,929 B2
(45) Date of Patent: Sep. 25, 2012

(54) ENTERPRISE MOBILE NETWORK FOR PROVIDING CELLULAR WIRELESS SERVICE USING LICENSED RADIO FREQUENCY SPECTRUM AND THE SESSION INITIATION PROTOCOL

(75) Inventors: Robert D. Schmidt, Redwood City, CA (US); Rahul Jain, Redwood City, CA (US); Mark F. Schutzer, Redwood City, CA (US); Lance K. Uyehara, San Jose, CA (US); Gilad Peleg, Sunnyvale, CA (US); John O'Connell, Los Altos Hills, CA (US); Ilan Vardi, San Diego, CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 729 days.

(21) Appl. No.: 12/367,458

(22) Filed: Feb. 6, 2009

(65) Prior Publication Data

US 2010/0014494 A1      Jan. 21, 2010

Related U.S. Application Data

(60) Provisional application No. 61/027,363, filed on Feb. 8, 2008.

(51) Int. Cl.
*H04W 4/00* (2009.01)
(52) U.S. Cl. ........... 370/328; 370/352; 455/562.1; 455/410
(58) Field of Classification Search ................... 370/465, 370/353, 352, 328; 455/562.1, 410; 709/204
See application file for complete search history.

(56) References Cited

U.S. PATENT DOCUMENTS

| | | |
|---|---|---|
| 4,183,054 A | 1/1980 | Patisaul et al. |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |

(Continued)

FOREIGN PATENT DOCUMENTS

EP          0391597          10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

Primary Examiner — Albert T Chou
(74) Attorney, Agent, or Firm — Fogg & Powers LLC

(57) ABSTRACT

Support for Session Initiation Protocol (SIP) devices is provided in an enterprise mobile network that provides wireless service within a coverage area associated with an enterprise using licensed radio frequency spectrum. In various embodiments, support SIP devices is provided by, for example, incorporating SIP user agent in a mobile switching subsystem or in a base station subsystem or by incorporating SIP server functionality into a mobile switching subsystem.

29 Claims, 36 Drawing Sheets

U.S. PATENT DOCUMENTS

| | | | |
|---|---|---|---|
| 5,577,029 A | 11/1996 | Lu et al. | |
| 5,682,256 A | 10/1997 | Motley et al. | |
| 5,734,699 A | 3/1998 | Lu et al. | |
| 5,734,979 A | 3/1998 | Lu et al. | |
| 5,761,195 A | 6/1998 | Lu et al. | |
| 5,781,582 A | 7/1998 | Sage et al. | |
| 5,818,824 A | 10/1998 | Lu et al. | |
| 5,842,138 A | 11/1998 | Lu et al. | |
| 5,887,256 A | 3/1999 | Lu et al. | |
| 5,953,651 A | 9/1999 | Lu et al. | |
| 5,995,843 A | 11/1999 | Sjodin et al. | |
| 5,999,813 A | 12/1999 | Lu et al. | |
| 6,070,071 A | 5/2000 | Chavez et al. | |
| 6,078,823 A | 6/2000 | Chavez et al. | |
| 6,081,716 A | 6/2000 | Lu | |
| 6,101,400 A | 8/2000 | Ogaz et al. | |
| 6,169,907 B1 | 1/2001 | Chang et al. | |
| 6,173,177 B1 | 1/2001 | Lu et al. | |
| 6,195,545 B1 | 2/2001 | Baker et al. | |
| 6,212,395 B1 | 4/2001 | Lu et al. | |
| 6,381,463 B1 | 4/2002 | Tu et al. | |
| 6,405,048 B1 | 6/2002 | Haartsen | |
| 6,535,732 B1 | 3/2003 | McIntosh et al. | |
| 6,539,237 B1 | 3/2003 | Sayers et al. | |
| 6,542,754 B1 | 4/2003 | Sayers et al. | |
| 6,549,772 B1 | 4/2003 | Chavez et al. | |
| 6,556,811 B1 | 4/2003 | Sayers et al. | |
| 6,580,924 B1 | 6/2003 | Lu et al. | |
| 6,640,108 B2 | 10/2003 | Lu et al. | |
| 6,658,259 B2 | 12/2003 | McIntosh | |
| 6,687,243 B1 | 2/2004 | Sayers et al. | |
| 6,694,134 B1 | 2/2004 | Lu et al. | |
| 6,729,929 B1 | 5/2004 | Sayers et al. | |
| 6,754,871 B1 | 6/2004 | Pines et al. | |
| 6,801,788 B1 | 10/2004 | Csapo et al. | |
| 6,807,431 B2 | 10/2004 | Sayers et al. | |
| 6,829,477 B1 | 12/2004 | Lu et al. | |
| 6,847,653 B1 | 1/2005 | Smiroldo | |
| 6,862,082 B1 | 3/2005 | Xu et al. | |
| 6,879,568 B1 | 4/2005 | Xu et al. | |
| 6,901,116 B1 | 5/2005 | Pines et al. | |
| 6,954,654 B2 | 10/2005 | Ejzak | |
| 6,961,323 B1 | 11/2005 | Xu et al. | |
| 6,975,877 B1 | 12/2005 | Dergun et al. | |
| 6,993,359 B1 | 1/2006 | Nelakanti et al. | |
| 7,200,398 B1 | 4/2007 | Xu et al. | |
| 7,231,579 B1 | 6/2007 | Pines et al. | |
| 7,260,078 B1 | 8/2007 | Ledsham et al. | |
| 7,330,710 B1 | 2/2008 | Xu et al. | |
| 7,469,142 B2 | 12/2008 | Nelakanti et al. | |
| 7,486,966 B2 | 2/2009 | Sayers et al. | |
| 7,496,103 B1 | 2/2009 | Sayers et al. | |
| 2002/0131387 A1 | 9/2002 | Pitcher | |
| 2003/0171119 A1 | 9/2003 | McIntosh | |
| 2004/0204097 A1 | 10/2004 | Scheinert et al. | |
| 2005/0068943 A1 | 3/2005 | Scheinert | |
| 2005/0088999 A1 | 4/2005 | Waylett et al. | |
| 2005/0148368 A1 | 7/2005 | Scheinert et al. | |
| 2006/0025140 A1 | 2/2006 | Bales et al. | |
| 2006/0025147 A1* | 2/2006 | Gallagher et al. | 455/446 |
| 2006/0071785 A1 | 4/2006 | Ahmed | |
| 2006/0251113 A1* | 11/2006 | Jagadeesan et al. | 370/465 |
| 2006/0268900 A1 | 11/2006 | Larsson et al. | |
| 2007/0054668 A1 | 3/2007 | Scheinert et al. | |
| 2007/0097939 A1 | 5/2007 | Nylander et al. | |
| 2007/0140246 A1 | 6/2007 | Rajagopalan | |
| 2007/0177577 A1 | 8/2007 | Kolor et al. | |
| 2007/0208807 A1* | 9/2007 | Jagannathan et al. | 709/204 |
| 2007/0298765 A1* | 12/2007 | Dickinson et al. | 455/410 |
| 2008/0005806 A1 | 1/2008 | Alve | |
| 2008/0026726 A1 | 1/2008 | Tariq et al. | |
| 2008/0057950 A1 | 3/2008 | Hayakawa | |
| 2008/0058018 A1* | 3/2008 | Scheinert | 455/562.1 |
| 2009/0028063 A1 | 1/2009 | Change et al. | |
| 2009/0061939 A1 | 3/2009 | Andersson | |
| 2009/0285200 A1* | 11/2009 | Dekeyser et al. | 370/352 |

FOREIGN PATENT DOCUMENTS

| | | |
|---|---|---|
| JP | 08172673 | 7/1986 |
| JP | 2000312261 | 11/2000 |
| KR | 1020000008193 | 2/2000 |
| KR | 1020030063063 | 7/2003 |
| KR | 1020070025207 | 3/2007 |
| WO | 9115927 | 10/1991 |
| WO | 9823116 | 5/1998 |
| WO | 0042801 | 7/2000 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

Cao et al., "Performance and Capacity Analysis for Downlink Pico-Cellular Distributed Antenna Systems With Transmit Antenna Selection", "2007 International Symposium on Intelligent Signal Processing and Communication Systems", Dec. 1, 2007, pp. 240-243, Publisher: IEEE Xplore.

* cited by examiner

ENTERPRISE MOBILE NETWORK FOR PROVIDING CELLULAR WIRELESS SERVICE USING LICENSED RADIO FREQUENCY SPECTRUM AND THE SESSION INITIATION PROTOCOL

CROSS-REFERENCE TO RELATED APPLICATION

This application claims the benefit of U.S. Provisional Patent Application Ser. No. 61/027,363, filed on Feb. 8, 2008, which is hereby incorporated herein by reference.

This application is related to the following patent applications:

U.S. patent application Ser. No. 12/367,449, filed on even date herewith, entitled "MULTIPLE-TRX PICO BASE STATION FOR PROVIDING IMPROVED WIRELESS CAPACITY AND COVERAGE IN A BUILDING", which is hereby incorporated herein by reference;

U.S. patent application Ser. No. 12/367,451, filed on even date herewith, entitled "AN ENTERPRISE MOBILE NETWORK FOR PROVIDING CELLULAR WIRELESS SERVICE USING LICENSED RADIO FREQUENCY SPECTRUM AND INTERNET PROTOCOL BACKHAUL", which is hereby incorporated herein by reference; and U.S. patent application Ser. No. 12/367,454, filed on even date herewith, entitled "AN ENTERPRISE MOBILE NETWORK FOR PROVIDING CELLULAR WIRELESS SERVICE USING LICENSED RADIO FREQUENCY SPECTRUM AND SUPPORTING MULTIPLE-DEVICE RING FOR INCOMING CALLS", which is hereby incorporated herein by reference.

BACKGROUND

In conventional wireless cellular networks, the initial rollout typically involves installation of macro base stations to provide wireless cellular coverage for mobile units. A macro base station comprises multiple transceiver units, outputs relatively high power (that is, 10 watts or more) to its antenna(s) and is communicatively coupled to a telephone network via a backhaul connection. The backhaul connection includes a T1 connection (in the United States) or an E1 connection (in Europe) to a base station controller (BSC) which is, in turn, connected to a mobile switching center (MSC), and external telephone network. Because macro base stations output high power, they can provide large areas of coverage.

The capacity of a macro base station can be expanded to a limited degree by the addition of transceivers and antennas to the macro base station. Additional macro base stations can also be added to the cellular network. However, these measures have limitations due to interference among macro base stations as a result of their large coverage areas and high output power.

A solution to this capacity problem has been to add micro or pico base stations to the cellular network. Like a macro base station, a micro base station comprises multiple transceiver units and is communicatively coupled to a telephone network via a backhaul connection to the BSC and MSC. However, compared to the output power of a macro base station, a micro base station outputs relatively lower power (that is, in the range of 1-2 watts) to its antenna(s). A conventional pico base station is also typically communicatively coupled to a telephone network via a backhaul connection, but comprises only a single transceiver unit and typically uses an Internet protocol (IP) backhaul connection in which voice signals are converted to IP packets. A conventional pico base station also outputs even lower power (that is, less than one watt) to its antenna. Pico base stations can be located indoors, such as in offices, shopping centers, convention centers, and airports. In addition to having lower output power levels, micro and pico base stations for Code Division Multiple Access (CDMA) and broadband wireless protocols also support lower capacity levels than macro base stations due to their reduced processing power.

A drawback to this approach for adding capacity to the network is that the micro or pico base stations are located at sites where the additional capacity is needed and therefore require additional infrastructure for each site. Furthermore, they are not easily accessible for maintenance or upgrades. Also, because an additional backhaul link is required for each micro or pico base station, the backhaul links tend to increase installation and maintenance expense. Moreover, the coverage provided by the pico base stations is typically limited and often problematic in indoor deployments due to walls and building configuration.

Another issue with covering a large area with pico cells is that capacity demand is often dynamic with respect to location and loading. As users move about an area the capacity demands will shift to different locations. Network designers must often provision excess capacity, which can cause many pico cell resources to go underutilized. Also, for broader band technologies such as Universal Mobile Telecommunications System (UMTS), Worldwide Interoperability for Microwave Access (WiMAX) and Long Term Evolution (LTE) technologies, scattering multiple pico cells with lower output power and capacity to cover larger areas is inefficient due to the co-channel interference created by neighboring cells. Trunking gain can be achieved by distributing a higher level of capacity over the entire coverage area rather than individually deploying slices of the capacity at various points in the entire coverage area.

SUMMARY

One embodiment is directed to an enterprise mobile network for providing wireless service within a coverage area associated with an enterprise using licensed radio frequency spectrum. The enterprise mobile network comprises a base station subsystem (BSS) deployed on a premises of the enterprise to provide wireless capacity within the coverage area using the licensed radio frequency spectrum and a mobile switching subsystem (MSS) communicatively coupled to a public land mobile network. The BSS is communicatively coupled to the MSS using an Internet Protocol (IP) network. The MSS is configured to implement at least some networking switching subsystem (NSS) functions for local subscribers of the enterprise mobile network. The MSS comprises a Session Initiation Protocol (SIP) user agent to communicate with at least one SIP server. The SIP user agent is configured to function as a first SIP client when communicating with the SIP server. The MSS is configured to use the SIP user agent to establish a communication session between a mobile device that wirelessly communicates with the BSS using the licensed radio frequency spectrum and a second SIP client coupled to the SIP server.

Another embodiment is directed to a mobile switching subsystem (MSS) for use with a base station subsystem (BSS) deployed on a premises of an enterprise to provide wireless service within a coverage area associated with the enterprise using licensed radio frequency spectrum as a part of an enterprise mobile network. The MSS comprises at least some networking switching subsystem (NSS) functions for local subscribers of the enterprise mobile network and a Session Initiation Protocol (SIP) user agent to communicate with at least one SIP server. The SIP user agent is configured to function as a first SIP client when communicating with the SIP server. The MSS is configured to use the SIP user agent to establish a communication session between a mobile device that wirelessly communicates with the BSS using the licensed radio frequency spectrum and a second SIP client coupled to the SIP server.

Another embodiment is directed to an enterprise mobile network for providing wireless service within a coverage area associated with an enterprise using licensed radio frequency spectrum. The enterprise mobile network comprises a base station subsystem (BSS) deployed on a premises of the enterprise to provide wireless capacity within the coverage area using the licensed radio frequency spectrum. The BSS comprises a Session Initiation Protocol (SIP) user agent to communicate with at least one SIP server. The SIP user agent is configured to function as a first SIP client when communicating with the SIP server. The BSS is configured to use the SIP user agent to establish a communication session between a mobile device that wirelessly communicates with the BSS using the licensed radio frequency spectrum and a second SIP client coupled to the SIP server.

Another embodiment is directed to a mobile switching subsystem (MSS) for use with a base station subsystem (BSS) deployed on a premises of an enterprise to provide wireless service within a coverage area associated with the enterprise using licensed radio frequency spectrum as a part of an enterprise mobile network. The MSS comprises switching functionality that comprises a Session Initiation Protocol (SIP) proxy function, a SIP redirect function, and a SIP register function, a visitor location register (VLR) function that comprises a SIP location function, and a home location register (HLR) that is configured to store SIP profiles.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
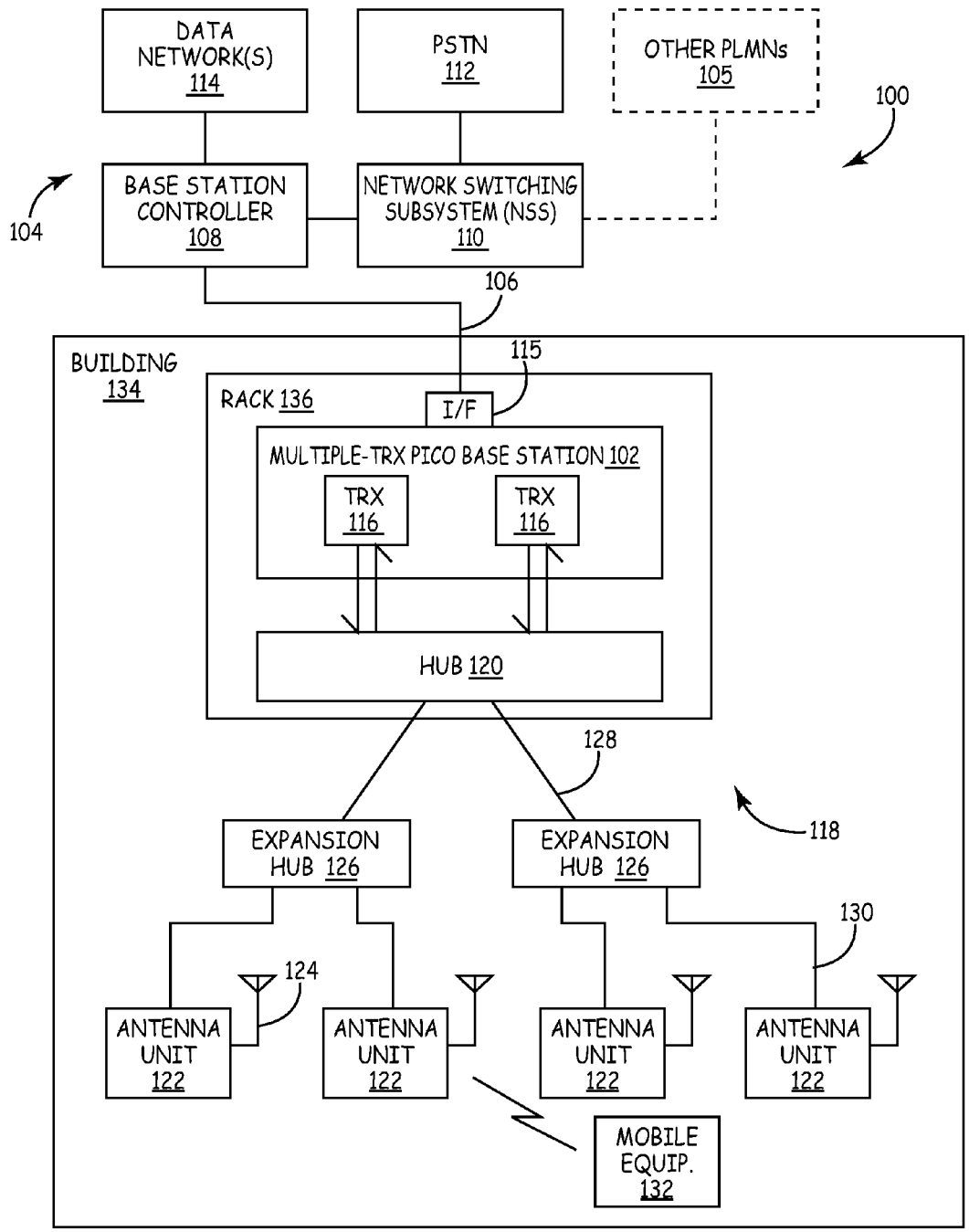
FIG. 1 illustrates one embodiment of a system for providing improved wireless capacity and coverage in a building.

FIG. 1 illustrates one embodiment of a system 100 for providing improved wireless capacity and coverage in a building 134. In the particular embodiment shown in FIG. 1, the system 100 comprises a multiple-TRX pico base station 102 that is communicatively coupled to a public land mobile network (PLMN) 104 via a backhaul link 106. Within the network 104, the backhaul link 106 is coupled to a base station controller (BSC) 108, which is, in turn, coupled to a network switching subsystem (NSS) 110. The NSS 110 is coupled to a public switched telephone network (PSTN) 112 (e.g., for voice communications) and to other public land mobile networks 105. Also, the BSC 108 is communicatively coupled to one or more data nodes (for example, a Serving GPRS Support Node (SGSN)) for communicatively coupling the BSC 108 (and the multiple-TRX pico base station 102) to one or more data networks 114 such as the Internet (e.g., for data communications). Although the terms BTS, BSC, and BSS are used throughout the following description, it is to be understood that the concepts described here can also be applied to embodiments that make use of network elements that are referred to using other terms, such as Node B, eNB, RNC, and radio access network (RAN) that are more frequently associated with 3G and 4G networks.

The BSC 108 performs various conventional BSC functions including radio channel allocation, call handovers among base stations, configuring the multiple-TRX pico base station 102, handling alarms and performing network management functions. The BSC 108 includes or is communicatively coupled to an appropriate network element (for example, a packet control unit (PCU)) for directing traffic to and from the data network 114.

The NSS 110 performs various conventional functions including circuit switching, and providing applications and call features to mobile subscribers, such as call ringing and roaming. For example, the NSS 110 typically includes a mobile switching center (MSC) and other functionality such as a home location register (HLR) and visitor location register (VLR). In one embodiment, certain of the features conventionally performed by the BSC 108 and NSS 110 may instead be performed by the multiple-TRX pico base station 102. For example, the multiple-TRX pico base station 102 may include a local server which is configured with a Linux (or other) operating system to implement these functions.

The multiple-TRX pico base station 102 comprises multiple transceiver units (TRXs) 116. In one implementation, the multiple-TRX pico base station 102 comprises two TRXs 116. However, it is to be understood that a greater number of TRXs can be included in the multiple-TRX pico base station 102 (for example, 4 TRXs). Each of the TRXs 116 is used to output a low power (specifically, less than one watt) RF channel. In one implementation, the multiple TRXs 116 are implemented as a multi-carrier radio card comprising one or more digital signal processors (DSP) that produce and process baseband downlink and uplink wireless signals for each of the multiple RF channels supported by the multiple TRXs 116, one or more upconverters to upconvert downlink wireless baseband signals to appropriate RF frequencies, and one or more downconverters to downconvert uplink RF signals received by the radio card to wireless baseband signals for processing by the one or more DSPs. Such a multi-carrier radio card also includes other conventional base station components known to those skilled in the art including, for example, filters and amplifiers (for example, an appropriate amplifier to cause the radio card to output low power RF signals). It is to be understood that the various components described here (for example, amplifiers) can be implemented separately from such a multiple-carrier radio card or TRXs 116. Moreover, each of the multiple TRXs 116 can also be implemented in other ways. For example, a separate radio card can be used to implement each of the multiple TRXs 116.

The multiple-TRX pico base station 102 comprises a suitable interface 115 to communicatively couple the multiple-TRX pico base station 102 (and the TRXs 116 included therein) to the network 104. In one embodiment, the multiple-TRX pico base station 102 uses an Internet protocol (IP) backhaul connection in which voice and data signals are converted to IP packets for the communication via the backhaul link 106 to the BSC 108 (for example, using a cable modem or DSL modem). Alternatively, the multiple-TRX pico base station 102 may use a T1 or E1 connection (that is, a time division multiplexing (TDM) connection) for the backhaul link 106. Alternatively, a wireless link (for example, a WIMAX wireless link) can be used to provide the backhaul link 106, in which case the interface 115 would comprise a suitable WIMAX interface. It is noted in this regard that only a single backhaul link 106 need be provided in order to service the multiple TRXs 116 that are included in the multiple-TRX base station 102. This is in contrast to conventional pico base station deployments in which multiple, single TRX pico base stations are deployed, each of which requires a separate backhaul link.

In a GSM implementation of the embodiment shown in FIG. 1, the GSM A-bis interface is used to communicate between the multiple-TRX pico base station 102 and the BSC 108 over the backhaul connection 106. In such a GSM implementation, the BSC 108 communicates with an MSC in the NSS 110 using the GSM A interface and a packet control unit of the BSC 108 communicates with a SGSN in the data network 114 using the GPRS Gb interface. In one such implementation, the various interfaces are implemented in software executing on the multiple-TRX pico base station 102. A BSC 108 can communicate with one or more multiple-TRX pico base stations 102.

Each of the transceiver units 116 communicates in a single bi-directional RF channel of a particular licensed wireless RF communications band. Each such bi-directional RF channel comprises an upstream channel and downlink channel. In one exemplary implementation, each of the transceiver units 116 of the multiple-TRX pico base station 102 transmits and receives 200 kHz GSM uplink and downlink RF channels within the 850 MHz frequency band (for example, 824-849 MHz uplink and 869-894 MHz downlink). In another exemplary embodiment, each of the transceiver units 116 of the multiple-TRX pico base station 102 transmits and receives in 1.25 MHz CDMA uplink and downlink RF channels within the 1900 MHz frequency band (for example, 1850-1910 MHz uplink and 1930-1990 MHz downlink). In other embodiments, the transceiver units 116 support other wireless protocols (for example, other GSM bands, other CDMA bands and GPRS, EDGE, UMTS, W-CDMA, LTE, EVDO, CDMA2000, UMB, HSPA, and WIMAX protocols). Moreover, it is to be understood that the multiple-TRX pico base station 102 may support multiple, different wireless protocols so that the different wireless protocols can be supported by a single multi-mode multiple-TRX pico base station 102. For example, one transceiver 116 may support one wireless protocol while other transceivers 116 may support other wireless protocols.

In the particular embodiment shown in FIG. 1, the multiple-TRX pico base station 102 is also communicatively coupled to a distributed antenna system (DAS) 118. The DAS 118 comprises a multi-port repeater hub 120 which is communicatively coupled to a plurality of antenna units 122. Each antenna unit 122 includes or is coupled to at least one antenna 124 from which the antenna unit 122 receives and radiates RF signals.

The DAS 118 is used to provide RF wireless coverage from the remotely located and spatially separated antenna units 122 using the capacity that is provided by the multiple-TRX pico base station 102. This in contrast to conventional pico base station deployments in which multiple, single-TRX pico base stations are located throughout the coverage area (that is, each such single-TRX pico base station is co-located with the antenna from which that base station transmits and receives the single RF channel). With the embodiment shown in FIG. 1, the TRXs 116 of the pico base stations 102 are centralized and can be located in a secure location (for example, a utility or server closet or room).

In the particular embodiment shown in FIG. 1, the hub 120 is communicatively coupled to the antenna units 122 via one or more intermediate expansion hubs 126. In such an embodiment, the hub 120 is communicatively coupled to each of the expansion hubs 126 via one or more cables 128. For example, in one embodiment described here in connection with FIG. 1, the cables 128 comprise one or more fiber optic cables. The antenna units 122 are communicatively coupled to the expansion hub 126 via appropriate cabling 130 (for example, thin coaxial cabling, CATV cabling, or fiber optic cabling). In other embodiments, the antenna units 122 may be communicatively coupled to the hub 120 directly without the use of intermediate expansion hubs 126.

In one implementation of such an embodiment, the hub 120 receives a downlink RF channel from each of the transceiver units 116 included in the multiple-TRX pico base station 102. The hub 120 downconverts each such downlink RF channel to an intermediate frequency (IF) for distribution to the antenna units 122. The downconverted IF channels are combined and communicated to each expansion hub 126 over a respective fiber link 128 using an analog optical modulator. Each expansion hub 126 receives and demodulates the optical signal to recover the combined downlink IF signal, which is then transmitted to each of the antenna units 122 that are coupled to that expansion hub 126 using the cabling 130. Each antenna unit 122 receives the combined IF signal and separates the IF signals into separate IF signals for each downlink RF channel received from the multiple-TRX pico base station 102. The antenna unit 122 then upconverts each such separated IF signal to its original RF frequency as was received from pico base station 102. The upconverted downlink RF signals are then combined and radiated from an antenna 124 coupled to the antenna unit 122.

A similar process is performed in the uplink direction. At each antenna unit 122, RF signals that are received from the antenna 124 coupled to that antenna unit 122 are filtered in order to produce an uplink RF channel for each of the transceiver units 116 included in the multiple-TRX pico base station 102. The antenna unit 122 downconverts each such uplink RF channel to an intermediate frequency (IF) for distribution back to the hub 120 via an expansion hub 126. The downconverted IF channels are combined and communicated to each expansion hub 126 over a cable 130. Each expansion hub 126 combines the various IF channels it receives from the antenna units 122 that are coupled thereto and communicates the combined IF channels to the hub 120 over a fiber link 128 using an analog optical modulator. The hub 120 receives and demodulates the optical signal from each expansion hub 126 to recover the combined IF signal transmitted from that expansion hub 126. The recovered combined IF signals from all of the expansion hubs 126 are then combined. The hub 120 then separates the combined IF signals into separate IF signals for each uplink RF channel supported by a transceiver unit 116 in the multiple-TRX pico base station 102. The hub 120 then upconverts each such separated IF signal to its original RF frequency as was received over the air. Each upconverted uplink RF channel is then communicated to a respective transceiver unit 116 in the multiple-TRX pico base station 102.

In other embodiments, separation of the signals is not required if the IF and RF frequencies are selected such that a block upconverters and block downconverters can be used (instead of using separate, individual narrowband upconverters and downconverters). In the simplest example of such an embodiment, if the system were designed to distribute multi-carrier GSM in the 900 MHz band and each carrier were located at the correct frequency offset from each other, the entire IF spectrum could be upconverted as one continuous block versus having individual narrow band upconverters and likewise with the downconversion of the RF spectrum The DAS 118 may include one or more of the following filtering, amplification, wave division multiplexing, duplexing, synchronization, and monitoring functionality as needed and as is known in the art. Also, power may also be provided to the antenna units 122 over the cabling 130 such that no additional power source is needed to power the antenna units 122. One example of a suitable DAS 118 is the InterReach FUSION in-building distributed antenna system that is commercially available from ADC Telecommunications, Inc., of Eden Prairie, Minn.

Although one particular type of DAS is shown in FIG. 1, it is to be understood that other DAS networks and configurations can used in other embodiments. Such alternative DAS networks and configurations include, without limitation, the use of multiple, overlaid single band analog IF DAS networks (for example, using unshielded twisted pair or CAT5 cabling), DAS networks that do not employ any expansion hubs, DAS networks that make use of digital radio frequency transport, and "passive" DAS networks. Moreover, the wireless signals communicated between the multiple-TRX pico base station 102 and the antennas 124 can be transported in one or more of the following forms: analog RF form, analog IF form, analog baseband form, digitized RF form, digitized IF form, and digitized baseband form.

The multiple-TRX pico base station 102 and the hub 120 of the DAS 118 are installed in a building 134 in which coverage and capacity is to be provided. The building 134 is not controlled by the service provider that operates the network 104. That is, the building 134 comprises a customer premise that is owned, controlled, or otherwise used by a person or entity other than the service provider that operates the network 104, such as an "enterprise" (for example, an "enterprise" such as a business, non-profit organization, or government entity). Examples of such buildings include, without limitation, office buildings, shopping centers, educational or governmental buildings, airports, sports or entertainment arenas or stadiums, hospitals, single family homes, condominiums, apartments, or hotels or motels.

In one implementation of such an embodiment, the multiple-TRX pico base station unit 102 and hub 120 of the DAS 118 are installed within a rack 136 that is included in a utility or server room or closet of the building 134. In the particular embodiment shown in FIG. 1, at least a portion of such equipment is "rack mountable". That is, at least a portion of such equipment is packaged in such a way to fit within one or more standard racks 136 located within the utility room. Such racks 136 enable such rack-mountable equipment to be stacked within the rack in an efficient, organized, and standard manner. One example of such a rack is a 19-inch rack (for example, a 19-inch rack that complies with one or more of the following standards: Electronic Industries Alliance (EIA) 310-D, International Electrotechnical Commission (IEC) 60297 and Deutsches Institut für Normung e.V (DIN) 41494 SC48D).

In the embodiment shown in FIG. 1, the multiple-TRX pico base station 102 and the hub 120 are rack mountable. That is, each respective chassis in which the various components of the multiple-TRX pico base station 102 and the hub 120 are housed and designed to fit (and be installed) in the rack 136. Each such chassis includes appropriate fastening and structural support elements to fasten the multiple-TRX pico base station 102 and the hub 120 to the rack 136 and to support the multiple-TRX pico base station 102 and the hub 120 when installed in the rack 136.

In another embodiment, the base station 102 and the hub 120 are housed within the same physical chassis (for example, the same rack-mountable physical chassis).

Together, the antenna units 122 form one or more coverage areas. The antenna units 122 are distributed throughout the building 134 so as to form one or more coverage areas that substantially include the occupied areas within the building 134.

Mobile communications equipment 132 (e.g., a cell phone) within a coverage area is communicatively coupled to the network 104 via one or more of the antenna units 122, an expansion hub 126, the hub 120, the multiple-TRX pico base station 102 and the backhaul 106.

Centralizing the multiple-TRX pico base station 102 and then distributing the aggregated capacity provided by the multiple-TRX pico base station 102 is more efficient in terms of resource utilization, including frequency spectrum, than conventional pico base station deployment approaches, which may result in underutilization of pico cell resources.

The multiple-TRX pico base station 102 shown in FIG. 1 is described above as sending and receiving RF signals with the DAS 118. It is to be understood that in other embodiments, the transceivers 116 of the multiple-TRX pico base station 102 sends and receives other types of the signals (which are distributed by the DAS 118 and which are ultimately used to produce an RF signal in the downlink and which were originally received as an RF signal in the uplink). For example, the transceivers 116 and the DAS 118 can communicate using IF signals, in which case, in the downlink, the transceivers 116 upconvert the downlink baseband signals to appropriate IF frequencies and, in the uplink, the DAS 118 provides IF signals to the transceivers 116, which downconvert the received IF signals to baseband for processing. Similarly, analog baseband signals or digital data can be communicated between the transceivers 116 and the DAS 118 (in which case, in the downlink direction, the RF signals are ultimately produced in the DAS 118 and, in the uplink direction, the DAS 118 receives the original RF signals from mobile equipment 132 and processes the RF signals in order to produce the desired signal for communication to the transceivers 116).

Figure 2:
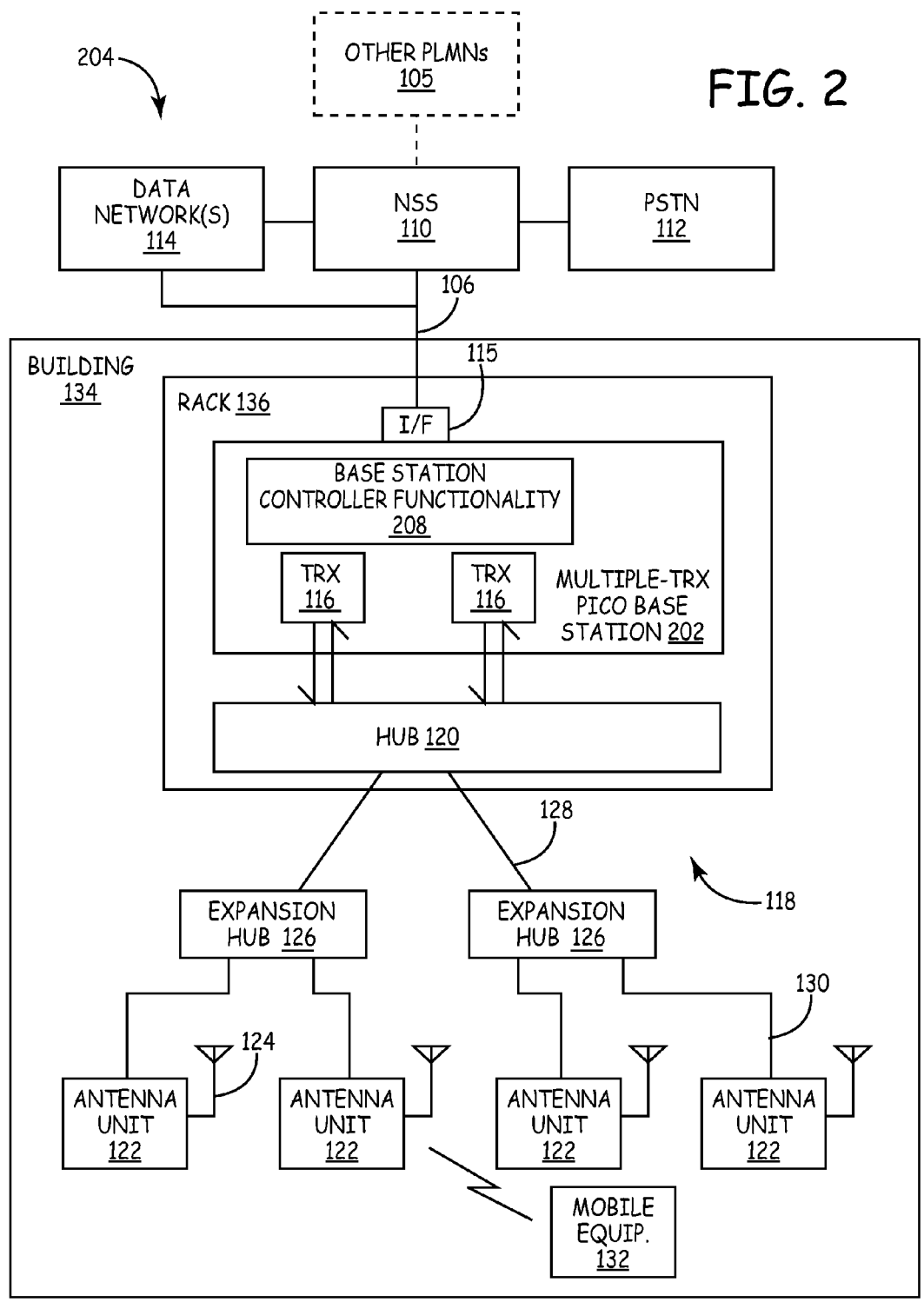
FIG. 2 is a block diagram of an embodiment of a multiple-TRX pico base station.

FIG. 2 is a block diagram of an alternative embodiment of a multiple-TRX pico base station 202. As with the multiple-TRX pico base station 102 shown in FIG. 1, the multiple-TRX pico base station 202 shown in FIG. 2 comprises multiple TRXs 116. The multiple-TRX pico base station 202 of FIG. 2, however, also comprises at least a portion of the base station controller functionality 208 necessary to control the multiple TRXs 116 included in the multiple-TRX pico base station 202 and for the multiple-TRX pico base station 202 to communicate with a PLMN 204 (for example, with the NSS 110 and/or a data network 114). In one implementation of such an embodiment, the base station controller functionality 208 is implemented in software that executes on one or more programmable processors that are included in the multiple-TRX pico base station 202.

In a GSM implementation of such an embodiment, the BSC functionality 208 implements at least a portion of the GSM A interface in order to communicate with the NSS 110 over the backhaul 106 and implements at least part of the GPRS Gb interface in order to communicate with a SGSN included in the data network 114.

Otherwise, the items shown in FIG. 2 that are referenced in FIG. 2 using the same reference numerals as used in FIG. 1 are substantially the same as described above in connection with FIG. 1.

Figure 3:
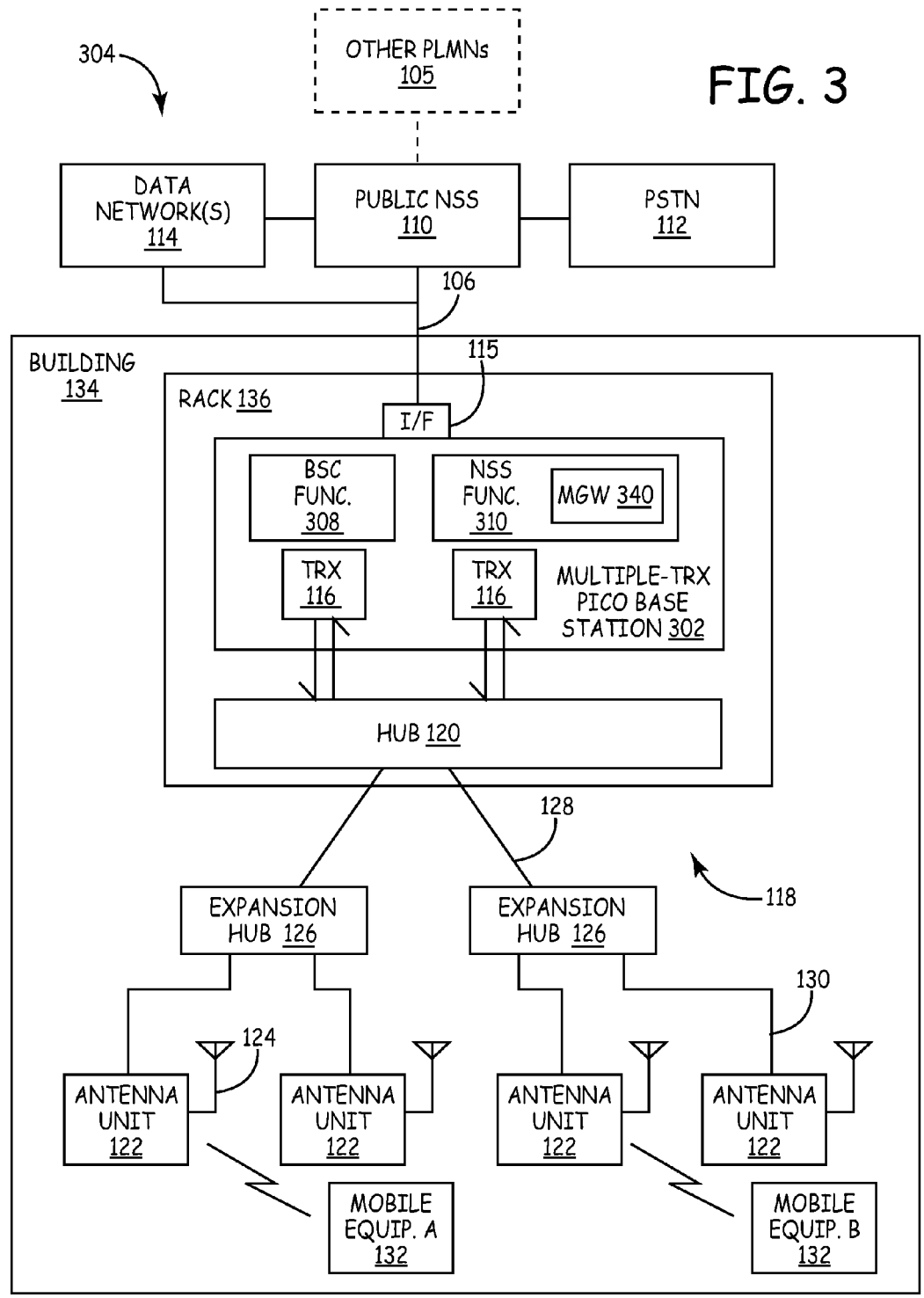
FIG. 3 is a block diagram of an embodiment of a multiple-TRX pico base station.

In other embodiments, the BSC functionality 208 further comprises at least some MSC-related functionality. FIG. 3 is a block diagram of one such alternative embodiment of a multiple-TRX pico base station 302. As with the multiple-TRX pico base stations 102 and 202 shown in FIGS. 1 and 2, the multiple-TRX pico base station 302 shown in FIG. 3 comprises multiple TRXs 116. As with the multiple-TRX pico base station 202 shown in FIG. 2, the multiple-TRX pico base station 302 of FIG. 3 also includes base station control functionality 308 necessary to control the multiple TRXs 116 included in the multiple-TRX pico base station 302 and for the multiple-TRX pico base station 302 to communicate with a PLMN 304 (for example, with the public NSS 110 and/or a data network 114). In one implementation of such an embodiment, the base station controller functionality 308 is implemented in software that executes on one or more programmable processors that are included in the multiple-TRX pico base station 302.

The multiple-TRX pico base station 302 shown in FIG. 3 also includes NSS functionality 310. For example, in the particular embodiment shown in FIG. 3, the NSS functionality 310 implements at least a portion of the call switching functionality normally implemented in a MSC (for example, GSM media gateway (MGW) functionality 340). In particular, when one mobile device that is communicating with the multiple-TRX pico base station 302 (for example, mobile equipment A in FIG. 3) calls another mobile device that is communicating with the multiple-TRX pico base station 302 (for example, mobile equipment B in FIG. 3), the MGW functionality 340 in the multiple-TRX pico base station 302 is able to locally switch the call traffic for that call when instructed to do so by a public MSC included in the public NSS 110. In this way, the call traffic need not be backhauled back to the public MSC in the public NSS 110 and only the signaling traffic necessary to establish the calls needs to be backhauled to the public MSC. In such an embodiment, the NSS functionality 310 implements an appropriate interface (for example, the GSM Mc interface) between the MGW functionality 340 and the public MSC in order to permit the public MSC to control the MGW functionality 340 via the backhaul link 106.

In one implementation of such an embodiment, the NSS functionality 310 is implemented in software that executes on one or more programmable processors that are included in the multiple-TRX pico base station 310 (for example, the same one or more processors that execute the software that implements the BSC functionality 308).

Otherwise, the items shown in FIG. 3 that are referenced in FIG. 3 using the same reference numerals as used in FIG. 1 are substantially the same as described above in connection with FIG. 1.

Figure 4:
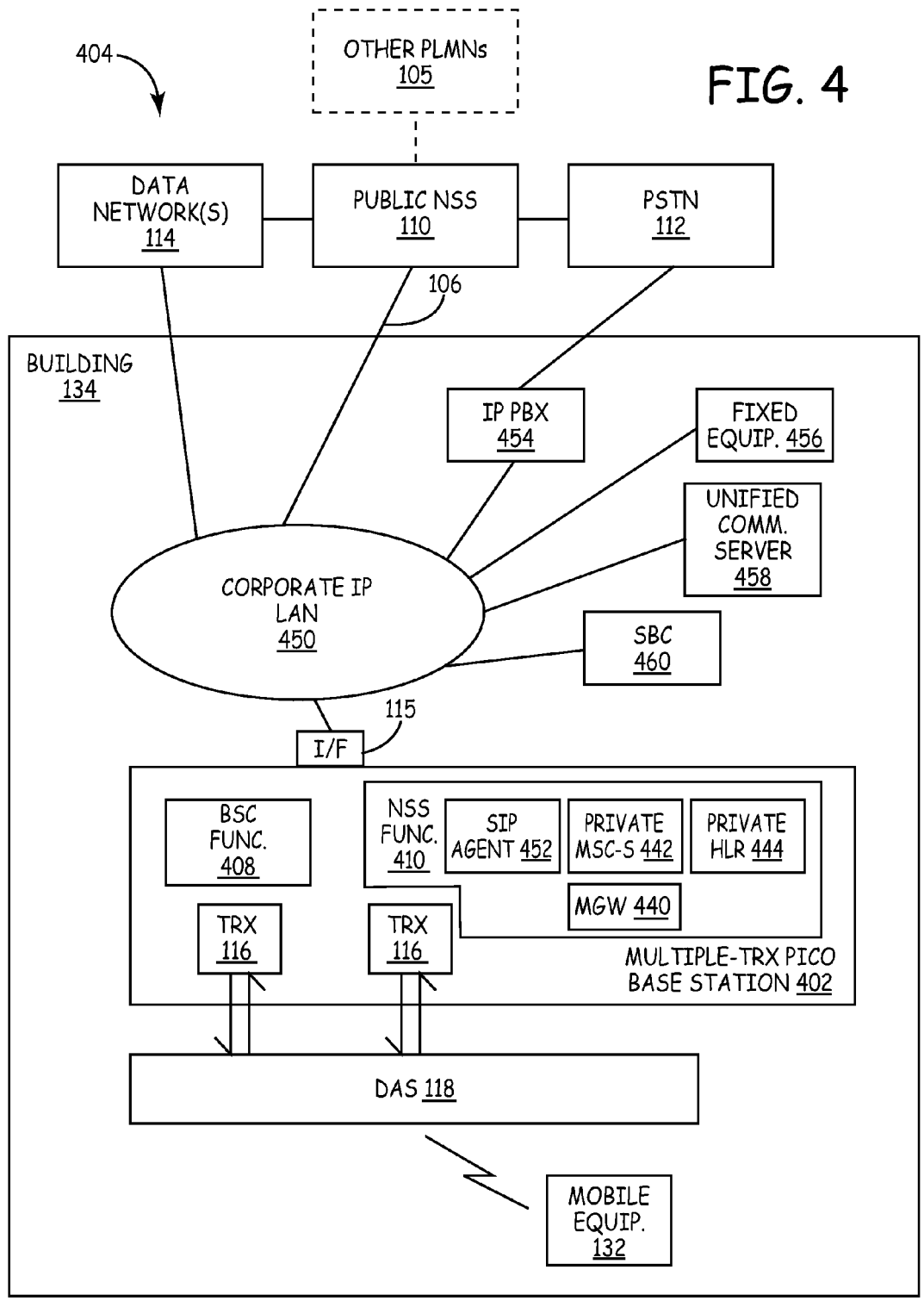
FIG. 4 is a block diagram of an embodiment of a multiple-TRX pico base station.

In other implementations, other NSS-related functionality is implemented within the multiple-TRX pico base station 302 including, without limitation, at least some MSC server functions. FIG. 4 is a block diagram of one such alternative embodiment of a multiple-TRX pico base station 402. As with the multiple-TRX pico base stations 102, 202, and 302 shown in FIGS. 1-3, the multiple-TRX pico base station 402 shown in FIG. 4 comprises multiple TRXs 116. As with the multiple-TRX pico base station 302 shown in FIG. 3, the multiple-TRX pico base station 402 of FIG. 4 also includes base station control functionality 408 necessary to control the multiple TRXs 116 included in the multiple-TRX pico base station 402 and for the multiple-TRX pico base station 402 to communicate with a PLMN 404 (for example, with the public NSS 110 and/or a data network 114). In one implementation of such an embodiment, the base station controller functionality 408 is implemented in software that executes on one or more programmable processors that are included in the multiple-TRX pico base station 402.

In the embodiment shown in FIG. 4, the multiple-TRX pico base station 402 comprises NSS functionality 410. The NSS functionality 410 includes MGW functionality 440 as described above in connection with FIG. 3. The NSS functionality 410 in the embodiment shown in FIG. 4 also implements private GSM MSC server functionality (MSC-S) 442 and a private home location register (HLR) 444. The private MSC-S functionality 442 and the private HLR 444 enable the NSS functionality 410 to perform full mobility management and call management for calls between mobile stations 132 that are communicating with the multiple-TRX pico base station 402 or between one or more mobile stations 132 that are communicating with the multiple-TRX pico base station 402 and one or more pieces of fixed equipment 456 (or other SIP entities) that are located within the building 134. In the particular embodiment shown in FIG. 4, the fixed equipment 456 comprises voice over IP (VoIP) telephones that are communicatively coupled to an IP PBX 454 over a corporate IP local area network (LAN) 450. In such an embodiment, the NSS functionality 410 further comprises a Session Initiation Protocol (SIP) agent 452 to enable the private MSC-S functionality 442 and the IP PBX 454 to use the SIP protocol to establish sessions between the mobile equipment 132 (which do not otherwise support the SIP protocol) and the fixed equipment 456. Also, the SIP agent 452 enables the private MSC-S functionality 442 to establish sessions with other network entities that support the SIP protocol including, for example, a unified communication server 458 (for example, the MICROSOFT OFFICE COMMUNICATIONS SERVER 2007). As a result, such sessions can be established without using the PSTN 112 or the PLMN 404. However, the private MSC-S functionality 442 can be configured to support call handovers to the PLMN 404 or other PLMN 105 in the event that such a mobile station 132 moves outside of the coverage area of the pico base station 402 while such a session is still in progress. Likewise, the private MSC-S functionality 442 can be configured to support inbound handovers from another MSC when such a mobile station 132 comes into the coverage area of the pico base station 402.

In such an embodiment, the MGW functionality 440 communicates, for example, with a SIP session border controller (SBC) 460 in order to communicate the call traffic between the mobile equipment 132 and the fixed equipment 456 (or other SIP entities) and perform any transcoding that is required.

In the embodiment shown in FIG. 4, the private MSC-S functionality 442 and private HLR 444 are "private" in the sense that such functionality is only used for establishing sessions among licensed-RF-spectrum mobile stations 132 that are in the private HLR 444 and SIP-enabled equipment that is communicatively coupled to the corporate IP LAN 450. In such an embodiment, each mobile station 132 that is in the private HLR 44 is also in a public HLR within the PLMN 404. In the event that a mobile station 132 that is in the private HLR 444 makes a call to a mobile station that is not in the private HLR 444 or to a fixed device that is not coupled to the corporate IP LAN 450, the MSC-S functionality of the public MSC is used to establish such a call, in which case the public MSC interacts with pico base station 402 in the conventional manner. Likewise, if a mobile that is not in the private HLR 444 uses the pico base station 402 to establish a call, the MSC-S functionality of the public MSC in the public NSS 110 is used to establish such a call (directly or by interacting with another public NSS), in which case the public MSC in the NSS 110 interacts with pico base station 402 in the conventional manner. In other embodiments, the MSC-S functionality and HLR integrated into the pico base station 402 is "public" and acts as conventional MSC-S and HLR in such scenarios (for example, by including other NSS functionality such as a visitor location register (VLR) and prepaid services (PPS)).

In the embodiment shown in FIG. 4, features that are provided by the unified communication server 458 (for example, a voice message-to-email gateway or conference calling) to SIP-enabled devices can be provided to the non-SIP-enabled mobile devices that are in the private HLR 444.

Moreover, the private MSC-S functionality 442 can be configured to route calls from mobile equipment 132 to the PSTN 112 via the IP PBX 454 and its connection to the PSTN 112 (for example, where doing so results in the least cost to the enterprise).

Likewise, supplemental services can be implemented locally using the IP PBX 454 and the private MSC-S functionality 442 of the multiple-TRX pico base station 402. For example, a user who has both a fixed VoIP telephone coupled to the IP PBX 454 and a mobile device that communicates with the multiple-TRX pico base station 402 can have outside calls that come into either device forwarded to the other device such that both devices ring when such an outside calls comes in. Moreover, voice mail messages that are received via either device can be routed to the unified communication server 458 (for example, for delivery via a user's email account), thereby providing a single repository of voice mail messages.

The above-mentioned enhanced SIP-related features can be provided to licensed-RF-spectrum (i.e., GSM) mobile devices that are in the private HLR 444 while still permitting other licensed-RF-spectrum mobile devices to communicate with the PLMN 404 or another PLMN 105 using conventional cellular technology.

In one implementation of such an embodiment, the NSS functionality 410 is implemented in software that executes on one or more programmable processors that are included in the multiple-TRX pico base station 410 (for example, the same one or more processors that execute the software that implements the BSC functionality 408).

Otherwise, the items shown in FIG. 4 that are referenced in FIG. 4 using the same reference numerals as used in FIG. 1 are substantially the same as described above in connection with FIG. 1.

The functionality described above in connection with FIGS. 3 and 4 can, in other embodiments, also be implemented using base stations other than multiple-TRX pico base stations (for example, using single-TRX pico base stations, micro base stations, and macro base stations). Moreover, such functionality is described above as being implemented in an integrated base station device. It is to be understood, however, that in some other embodiments, such functionality is implemented using separate network nodes.

The various elements described above (for example, the multiple-TRX pico base station and the DAS coupled thereto) can be deployed in various architectures and usage scenarios.

Figure 5:
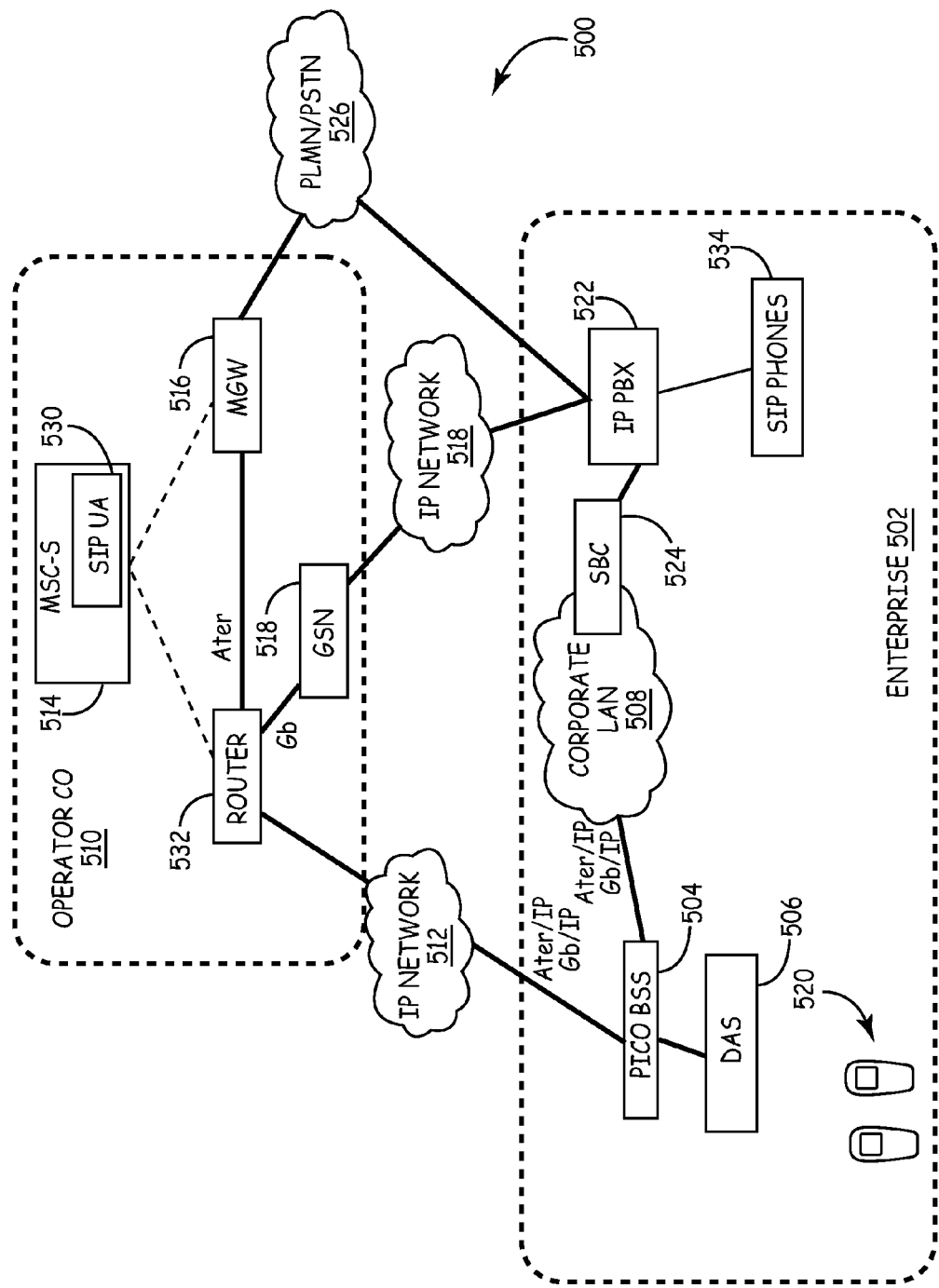
FIG. 5 illustrates one example of a distributed architecture for an enterprise mobile network.

FIG. 5 illustrates one example of a distributed architecture 500 in which the technology described above (for example, a multiple-TRX pico base station and DAS) can be deployed to provide coverage and capacity to GSM/GPRS mobile devices while in an enterprise 502. In this example, a pico base station subsystem 504 is coupled to a DAS 506. The pico base station 504 is communicatively coupled to a corporate IP local area network 508 (using a GSM Ater-over-IP interface for calls and a GPRS Gb-over-IP interface for data). The corporate IP LAN 508 is used to gain access to the wireless service operator's central office 510 via an IP Network 512, where a MSC server (MSC-S) 514, a media gateway (MGW) 516, and GSN 518 are located. In the embodiment shown in FIG. 5, a router 532 is used to communicatively couple the IP network 512 to the various elements of the operator's central office 510.

The MSC-514 handles signaling traffic routed to the central office 510 and controls the MGW 516. In the particular embodiment, the MSC-S 514 includes a SIP user agent (UA) 530 to handle SIP-related signaling (as described below). The MGW 516 switches calls and performs any needed media conversion (for example, conversions between formats used in the enterprise 502 and formats used in the public switched telephone network or by a another PLMN (collectively shown at reference numeral 526 in FIG. 5)). The GSN 518 is also coupled to an IP network 528 (over the Gb interface) and implements conventional SGSN functionality.

In such an embodiment, the NSS functionality is centralized in the central office 510 while the base station subsystem (BSS) is located in the enterprise 502. In such an example, the pico base station subsystem 504 implements functionality similar to that described above in connection with FIGS. 3 and 4 to enable the pico base station subsystem 504 to locally switch sessions among mobiles 520 that are within its coverage area and/or sessions with an IP PBX 522 (and the SIP phones 534 coupled thereto). In this example, the IP PBX 522 and the SIP phones 534 are coupled to the pico base station subsystem 504 over the corporate local area network 508 using a SIP session border controller (SBC) 524, which manages the signaling and media streams for sessions established with such devices (implementing, for example, a Back-to-Back User-Agent). The SBC 524 handles, for example, transcoding and NAT traversal (using, for example, the Interactive Connectivity Establishment (ICE) protocol or the Session Traversal Utilities for NAT (STUN) protocol).

In this embodiment, the NSS functionality is centralized and located in the operator's central office 510, which makes it easier to maintain such NSS functionality. However, firewalls are typically used to communicatively couple such NSS functionality to the pico base station subsystem 504 in the enterprise 502, some mechanism (for Internet Protocol Security (IPsec) software) is typically used to secure communications among these devices, and some mechanism is used to prioritize data flows and to help ensure a desired quality of service (QOS) for communications among these devices using the Internet. Moreover, communications between the NSS functionality located in the operator's central office 510 and the pico BSS 504 in the enterprise 502 involve at least one Network Address Translation (NAT) traversal.

Figure 6:
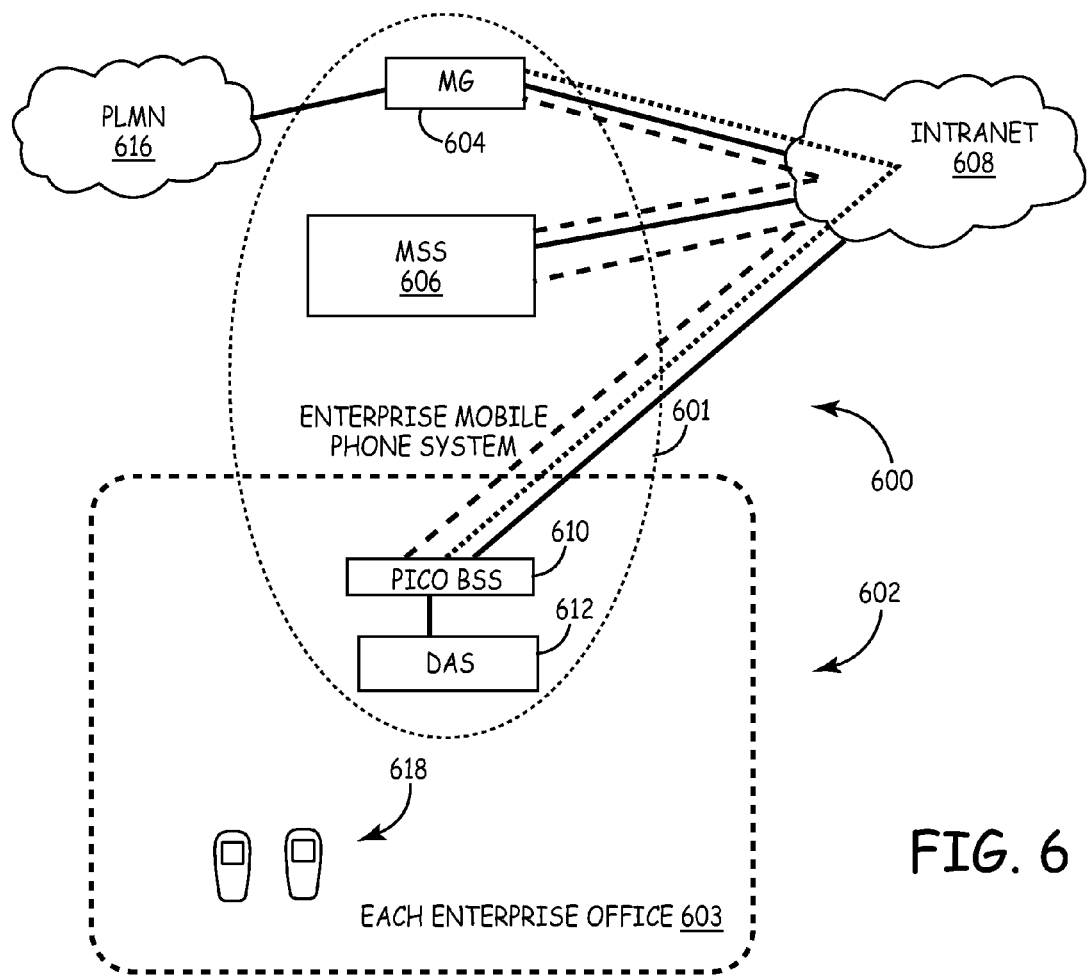
FIG. 6 illustrates an example of an architecture for an enterprise mobile network.

FIG. 6 illustrates another architecture 600 for an enterprise mobile phone system 601 where an enterprise 602 connects a media gateway (MG) 604 and a mobile switching center server (MSS) 606 to the enterprise's IP-based Intranet 608. In each office 603 of the enterprise 602, a pico base station subsystem 610 and a DAS 612 are installed and are coupled to the MG 604 and MSS 606 via the enterprise's Intranet 608. In this way, the pico BSS/DAS equipment installed in the various offices 603 of the enterprise 602 can share the MG 604 and MSS 606 via the Intranet 608. The MG 604 and the MSC-S 606 are communicatively coupled to a wireless operator's PLMN 616 using a suitable backhaul link (for example, TDM links). In this example, the pico BSS 610, DAS 612, MG 604, MSS 606, and the Intranet 608 are located in the enterprise.

The elements of the enterprise mobile phone system 601 are communicatively coupled to one another using the Intranet 608 (the solid lines betweens such elements and the Intranet 608 depict IP communication links). SS7 and GSM compatible signaling (for example, signaling formatted according to the ISDN user part (ISUP) and mobile application part (MAP) protocols) are communicated between nodes in the operator's PLMN 616 and the MSS 606 and between the MSS 606 and the pico BSS 610. SS7-related signaling is shown in FIGS. 6-10 using dashed lines. The call-related media streams are communicated between the pico BSS 610 and the MG 604 using the Real-time Transport Protocol (RTP). The MSS 606 controls the various media gateway functions in the system 601 using, for example, the Media Gateway Control Protocol (MGCP). In this embodiment, SIGTRAN is also used to communicate signaling data over the IP links.

In this example, external devices (not shown) are communicatively coupled to the enterprise mobile phone system 601 via the operator's PLMN 616. Calls between external communication devices (not shown) and mobile devices 618 serviced by the pico BSS 610 are setup using the MSS 606 and the associated media streams are switched by the MG 604.

Figure 7:
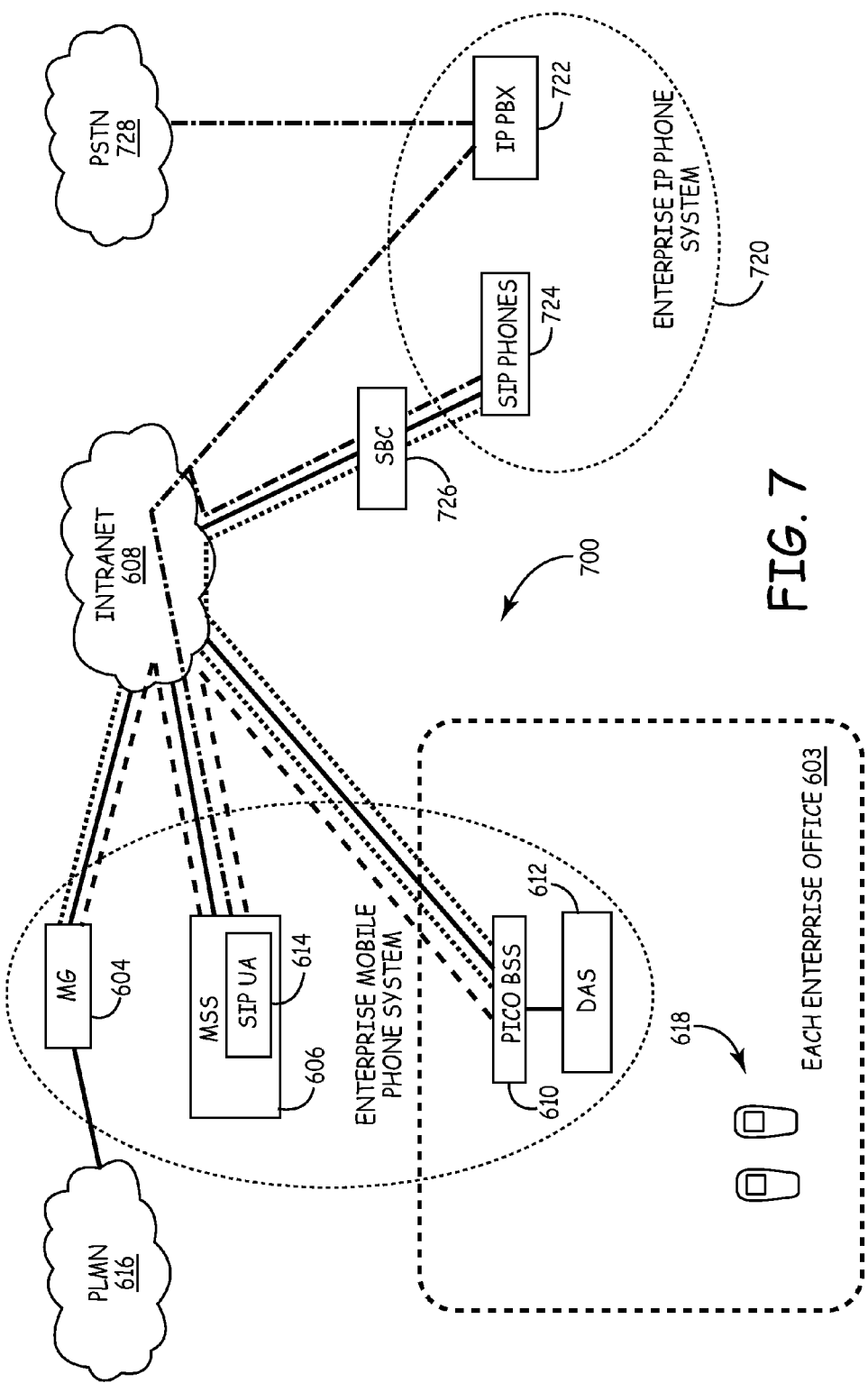
FIG. 7 illustrates an example of an architecture for an enterprise mobile network.

FIG. 7 illustrates an architecture 700 that is similar to the one shown in FIG. 6 (and those elements that are the same as the ones used in the example shown in FIG. 6 are referenced in FIG. 7 using the same reference numerals used in FIG. 6). Architecture 700 is extended to further include an enterprise IP phone system 720 that is deployed in the enterprise. The enterprise IP phone system 720 includes an IP PBX 722 that supports communications with SIP phones 724. In this embodiment, a SIP Session Border Controller (SBC) 726 is used to couple the SIP phones 724 to Intranet 608. The SBC 726 manages the signaling and media streams for sessions established with such devices and performs any needed transcoding.

The MSS 606 includes a SIP user agent (SIP UA) 614 to set up sessions between mobiles 618 that are being handled by the pico BSS 610 and SIP Phones 724 or the IP PBX 722. Sessions between such mobiles 618 and devices that are coupled to the PSTN 728 can be setup using the SIP UA 614 and the connection to the PSTN 728 provided by the IP PBX 722. Alternatively, sessions between such mobiles 618 and devices that are coupled to the PSTN 728 can be routed through the operator's PLMN 616 (as is the case with the example shown in FIG. 6).

Note that in both of the architectures shown in FIGS. 6 and 7, a firewall is not used to couple the MSS 606, MG 604, and each of the pico BSSs 610 to the Intranet 608. Also, IPSec and SRTP are not needed to secure communications among these devices. If the intranet backhaul bandwidth and QOS is sufficient to support the services provided by the enterprise mobile phone system 601 (for example, by using a dedicated VPN) then special QOS features and devices are not required to provide such backhaul. If backhaul QOS is an issue, a resource reservation mechanism may be needed to prioritize data flows and to help ensure a desired quality of service.

Moreover, in the examples shown in FIGS. 6 and 7, the MSS 606, MG 604, and each of the pico BSSs 610 are assigned a respective Intranet IP address, and communications among those devices do not involve any NAT traversals.

Figure 8:
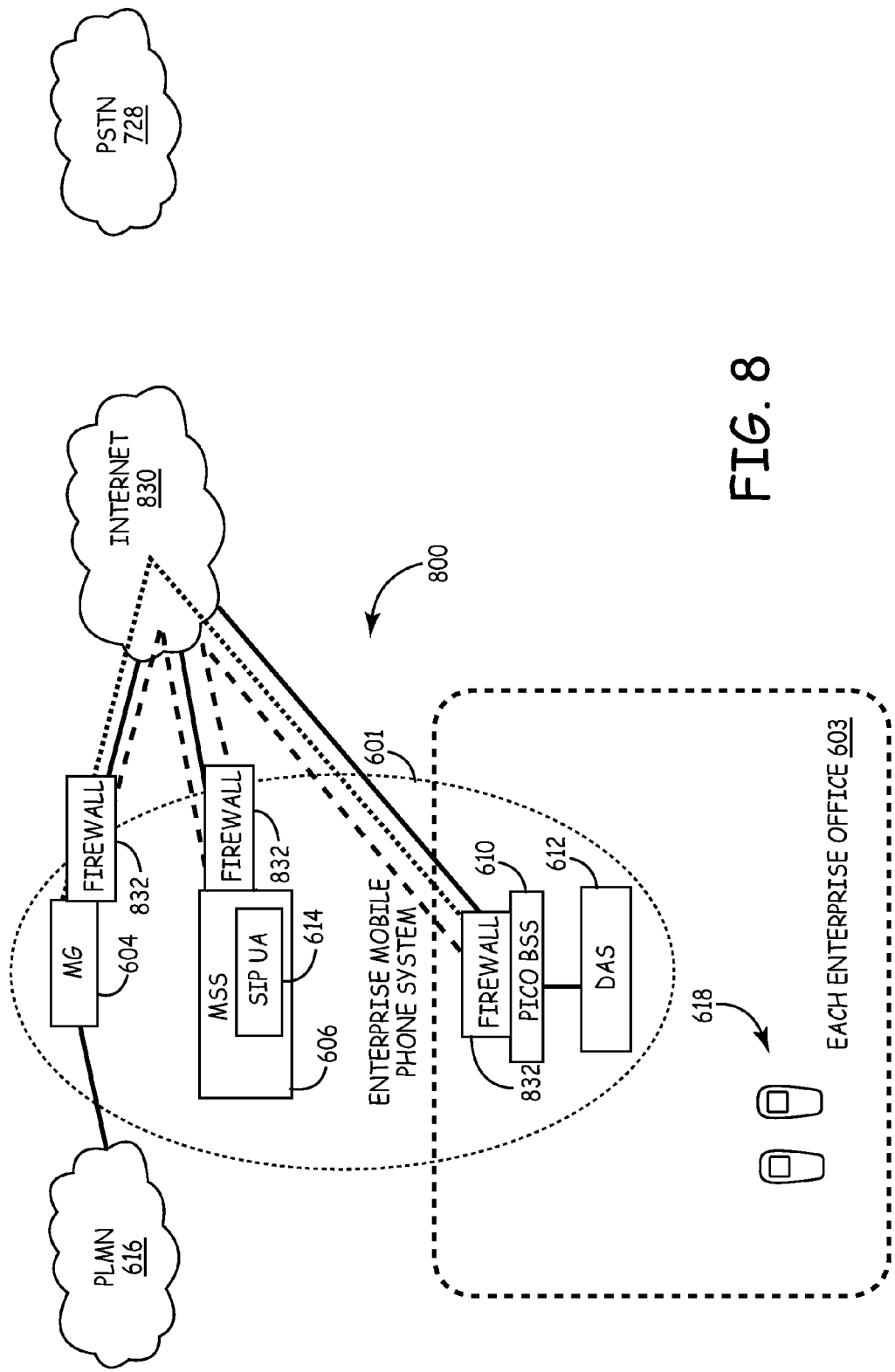
FIG. 8 illustrates an example of an architecture for an enterprise mobile network.

FIG. 8 illustrates an architecture 800 that is similar to the one shown in FIG. 6 (and those elements that are the same as the ones used in the example shown in FIG. 6 are referenced in FIG. 8 using the same reference numerals used in FIG. 6).

The example architecture 800 shown in FIG. 8 is similar to the example shown in FIG. 6 except that the MSS 606, MG 604, and pico BSSs 610 are coupled to one another over the public Internet 830 instead of an enterprise's Intranet. As a result, firewalls 832 are needed to couple the MSS 606, MG 604, and each pico base station subsystem 610 to the Internet 830. Also, IPSec and SRTP are used to secure communications among these devices, and QOS is used to prioritize data flows and to help ensure a desired quality of service for communications among these devices using the Internet 830. Moreover, each of the MSS 606, MG 604, and each pico base station subsystem 610 is assigned an Internet IP address, and communications among those devices occurs over the Internet 830.

Figure 9:
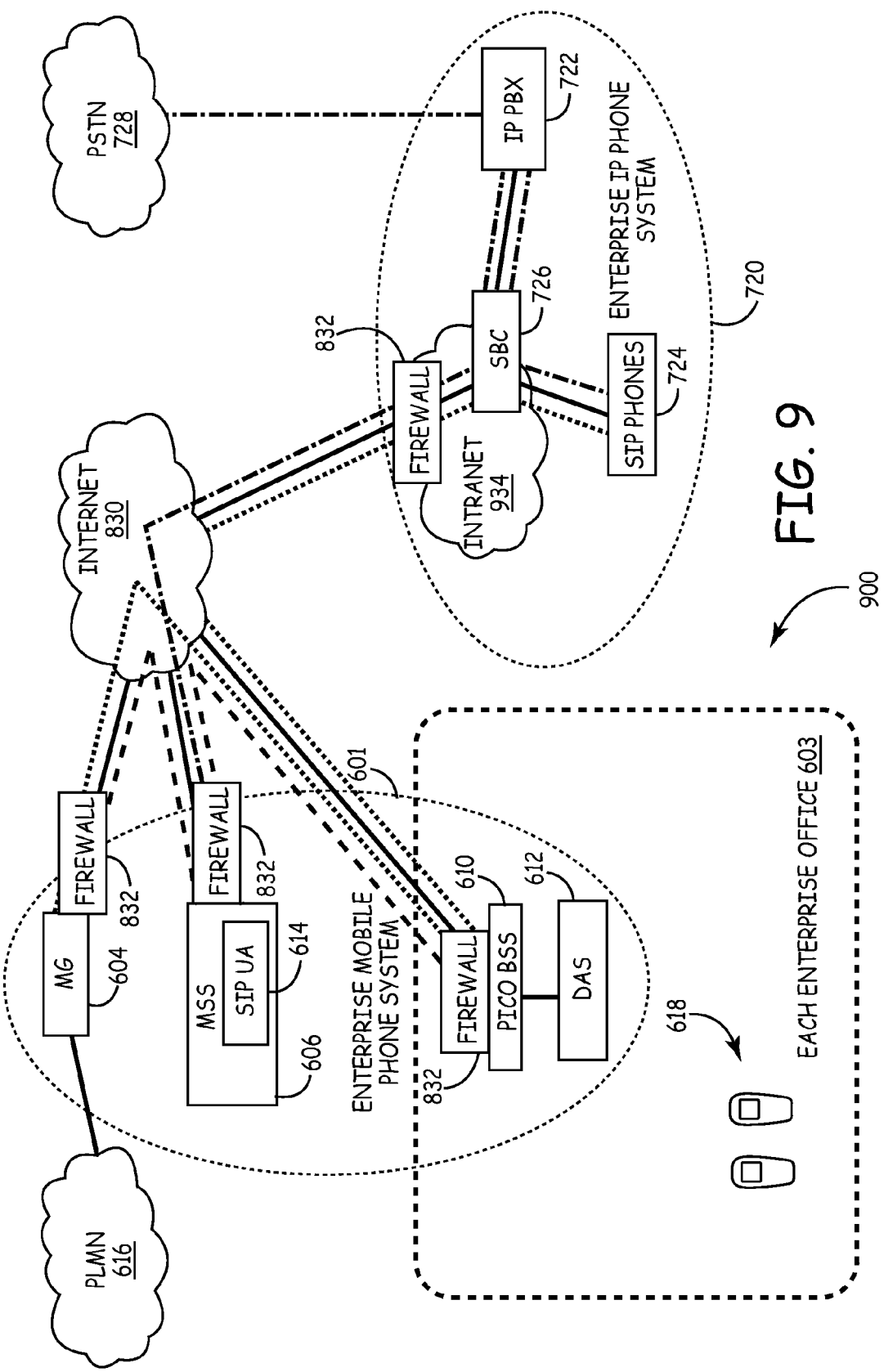
FIG. 9 illustrates an example of an architecture for an enterprise mobile network.

FIG. 9 illustrates an example architecture 900 that is similar to the one shown in FIGS. 7-8 (and those elements that are the same as the ones used in the examples shown in FIGS. 7-8 are referenced in FIG. 9 using the same reference numerals used in FIGS. 7-8).

The example architecture 900 shown in FIG. 9 is similar to the example shown in FIG. 7 except that the one shown in FIG. 9 uses an enterprise's Intranet 934 and the Internet 830 to integrate an IP PBX 722 and SIP Phones 724 into the system. In this example, the SIP user agent (SIP UA) 614 included in the MSS 606 is used to set up sessions between mobiles 618 that are being handled by the MSC-S 606 and SIP Phones 724 or the IP PBX 722. Sessions between mobiles 618 and the PSTN 728 can be setup using the SIP UA 614, in which case the connection to the PSTN 728 is provided by the IP PBX 722. In this example, the SBC 726, IP PBX 722 and SIP Phones 724 are located behind the firewall 832 that stands between the Intranet 934 and the Internet 830. Thus, the IP PBX 722 and SIP Phones 724 are assigned Intranet IP addresses, and communications that go through the SBC 726 involve a NAT traversal. In this embodiment, the SBC 726 manages the signaling and media streams for sessions established with such devices (implementing, for example, a Back-to-Back User-Agent). Also, the SBC 726 handles, for example, transcoding and NAT traversal (using, for example, the Interactive Connectivity Establishment (ICE) protocol or the Session Traversal Utilities for NAT (STUN) protocol).

In this example, IPSec and SRTP are needed to secure communications among the MSS 606, MG 604, the pico BSSs 610, and the enterprise IP phone system 720 that occur over the Internet 830. Also, QOS is needed to prioritize data flows and to help ensure a desired quality of service for communications among the MSS 606, MG 604, and the pico BSSs 610 that occur over the Internet 830.

Figure 10:
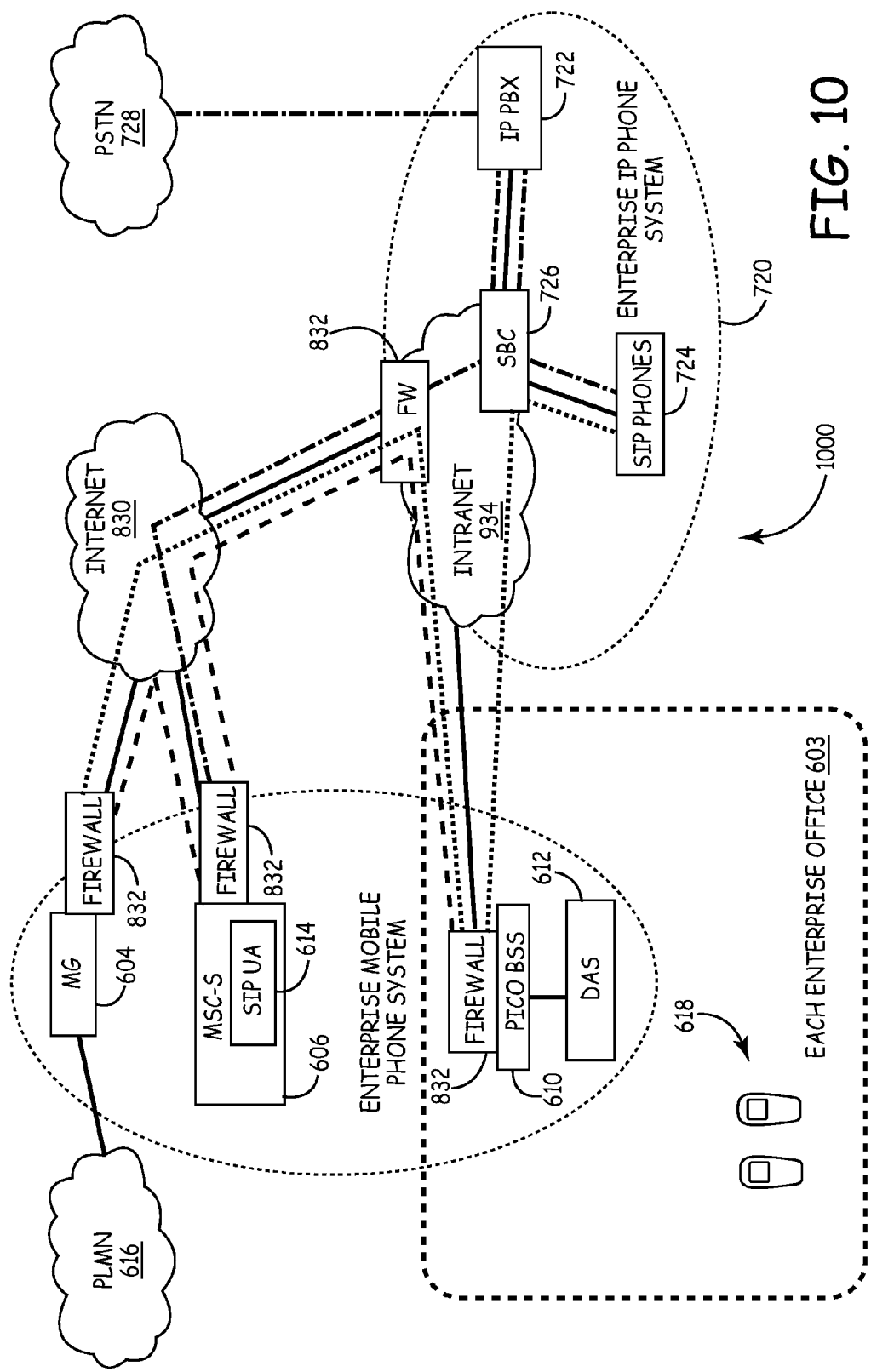
FIG. 10 illustrates an example of an architecture for an enterprise mobile network.

FIG. 10 illustrates an example architecture 1000 that is similar to the example shown in FIG. 9 (and those elements that are the same as the ones used in the example shown in FIG. 9 are referenced in FIG. 10 using the same reference numerals used in FIG. 9).

The example architecture 1000 shown in FIG. 10 is similar to the example shown in FIG. 9 except that each pico BSS/DAS deployment is also coupled to an enterprise's Intranet 934. As a result, each pico base station 610 is assigned an Intranet IP address and is behind the Intranet's firewall 832. Communications between the pico base station 610 and either the MSS 606 or the MG 604 traverse the Intranet's NAT and go over the Internet 830 and, therefore, IPSec/SRTP is used to secure such communications and QOS is used to help ensure a desired quality of service.

Figure 11:
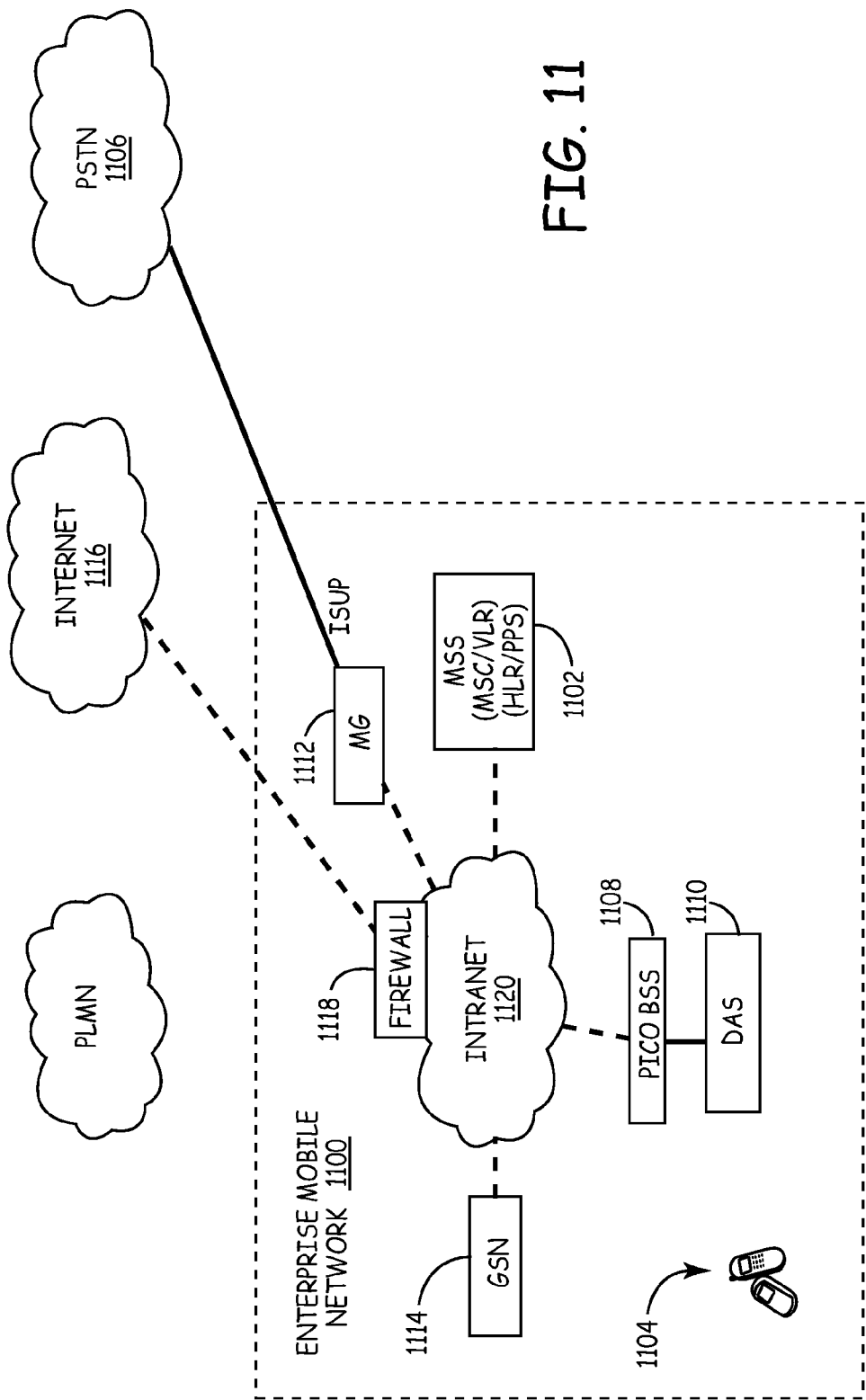
FIG. 11 illustrates a usage scenario in which the technology described here is used to provide wireless local loop (WLL) service for both voice and data within an enterprise.

The various architectures and techniques described above can be used in many service delivery scenarios. FIG. 11 illustrates one such scenario in which the technology described here is used to provide wireless local loop (WLL) service for both voice and data within an enterprise (for example, using low-power RF spectrum) to implement an enterprise mobile network 1100 to provide wireless service within the enterprise. In this scenario, a MSS 1102 provides MSC, HLR, and PPS services for local mobiles 1104 that are local subscribers to that enterprise mobile network 1100 and provides no roaming for any non-local mobiles that happen to roam into a coverage area associated with the enterprise. Sessions can be established between a local mobile 1104 and a non-local device via the PSTN 1106.

Wireless coverage and capacity is provided by the pico BSS 1108 and DAS 1110. A media gateway (MG) 1112 is used to communicatively couple the elements of the enterprise mobile network 1100 to the PSTN 1106 and, under control of the MSS 1102, to switch call media streams between mobiles 1104 and devices connected to the PSTN 1106 and to perform any needed transcoding. A GPRS Support Node (GSN) 1114 is included in the private network 1100 to provide GPRS data service to local mobiles 11104. The GSN 1114 is coupled to the Internet 1116 using a firewall 1118. The elements of the enterprise mobile network 1100 are communicatively coupled to one another using the enterprise's IP Intranet 1120.

Figure 12:
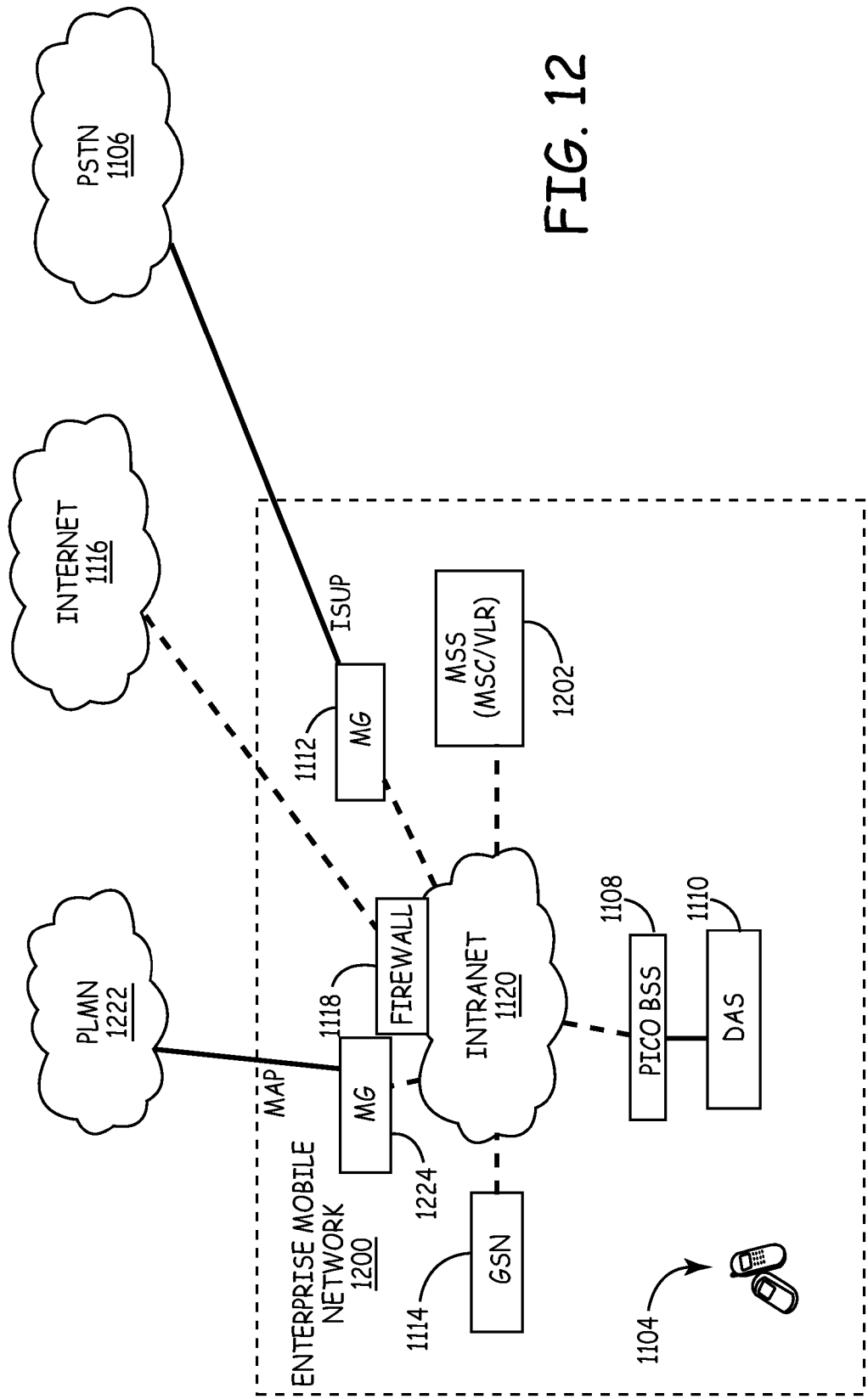
FIG. 12 illustrates a usage scenario in which the technology described here is used to provide only roaming service within an enterprise.

FIG. 12 illustrates another scenario in which the technology described here is used to provide only roaming service within an enterprise. In this example, the MSS 1202 implements MSC/VLR functionality to support such roaming. The enterprise mobile network 1200 is used to provide roaming services to other wireless networks and does not itself have any local subscribers. In other words, from the perspective of the wireless operator's network (PLMN 1222), the MSS 1202 of the enterprise mobile network 1200 appears to be another MSC/VLR of the PLMN 1222. The MSS 1202 of the enterprise network 1200 communicates with the other elements of the PLMN 1222 using the MAP protocol. A media gateway 1224 is used to communicatively couple the elements of the enterprise network 1200 to the PLMN 1222 and, under control of the MSS 1202, to switch call media streams between mobiles 1104 and devices connected to the PLMN 1222 and to perform any needed transcoding. Authentication and other functions are provided by the NSS functionality of the PLMN 1222. Otherwise, the enterprise mobile network 1200 is similar to the enterprise mobile network 1100 of FIG. 11.

Figure 13:
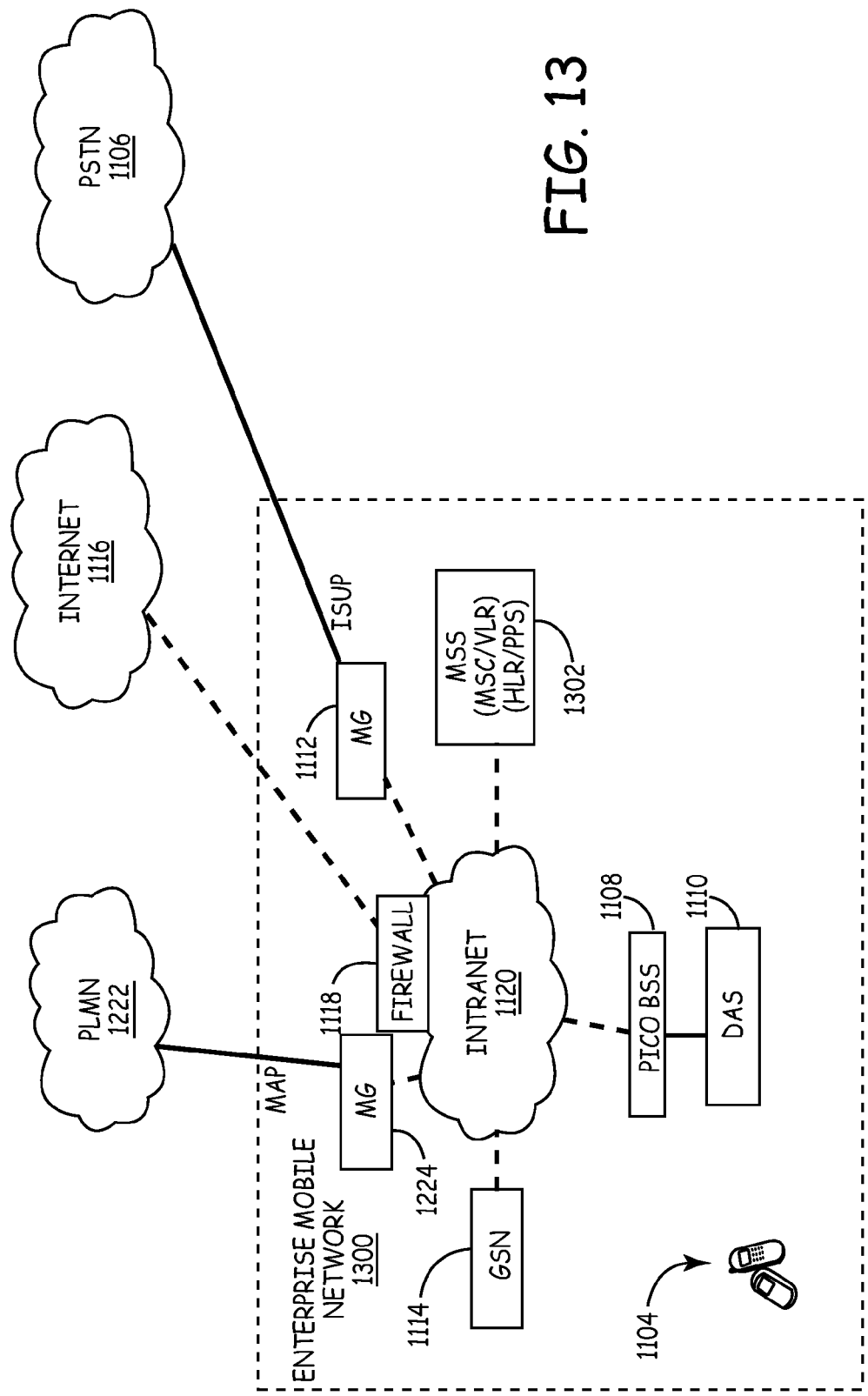
FIG. 13 illustrates a usage scenario in which an enterprise mobile network is configured to support both local subscribers and "hybrid" subscribers.

FIG. 13 illustrates another usage scenario in which an enterprise mobile network 1300 is configured to support both local subscribers and "hybrid" subscribers. As used herein, hybrid subscribers are both local subscribers of the enterprise mobile network 1300 and subscribers of the PLMN 1222. In one implementation, each hybrid subscriber has a local MSISDN that is assigned by the enterprise mobile network 1300 and a public MSISDN that is assigned by the PLMN 1222. When a hybrid subscriber enters a coverage area associated with enterprise mobile network 1300, a location update is performed with the MSS 1302 of the enterprise mobile network 1300. The local MSS 1302, in connection with such a location update, acts as a MSC/VLR for the hybrid subscriber's public MSISDN number and communicates with the public HLR (not shown) in the PLMN 1222 to complete a location update for the hybrid subscriber's public MSISDN number using the MAP/D protocol. Also, the local MSS 1302, in connection with such a location update, performs a location update for the hybrid subscriber's local MSISDN number and handles both the MSC/VLR and HLR/PPS functions for the location update. As a result, when a hybrid subscriber is within a coverage area associated with the enterprise mobile network 1300, the hybrid subscriber is able to receive calls made to both its local MSISDN number and its public MSISDN number. When the hybrid subscriber is outside of the coverage area of the enterprise mobile network 1300, the hybrid subscriber is only able to receive calls made to its public MSISDN number. The MSS 1302 of the enterprise mobile network 1300 also acts as a MSC/VLR to support handovers and the like, as well.

Figure 14:
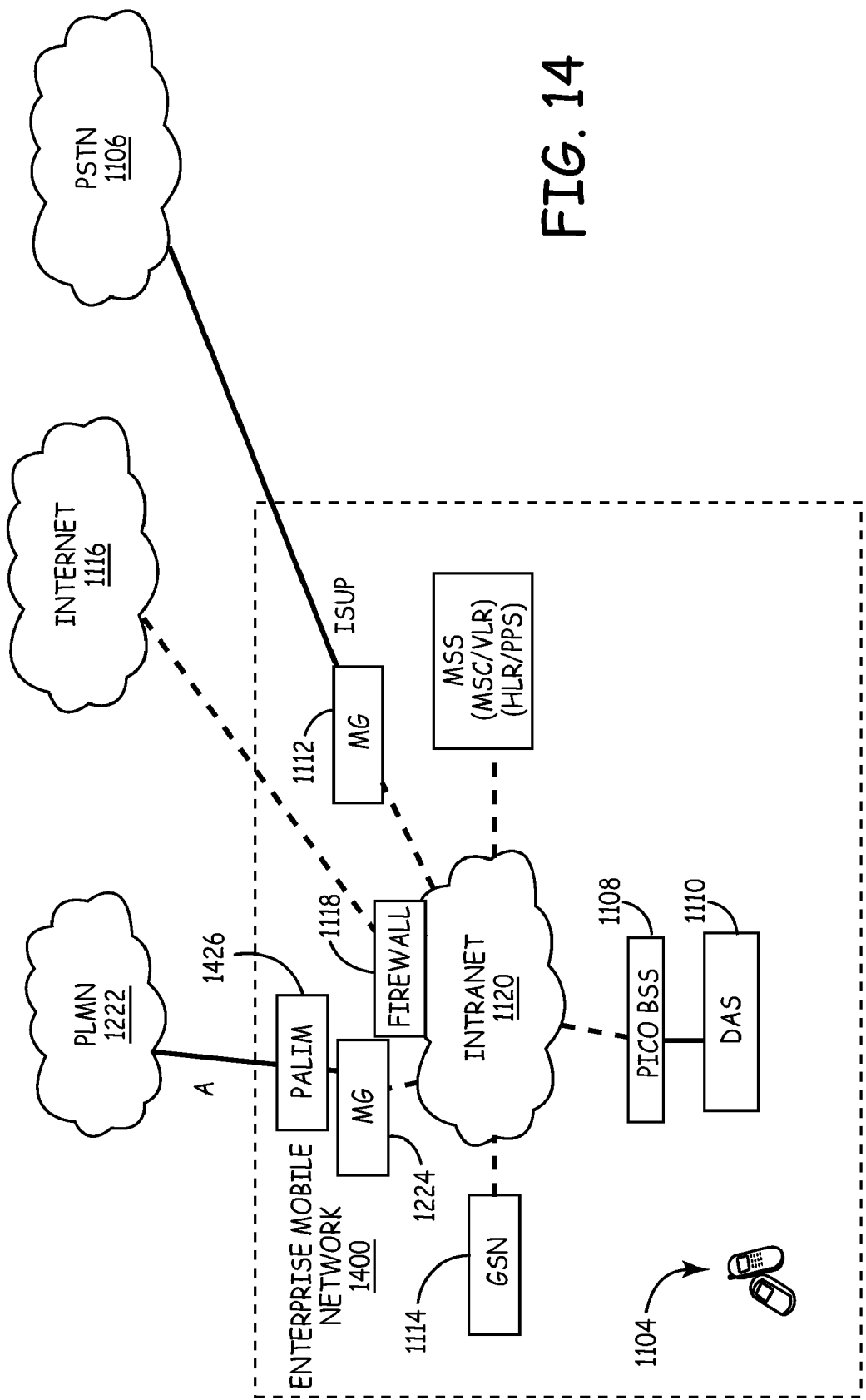
FIG. 14 illustrates a usage scenario in which an enterprise mobile network includes a Private A-link Intelligent Multiplexer (PALIM) switching function.

FIG. 14 illustrates another usage scenario in which an enterprise mobile network 1400 also includes Private A-link Intelligent Multiplexer (PALIM) switching function 1426 to support three types of subscribers—private subscribers (subscribers that are subscribers of only the private enterprise mobile network 1400), hybrid subscribers (subscribers that are subscribers of both the private enterprise mobile network 1400 and the public PLMN 1222), and public subscribers (subscribers that are subscribers of the public PLMN 1222 and not a subscriber of the private enterprise mobile network 1400). The PALIM switching technology 1426 enables the enterprise mobile network 1400 to provide local NSS functionality for private and hybrid subscribers that are within a coverage area of the enterprise mobile network 1400 while supporting roaming for public subscribers.

The PALIM function 1426 is used to logically couple the rest of the elements of the enterprise mobile network 1400 to the PLMN 1222 using the GSM A interface so that the enterprise mobile network 1400 appears, from the perspective of the PLMN 1222, as another base station subsystem of the PLMN 1222 in connection with providing service to public subscribers and to hybrid subscribers in connection with their public MSISDN numbers. However, for local subscribers and hybrid subscribers in connection with their private MSISDN numbers, the enterprise mobile network 1400 provides full NSS functionality (that is, MSC/VLR and HLR/PSS functions).

Figure 15:
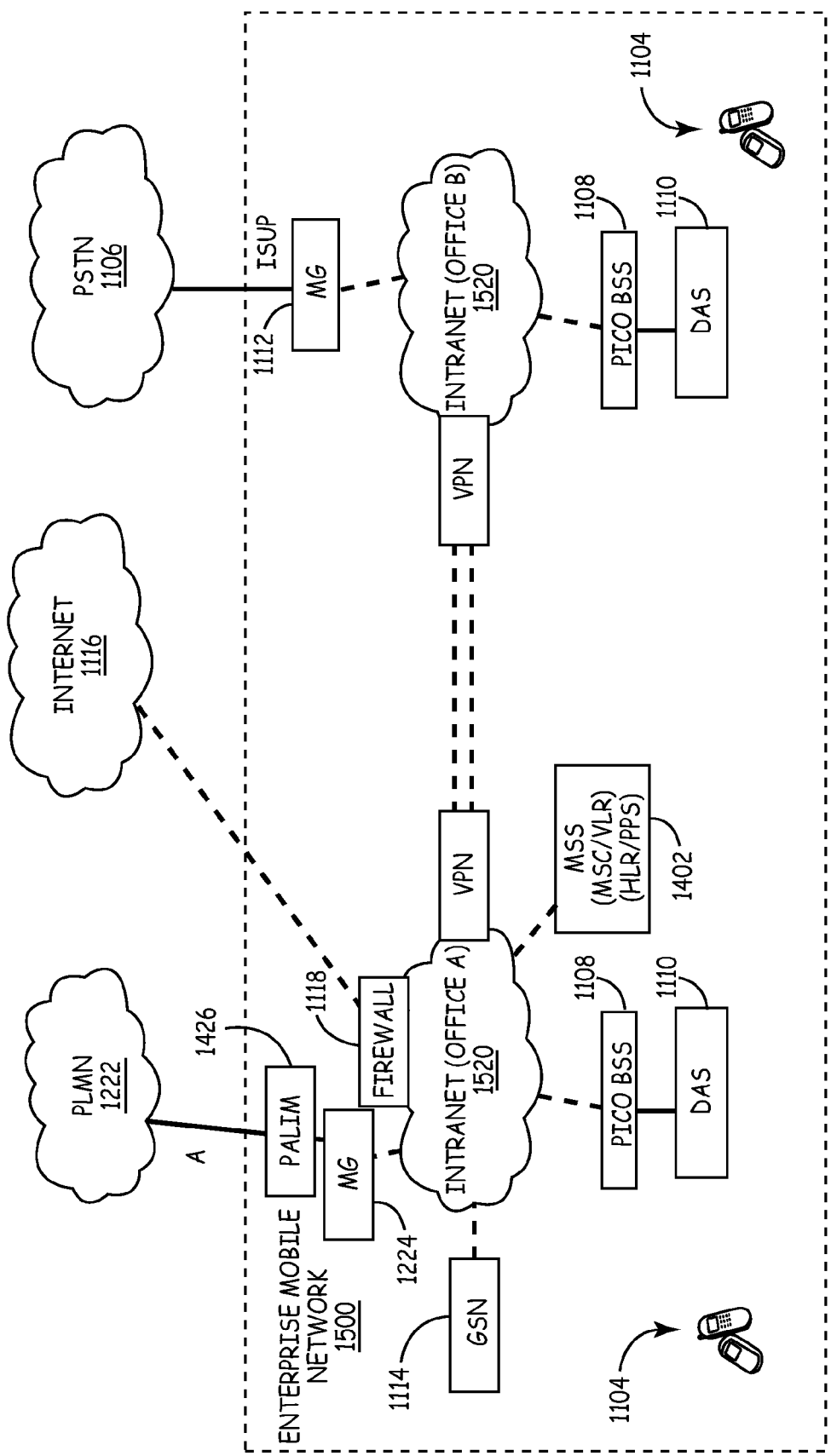
FIG. 15 illustrates an example in which an enterprise mobile network is implemented across two offices of an enterprise.

FIG. 15 illustrates an example in which an enterprise mobile network 1500 is implemented across two offices of an enterprise. In this example, two intranets 1520 (in respective offices A and B) are communicatively coupled to one another using a virtual private network (VPN) connection (using, for example, the IPSec protocol). In this example, the MSS 1402 and GSN 1114 are deployed in Office A, while the PSTN connection and associated MG 1112 is located in Office B. Mobile network traffic is routed among the Intranets 1520 using the underlying IP network technology.

Figure 16:
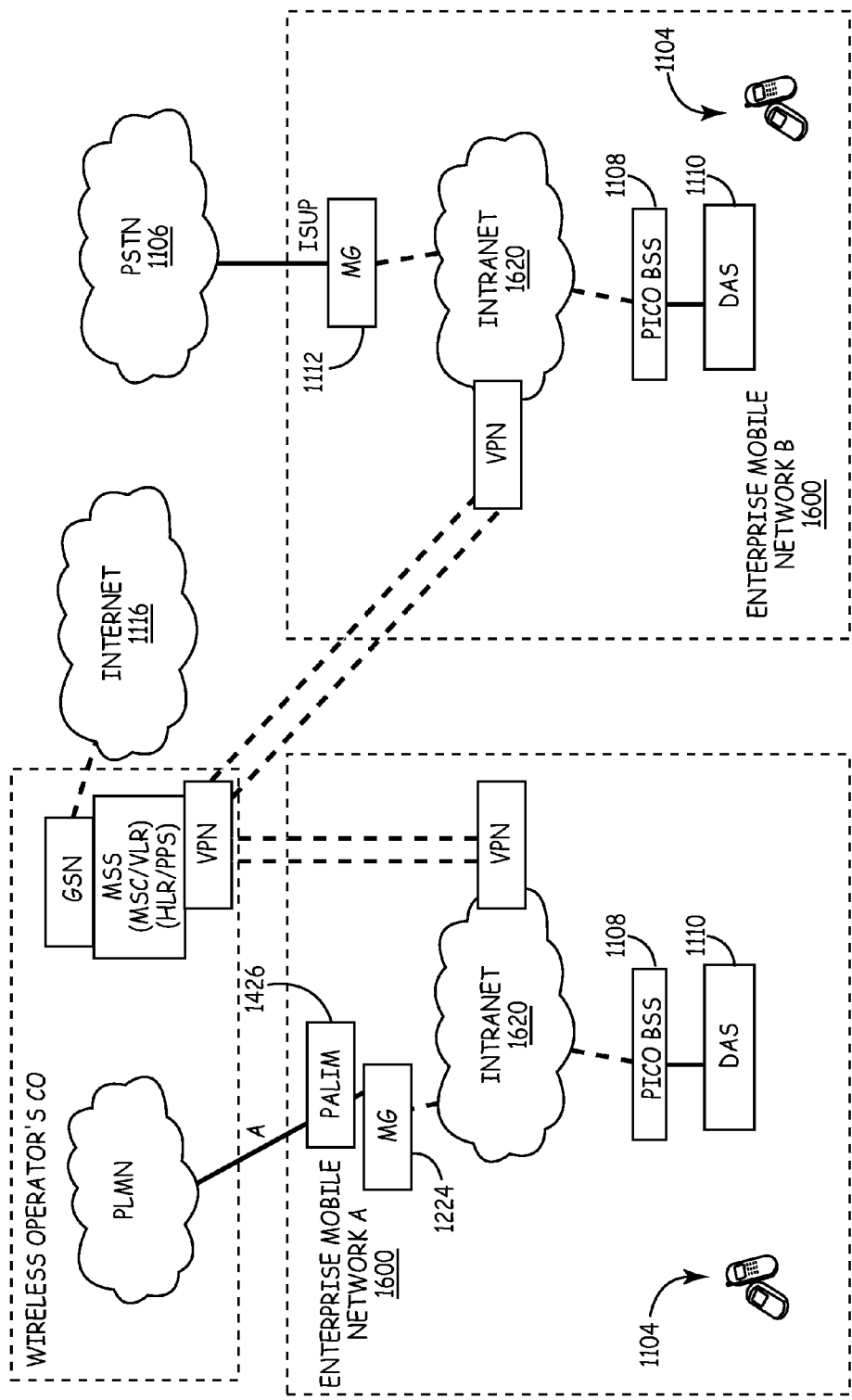
FIG. 16 illustrates an example in which two separate enterprise mobile networks share a GSN and MSS.

FIG. 16 illustrates an example in which two separate enterprise mobile networks 1600 share a GSN 1614 and MSS 1602. The GSN 1614 and MSS 1602 are located in a wireless operator's central office 1628 and are connected to the respective intranets 1620 of the two enterprises using a VPN. Mobile network traffic is routed among the Intranets 1620 and the MSS 1602 and GSN 1614 using the underlying IP network technology.

Figure 17:
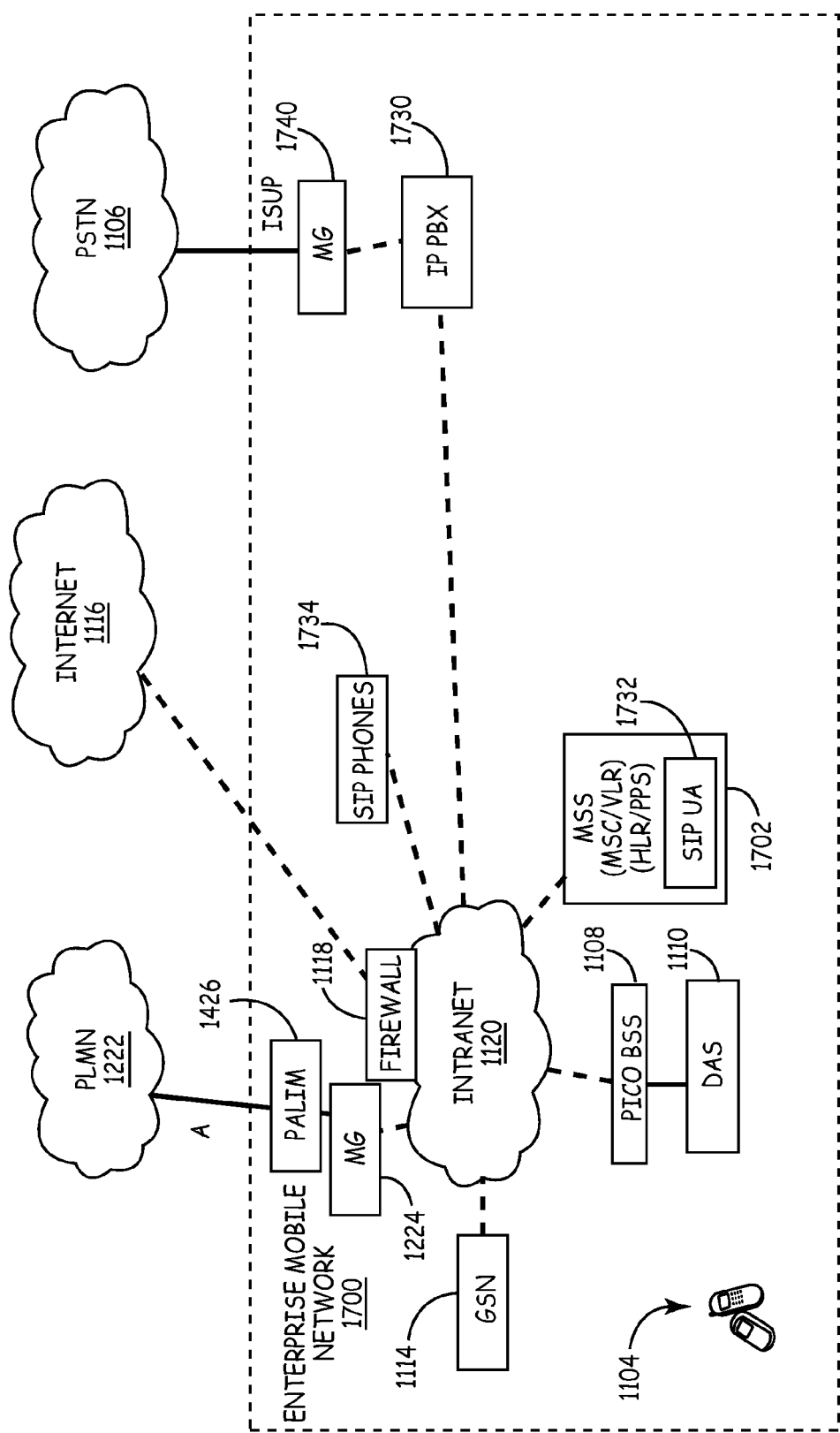
FIG. 17 illustrates an example in which an IP PBX is integrated with an enterprise mobile network.

FIG. 17 illustrates an example in which an IP PBX 1730 is integrated with the enterprise mobile network 1700. In this embodiment, a SIP User Agent (SIP UA) 1732 included in the MSS 1702 enables wireless mobile devices 1104 to use the SIP protocol to establish sessions with SIP phones 1734 that are attached to the IP PBX 1730. The IP PBX 1730 is coupled to the PSTN 1106 via a media gateway 1740.

In this example, the IP PBX 1730 can be configured to associate PBX extension numbers with local subscribers of the enterprise mobile network 1700 (for example, private and hybrid subscribers). For example, where a local subscriber also has a fixed SIP phone 1734 that has a particular PBX extension number, the IP PBX 1730 and MSS 1702 can be configured to associate the same PBX extension number with the local subscriber's mobile 1104 and calls made to that PBX extension cause both the SIP phone 1734 and the mobile 1104 to ring. In this way, the mobile devices 1104 can act as wireless extensions of the IP PBX 1730.

Figure 18:
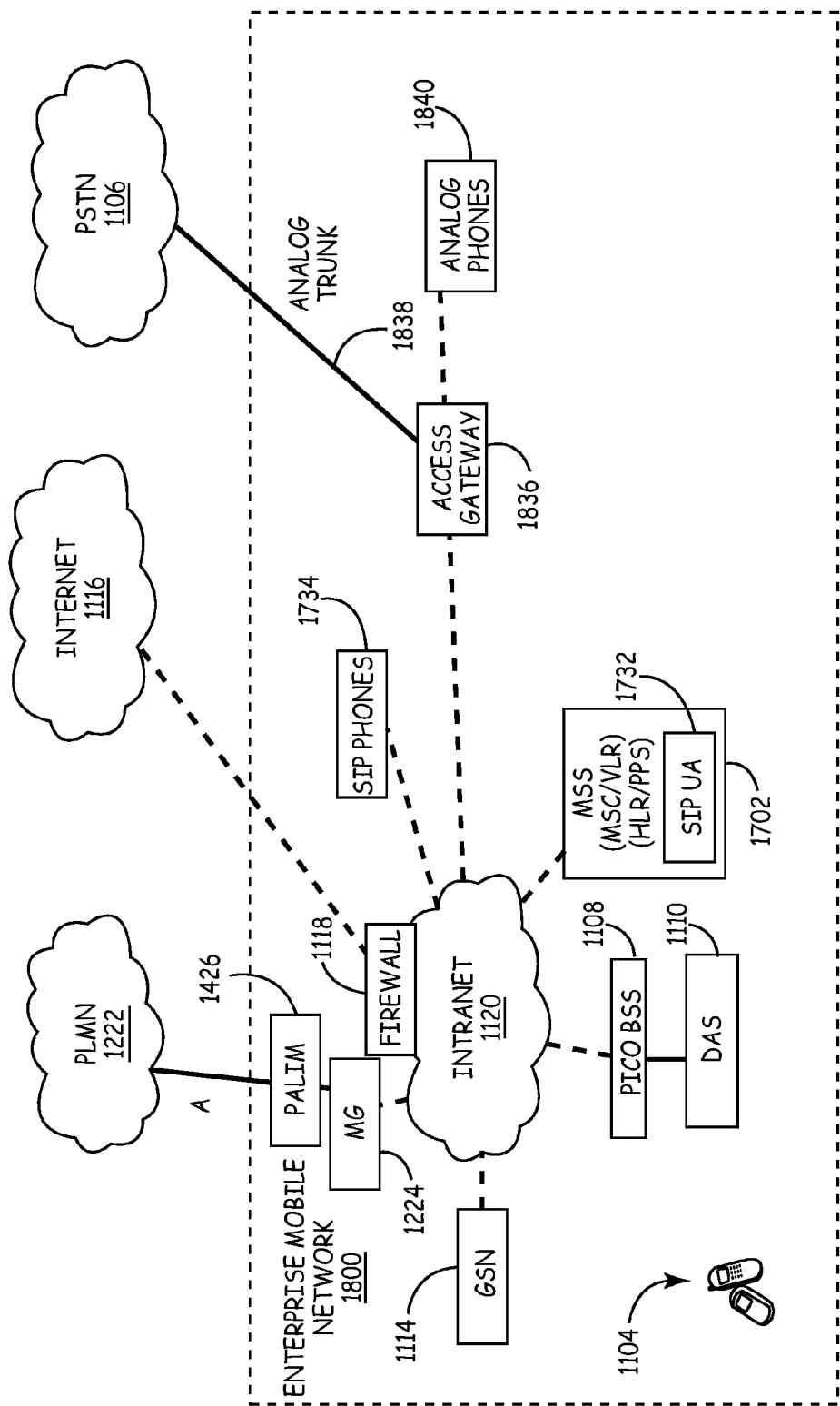
FIG. 18 illustrates an example in which an access gateway is integrated with an enterprise mobile network.

FIG. 18 illustrates an example in which an access gateway 1836 is integrated with the enterprise mobile network 1800. The access gateway 1836 is used to couple SIP devices to other types of voice networks. In the particular embodiment shown in FIG. 18, the access gateway 1836 is used to couple SIP devices to the PSTN 1106 using an analog trunk line 1838. In this example, the SIP User Agent 1732 included in the MSS 1702 enables the MSS 1702 to use the access gateway 1836 to gain access to the devices and networks coupled to it (such as the SIP phones 1734 and analog phones 1840).

FIGS. 19-36 illustrate additional examples of services and usage scenarios that can be implemented using the technology described here.

Figure 19:
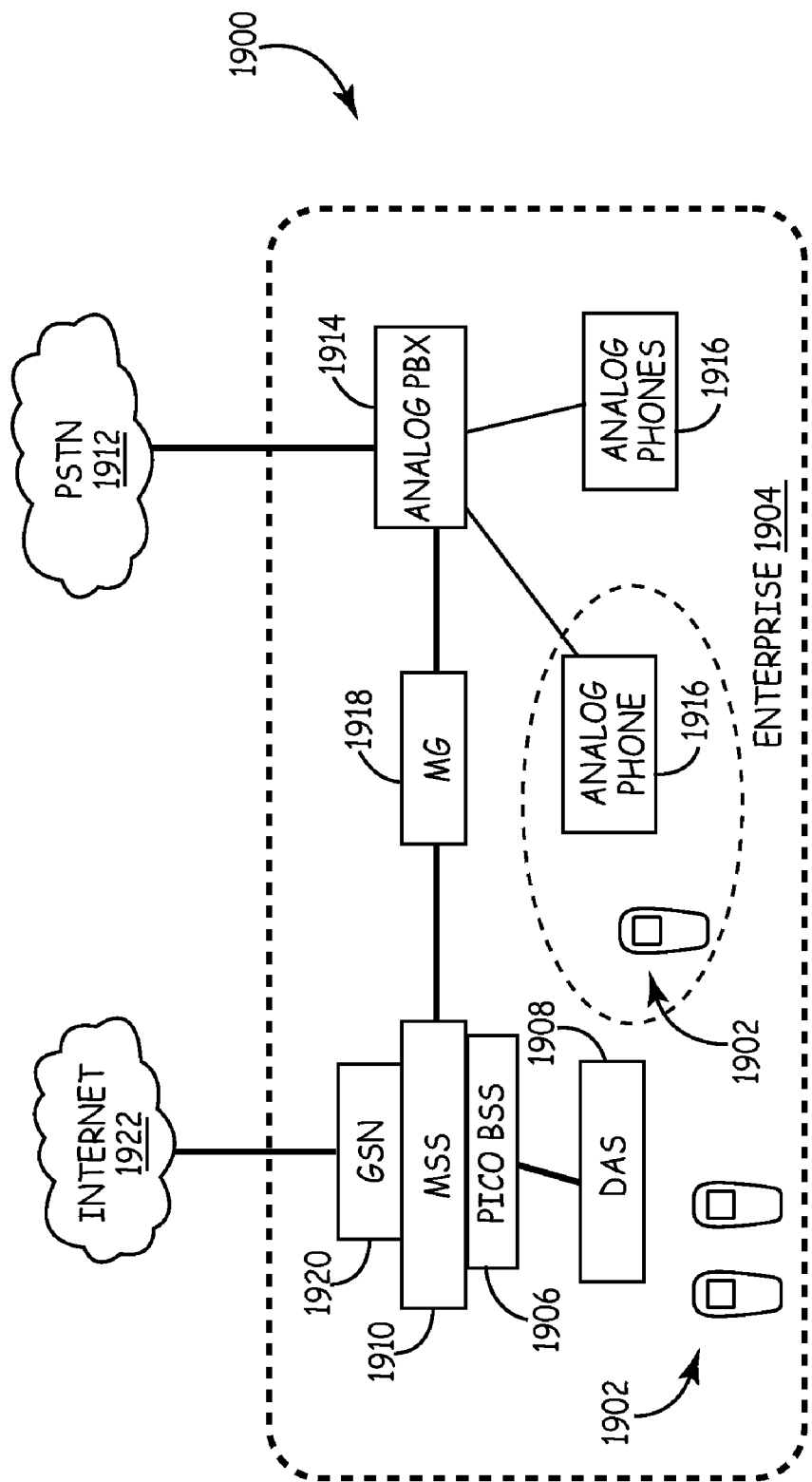
FIG. 19 illustrates an example of an enterprise mobile network.

FIG. 19 illustrates one example of an enterprise mobile network 1900 in which the technology described above (for example, a multiple-TRX pico base station and DAS) can be deployed to provide coverage and capacity to GSM/GPRS mobile devices 1902 located within an enterprise 1904. In this example, the enterprise mobile network 1900 is not coupled to any PLMN and is also referred to here as an "isolated" enterprise mobile network 1900. The enterprise 1904 must gain access to suitable GSM spectrum, which is typically licensed spectrum. In this example, one way in which an enterprise 1904 may access suitable GSM spectrum for use in such an isolated enterprise mobile network 1900 is to obtain a license to use low-power RF spectrum that is available in some jurisdictions.

In this example, a pico base station subsystem 1906 is coupled to a DAS 1908. The enterprise mobile network 1900 also comprises a mobile switching subsystem (MSS) 1910 that is coupled to the pico base station subsystem 1906 and is also located in the enterprise 1904. The MSS 1910 provides all the NSS related functions for the enterprise mobile network 1900. The MSS 1910 is coupled to the PSTN 1912 via an analog PBX 1914. The analog PBX 1914 is also coupled to various analog phones 1916. A media gateway 1918 is used provided to perform any needed media conversions between the media formats used by the MSS 1910 and pico base station subsystem 1906 and the media formats used by the analog PBX 1914.

The enterprise mobile network 1900 also includes a GSN 1920 that is coupled to the Internet 1922. The GSN 1920 is used to provide GPRS data service to the mobile device 1902 while they are camped on the enterprise mobile network 1900.

In this example, the enterprise mobile network 1900 is configured to be used with the same mobile devices 1902 that the users use when they are outside of the coverage area of the enterprise mobile network 1900. That is, in this example, the mobile devices 1902 (and the associated subscriber identity module (SIM) cards) have a home PLMN that is not the enterprise mobile network 1900. The enterprise mobile network 1900 is configured to be used with these mobile devices 1902 without requiring the users to change their subscriber identity module (SIM) cards. If the coverage area of a user's home PLMN overlaps with the coverage area of the enterprise mobile network 1900, the user may need to manually select the appropriate network to use.

Each local user of the enterprise mobile network 1900 registers with the network 1900 using the International Mobile Equipment Identity (IMEI) assigned to the user's mobile device 1902 (which the user can access from the mobile device 1902 itself via the device's user interface). Each local user (also referred to here as a "local subscriber") is assigned a local phone number (local MSISDN) that is used by the enterprise mobile network 1900 to provide wireless cellular service to that local subscriber. In other words, each such user has a regular public mobile phone number that is used in the user's home PLMN and a local mobile phone number that can be used in the enterprise mobile network 1900.

Also, in this example, each local subscriber has an associated analog phone 1916 that has an associated PBX extension number. In this example, the user can use the call forwarding function provided by the user's home PLMN to, while the user is not camped onto the home PLMN, forward calls that are made to the user's public phone number to the user's PBX extension number. In this example, the PBX 1914 supports a twin ring feature and is configured so that when a call is made to the user's PBX extension number, the PBX 1914 causes both user's analog fixed phone 1916 and mobile phone 1902 (using the user's local mobile phone number) to ring for that call. The PBX 1914 rings the mobile phone 1902 by forwarding the associated signaling and call data to the MSS 1910.

A similar approach can be used with an IP based PBX.

Figure 20:
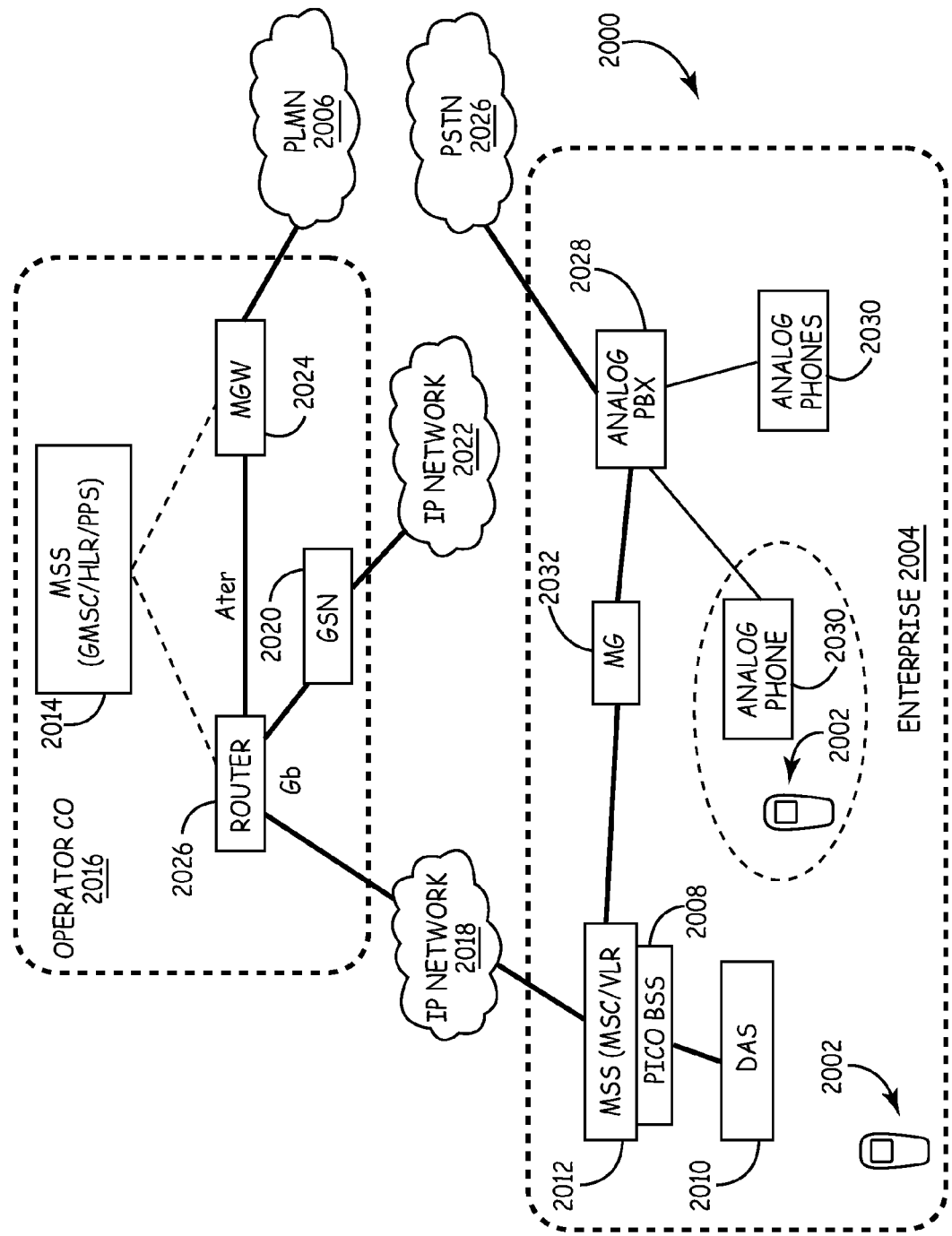
FIG. 20 illustrates an example of an enterprise mobile network.

FIG. 20 illustrates another example of an enterprise mobile network 2000 in which the technology described above (for example, a multiple-TRX pico base station and DAS) can be deployed to provide coverage and capacity to GSM/GPRS mobile devices 2002 located within an enterprise 2004.

In this example, the enterprise mobile network 2000 gains access to RF spectrum by entering into an agreement with the operator of a PLMN 2006. In this example, the enterprise mobile network 2000 is configured to support local subscribers and non-local subscribers (that is, roamers).

A pico base station subsystem 2008 and DAS 2010 is provided within each office of the enterprise 2004. Also, a local MSS 2012 is provided in the enterprise 2004 that is coupled to the pico base station subsystem 2008. The local MSS 2012 is also coupled to a central MSS 2014 located in the operator's central office 2016. In this example, the local MSS 2012 serves as the MSC/VLR for those mobile devices 2002 that are located within a coverage area associated with the enterprise mobile network 2000, and the central MSS 2014 implements the GMSC and HLR functionality for all of the offices of the enterprise 2004 and the local subscribers thereof. Each local MSS 2012 is coupled to the central MSS 2014 over an IP Network 2018 using the MAP and ISUP protocols.

The enterprise mobile network 2000 also includes a GSN 2020 that is coupled to the mobile devices 2002 in each office of the enterprise 2004 via the IP network 2018. The GSN 2020 is used to provide GPRS data service to the mobile device 2002 while they are camped on the enterprise mobile network 2000. The GSN 2020 is also connected to an IP network 2022 via which the GPRS service is provided. The central office 2016 also includes a media gateway (MGW) 2024 that switches calls and performs any needed media conversion. The central office 2016 also includes a router 2026 for coupling the MSS 2014, GSN 2020, and MGW 2024 to the IP network 2018.

Each local MSS 2012 is also coupled to the PSTN 2026 via an analog PBX 2028. The analog PBX 2028 is also coupled to various analog phones 2030. A media gateway 2032 is used provided to perform any needed media conversions between the media formats used by local MSS 2012 and pico base station subsystem 2008 and the media formats used by the analog PBX 2028.

In this example, the HLR in the central MSS 2014 is the HLR for the enterprise's local subscribers and is managed by the operator of the PLMN 2006. As a result, the local subscribers can be registered using their IMSI numbers. The local subscribers are otherwise provided service in a manner similar to that described above in connection with FIG. 19 (including, for example, the integration with PBX 2028).

In this example, the enterprise mobile network 2000 is also used to provide wireless service to non-local subscribers (including subscribers of the PLMN 2006 and roamers). For such subscribers, the local MSS 2012 serves as the MSC/VLR and the roaming service is provided using the roaming arrangements and functionality in the PLMN 2006, which the local MSS 2012 accesses via the IP network 2018.

Figure 21:
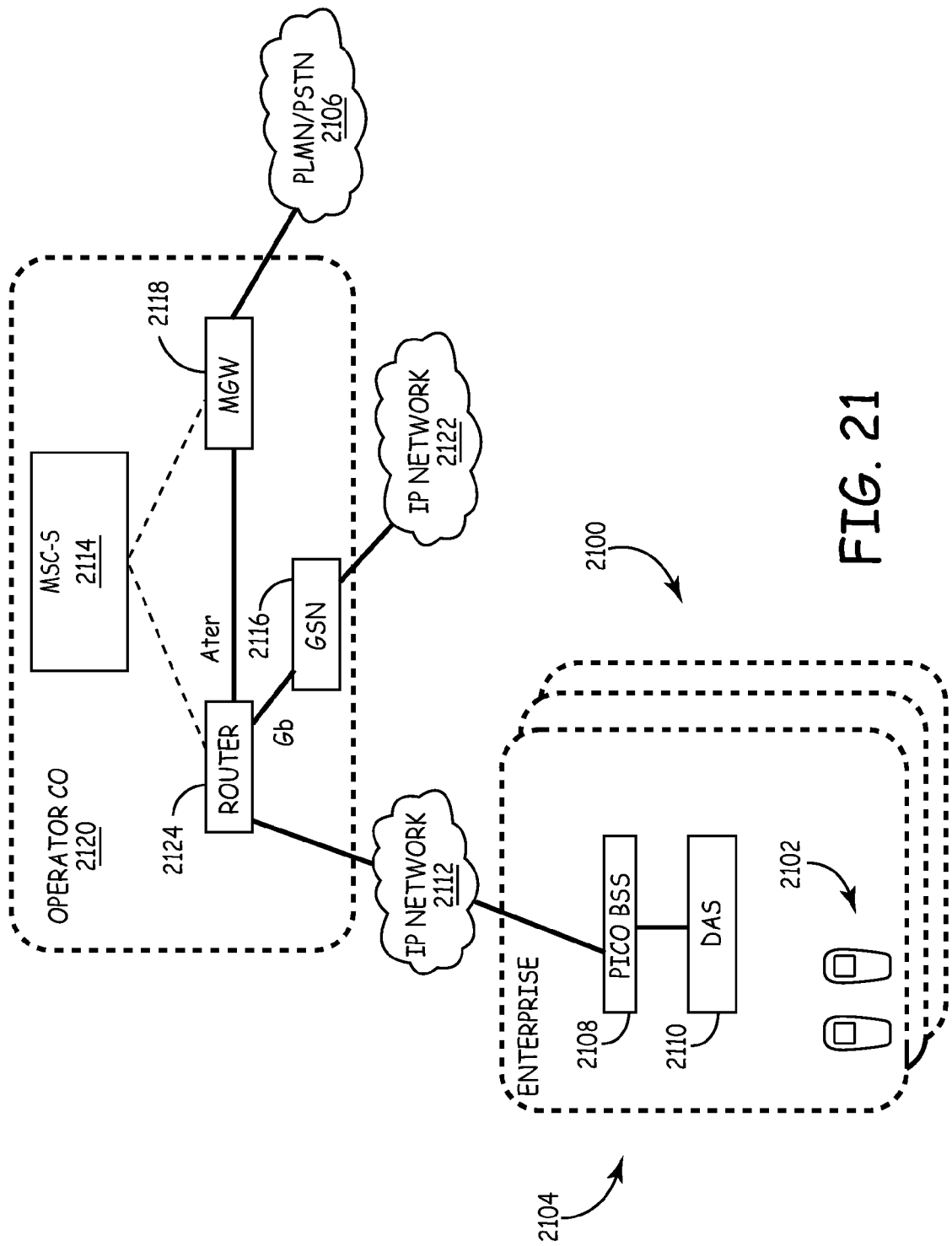
FIG. 21 illustrates an example of an enterprise mobile network.

FIG. 21 illustrates another example of an enterprise mobile network 2100 in which the technology described above (for example, a multiple-TRX pico base station and DAS) can be deployed to provide coverage and capacity to GSM/GPRS mobile devices 2102 located within an enterprise 2104.

In this example, base station capacity is deployed within each office of the enterprise 2104 and all NSS functions are performed in a PLMN 2106. The enterprise mobile network 2100 does not have local subscribers and, instead, is a part of the PLMN 2106. More specifically, in this example, a pico base station subsystem 2108 and DAS 2110 is provided within each office of the enterprise 2104. Each pico base station subsystem 2108 is coupled to the NSS functionality of the PLMN 2106 via an IP network 2112. For example, as shown in FIG. 21, a MSS 2114, a GSN 2116, and a MGW 2118 are deployed within a central office 2120 of the operator of the PLMN 2106. The MSS 2114, in this example, serves as the MSC/VLR for the mobile devices 2102 that are within a coverage area associated with the enterprise 2104.

The GSN 2116 is used to provide GPRS data service to the mobile device 2102 while they are camped on the enterprise mobile network 2100. The GSN 2116 is also connected to an IP network 2122 via which the GPRS service is provided. The central office 2120 also includes and MGW 2118 that switches calls and performs any needed media conversion. The central office 2120 also includes a router 2124 for coupling the MSS 2114, GSN 2116, and MGW 2118 to the IP network 2112.

Also, the enterprise mobile network 2100 can be configured to implement various types of location based services such as the use of a call routing table to selectively route calls, Computer Supported Telecommunications Applications (CSTA)/Call Detail Record (CDR) integration, location based tariffs, virtual HLR/VLR support, local switching, and distributed mobile station roaming number (MSRN) support.

Figure 22:
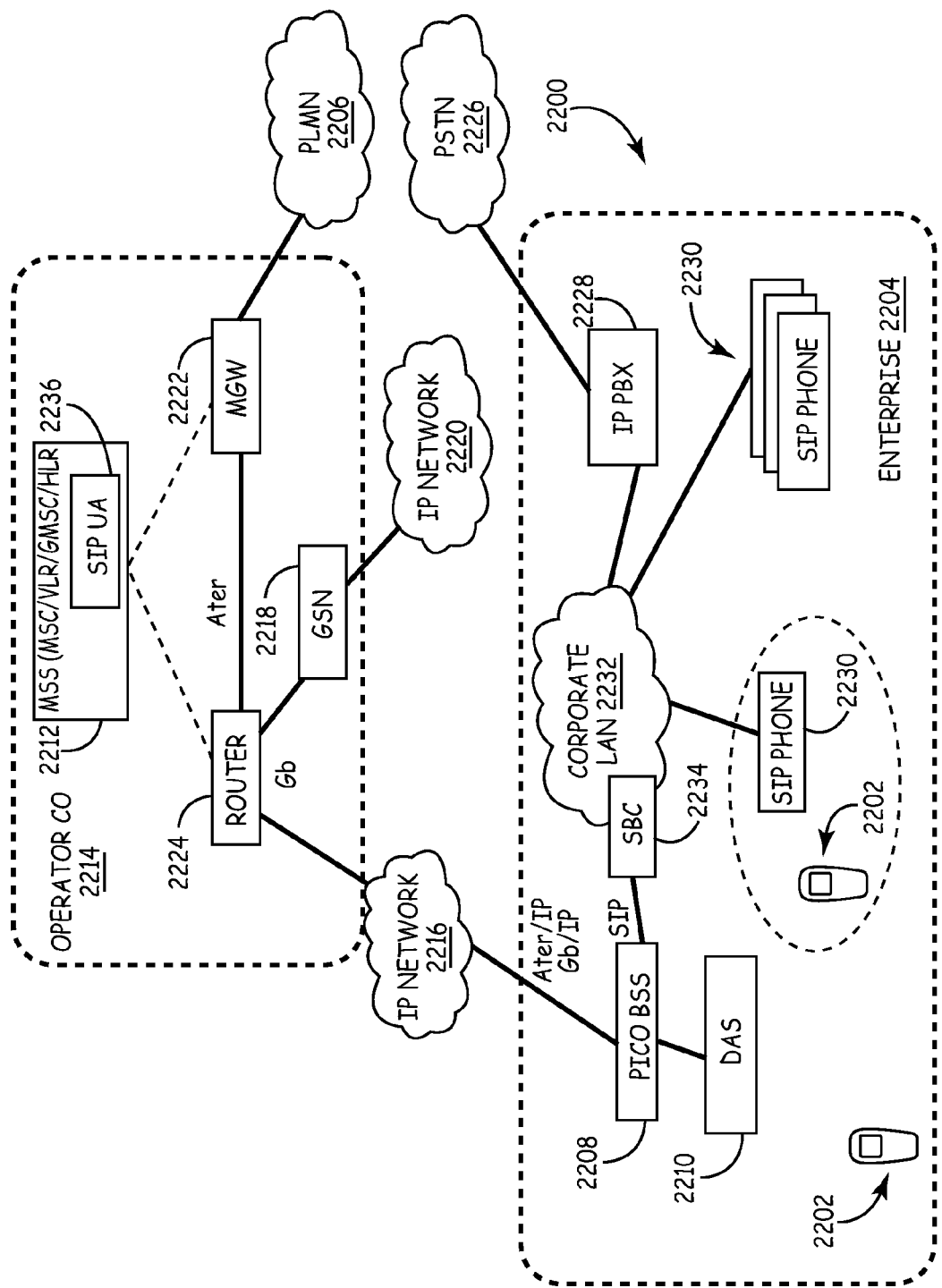
FIG. 22 illustrates an example of an enterprise mobile network.

FIG. 22 illustrates another example of an enterprise mobile network 2200 in which the technology described above (for example, a multiple-TRX pico base station and DAS) can be deployed to provide coverage and capacity to GSM/GPRS mobile devices 2202 located within an enterprise 2204.

This example illustrates how the enterprise mobile network 2200 can be integrated with an IP PBX. In this example, the enterprise mobile network 2200 gains access to RF spectrum by entering into an agreement with the operator of a PLMN 2206. In this example, enterprise mobile network 2200 is configured to support local subscribers and non-local subscribers (that is, roamers).

A pico base station subsystem 2208 and DAS 2210 is provided within each office of the enterprise 2204. Also, each pico base station subsystem 2208 is coupled to a MSS 2212 located in the operator's central office 2214. In this example, the MSS 2212 serves as the MSC/VLR for those mobile devices 2202 that are located within a coverage area associated with the enterprise mobile network 2200. Also, the MSS 2212 implements the GMSC and HLR functionality for all of the local subscribers of all of the offices of the enterprise 2202. Each pico base station subsystem 2208 is coupled to the MSS 2212 over an IP Network 2216 using an "Ater over IP" interface.

The enterprise mobile network 2200 also includes a GSN 2218 that is coupled to the mobile devices 2202 in each office of the enterprise 2204 via the IP network 2216. The GSN 2218 is used to provide GPRS data service to mobile devices 2202 while they are camped on to the enterprise mobile network 2200. The GSN 2218 is also connected to an IP network 2220 via which the GPRS service is provided. The central office 2214 also includes a media gateway (MGW) 2222 that switches calls and performs any needed media conversion. The central office 2214 also includes a router 2224 for coupling the MSS 2212, GSN 2218, and MGW 2222 to the IP network 2216.

In this example, the HLR in the MSS 2212 is the HLR for the enterprise's local subscribers and is managed by the operator of the PLMN 2206. As a result, the local subscribers can be registered using their IMSI numbers.

In this example, the enterprise mobile network 2200 is also used to provide wireless service to non-local subscribers (including subscribers of the PLMN 2206 and roamers). For such subscribers, the MSS 2212 serves as the MSC/VLR and the roaming service is provided using the roaming arrangements and functionality in the PLMN 2206, which the MSS 2212 accesses via the IP network 2216.

Each pico base station subsystem 2208 is also coupled to the PSTN 2226 via an IP PBX 2228. The IP PBX 2228 is also coupled to various SIP phones 2230. Each pico base station subsystem 2208 is coupled to the IP PBX 2228 via a corporate IP LAN 2232. A SIP session border controller (SBC) 2234, which manages the signaling and media streams for sessions established with mobile devices 2202. In this example, the SBC 2234 routes SIP signaling data for such sessions between a SIP User Agent (SIP UA) 2236 in the MSS 2212 and the IP PBX 2228 as needed by routing media streams for such sessions among the pico base station subsystem 2208 (for ultimate communication with the mobile devices 2202) and the SIP phones 2230. Also, in this example, the SBC 2234 handles transcoding media streams communicated between the SIP phones 2230 and the mobile devices 2202 and any NAT traversals.

As with the example described above in connection with FIG. 19, in this example, the enterprise mobile network 2200 is configured to be used with the same mobile devices 2202 that the users use when they are outside of the coverage area of the enterprise mobile network 2200. That is, in this example, the mobile devices 2202 (and the associated SIM cards) have a home PLMN that is not the enterprise mobile network 2200. The enterprise mobile network 2200 is configured to be used with these mobile devices 2202 without requiring the users to change their SIM cards. If the coverage area of a user's home PLMN overlaps with the coverage area of the enterprise mobile network 2200, the user may need to manually select the appropriate network to use.

Each local subscriber of the enterprise mobile network 2200 is registered with the network 2200 and is assigned a local phone number (local MSISDN) that is used by the enterprise mobile network 2200 to provide wireless cellular service to that local subscriber. In other words, each such local subscriber has a regular public mobile phone number (also referred to here as the "public MSISDN" or "home MSISDN") that is used in the user's home PLMN 2206 (and for which the user has an associated record in the main home HLR in the home PLMN 2206) and a local mobile phone number that is used in the enterprise mobile network 2200 (and for which the user has an associated record in the enterprise HLR that the MSS 2212 maintains). Also, in this example, each local subscriber has an associated SIP phone 2230 that has an associated PBX extension number, which is managed by the IP PBX 2228.

Figure 23:
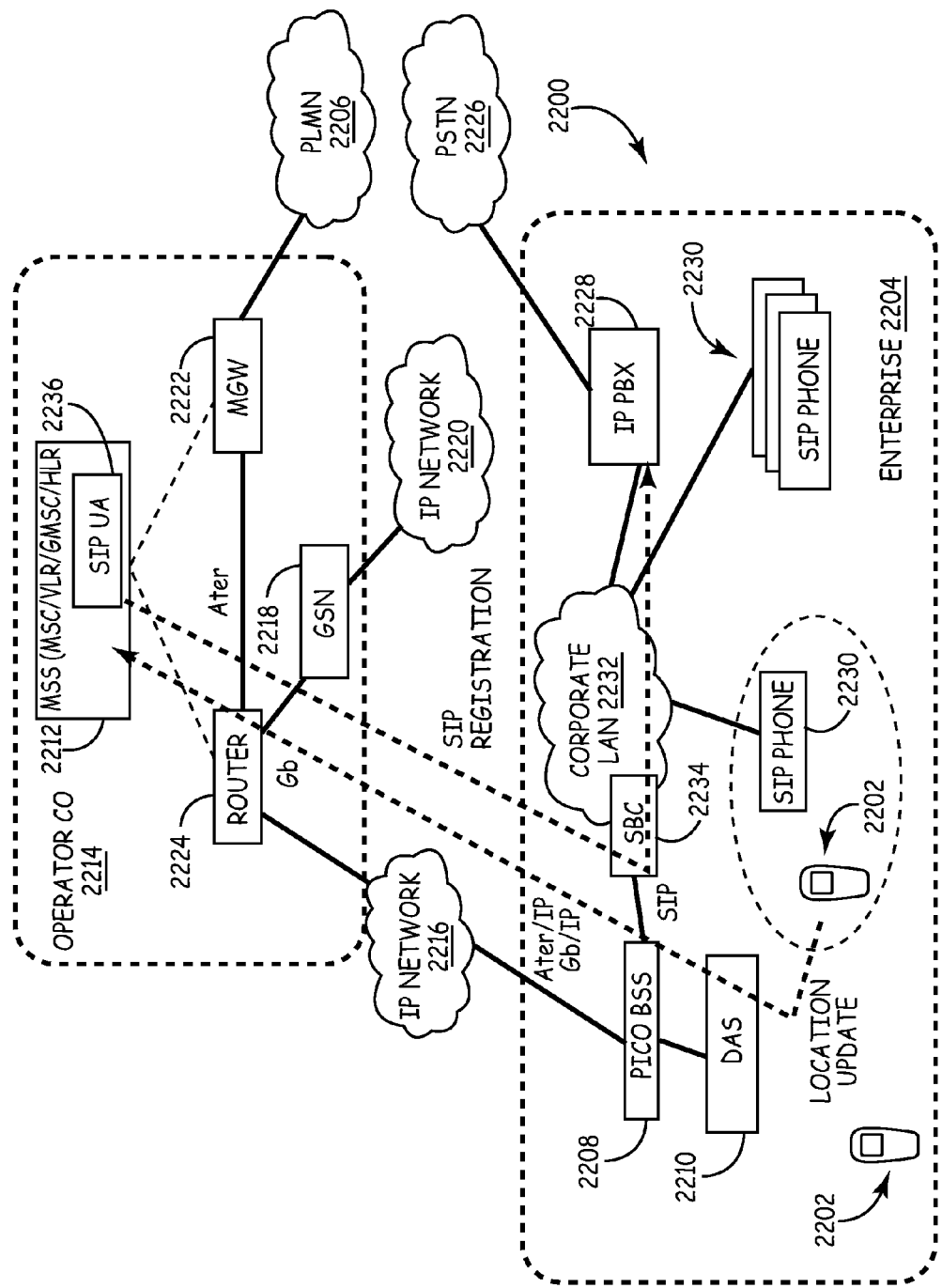
FIG. 23 illustrates how a mobile device is registered with the IP PBX of FIG. 22 in connection with a location update.

As shown in FIG. 23, when a local subscriber moves into a coverage area associated with the enterprise mobile network 2200, the local subscriber's mobile device 2202 performs a location update with the MSS 2212. This location update is forwarded from the pico base station subsystem 2208 to the MSS 2212 over the IP Network 2216. The MSS 2212, acting as an MSC/VLR, handles the location update in the normal manner to update the local subscriber's information in the home HLR in the home PLMN 2206 with respect to the local subscriber's home MSISDN number. This enables the local subscriber to receive calls made to the subscriber's home MSISDN number while the local subscriber is camped onto the enterprise mobile network 2200. In this example, the subscriber's local MSISDN number is registered with the enterprise HLR that the MSS 2212 maintains. Also, the SIP UA 2236 in the MSS 2212 registers with the IP PBX 2228 so that the IP PBX 2228 will contact it when calls are made to the local subscriber's PBX extension using the twin ring feature of the IP PBX 2228.

Figure 24:
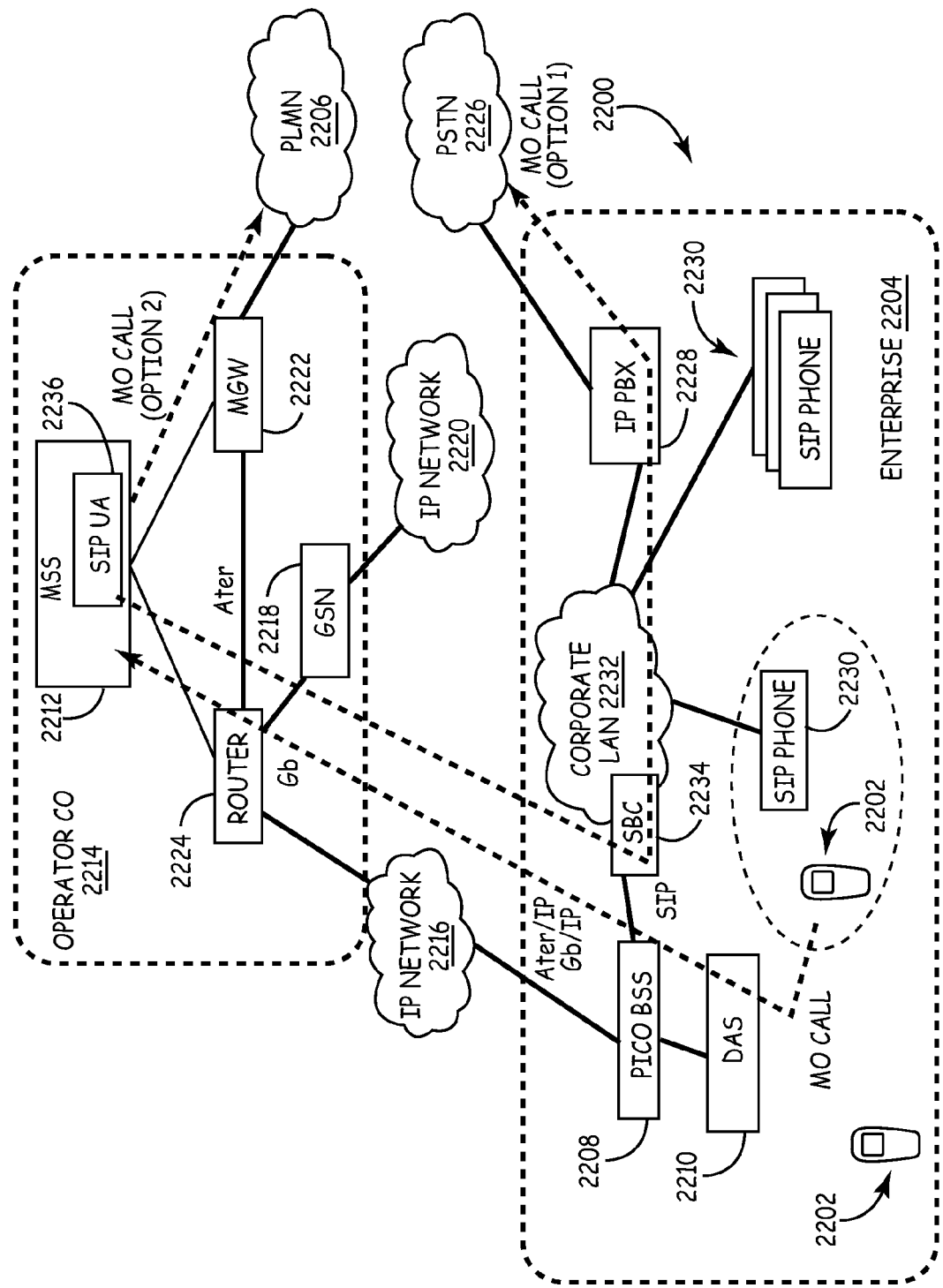
FIG. 24 illustrates how a mobile device that is camped onto the enterprise mobile network of FIG. 22 can make a call to a device connected to the PSTN.

FIG. 24 illustrates how a mobile device 2202 that is camped onto the enterprise mobile network 2200 can make a call to a device connected to the PSTN 2206. As shown in FIG. 24, when the mobile device 2202 calls such an external device, the signaling data for the mobile originated (MO) leg of the call is communicated to the MSS 2212. In this example, there are two options for completing the call. In the first option, the MSS 2212 is configured to set-up the call using the IP PBX 2228. This is done by having the SIP UA 2236 in the MSS 2212 make the call using IP PBX 2228. In other words, the SIP UA 2236 appears to be another SIP Phone 2230 that is making a call. Once the call is setup, the media streams for the MO leg of the call are routed between the mobile device 2202 and the IP PBX 2228 using the corporate LAN 2232 and the SBC 2234, where the SBC 2234 performs any needed media conversions between the media formats used by mobile device 2202 and the format used by the IP PBX 2228 and the IP PBX 2228 performs any needed media conversions between the format used by the IP PBX 2228 and format used by the PSTN 2226. In the second option, the MSS 2212 is configured to set-up the call using the PLMN 2206 like any other GSM call. Once the call is setup, the media streams for the MO leg of the call are routed between the mobile device 2202 and the PLMN 2206 using the MGW 2222, which performs any needed media conversions. With both options, the pico base station subsystem 2208 is used to provide the radio link to the mobile device 2202.

Figure 25:
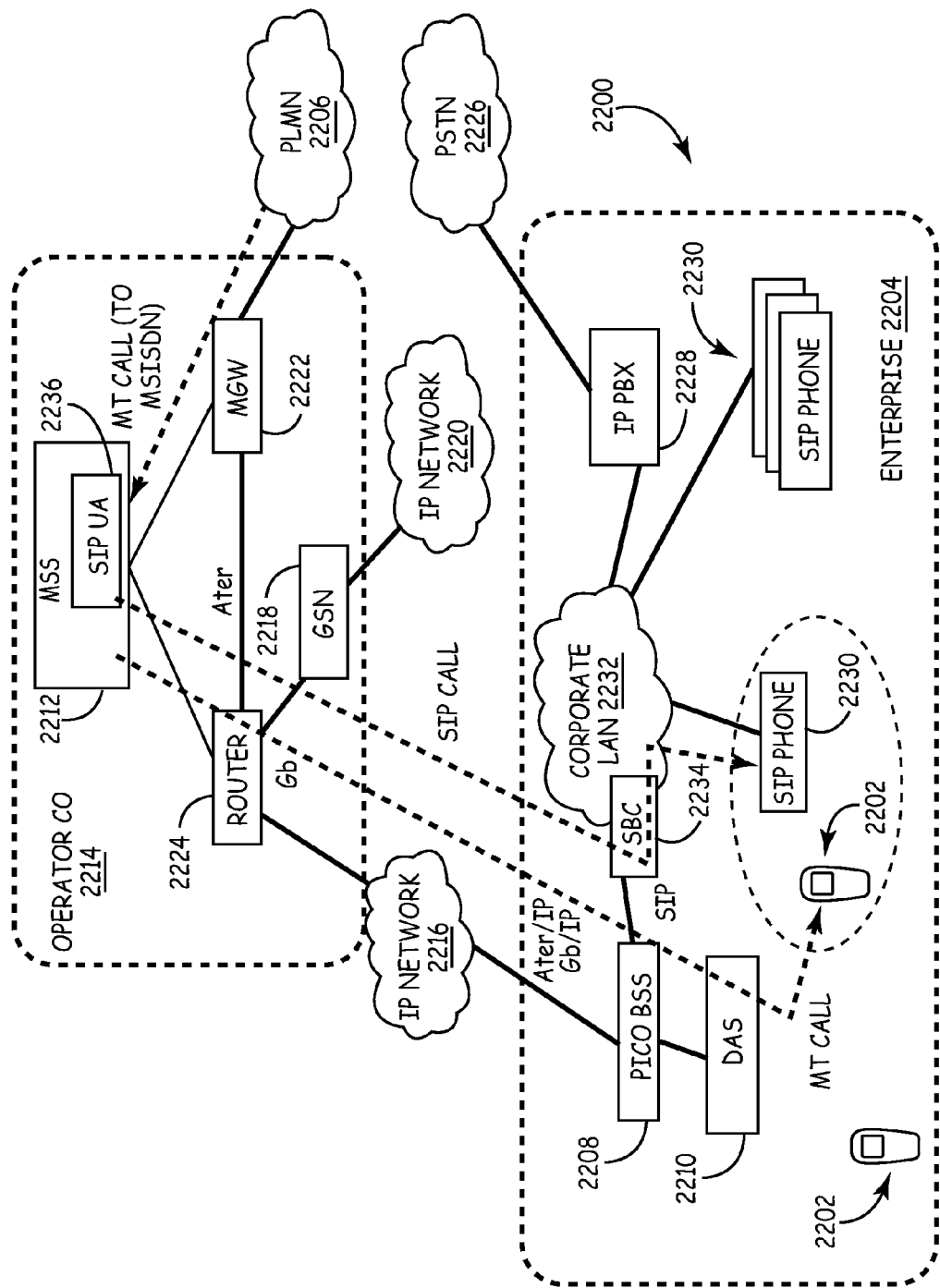
FIG. 25 illustrates how a call that is made to a MSISDN number associated with a local subscriber can be completed in the enterprise mobile network shown in FIG. 22.

FIG. 25 illustrates how a call that is made to a MSISDN number associated with a local subscriber (for example, the subscriber's local MSISDN or public home MSISDN) can be completed using the enterprise mobile network 2200 of FIG. 22. When a local subscriber is camped onto the enterprise mobile network 2200 and a call is made to a MSISDN number associated with that local subscriber, the PLMN 2206 will route the signaling associated with the call to the MSS 2212.

The MSS 2212 acts as the MSC/VLR for the PLMN 2206 and will cause the local subscriber's mobile device 2202 to ring by sending appropriate signaling messages to the mobile device 2202 using the pico base station subsystem 2208. If the local subscriber uses the mobile device 2202 to answer the call, the MSS 2212 sets up the media streams for the call in the conventional GSM manner using the pico base station subsystem 2208 and MGW 2222. The MSS 2212 will also cause the SIP phone 2230 associated with that local subscriber to ring as well. The MSS 2212 does this by having the SIP UA 2230 setup a call with the IP PBX 2228 that is addressed to the local subscriber's associated PBX extension. The IP PBX 2228 will ring the SIP phone 2230 associated with that PBX extension. If the local subscriber uses the SIP phone 2230 to answer the call, the MSS 2212 sets up media streams for the call between the PLMN 2206 (and the calling phone) and the SIP phone 2230 using the MGW 2222 (which performs any needed media conversions between the media formats used by the SIP phone 2230 (for example, the RTP format) and the GSM media formats used in the PLMN 2206).

Figure 26:
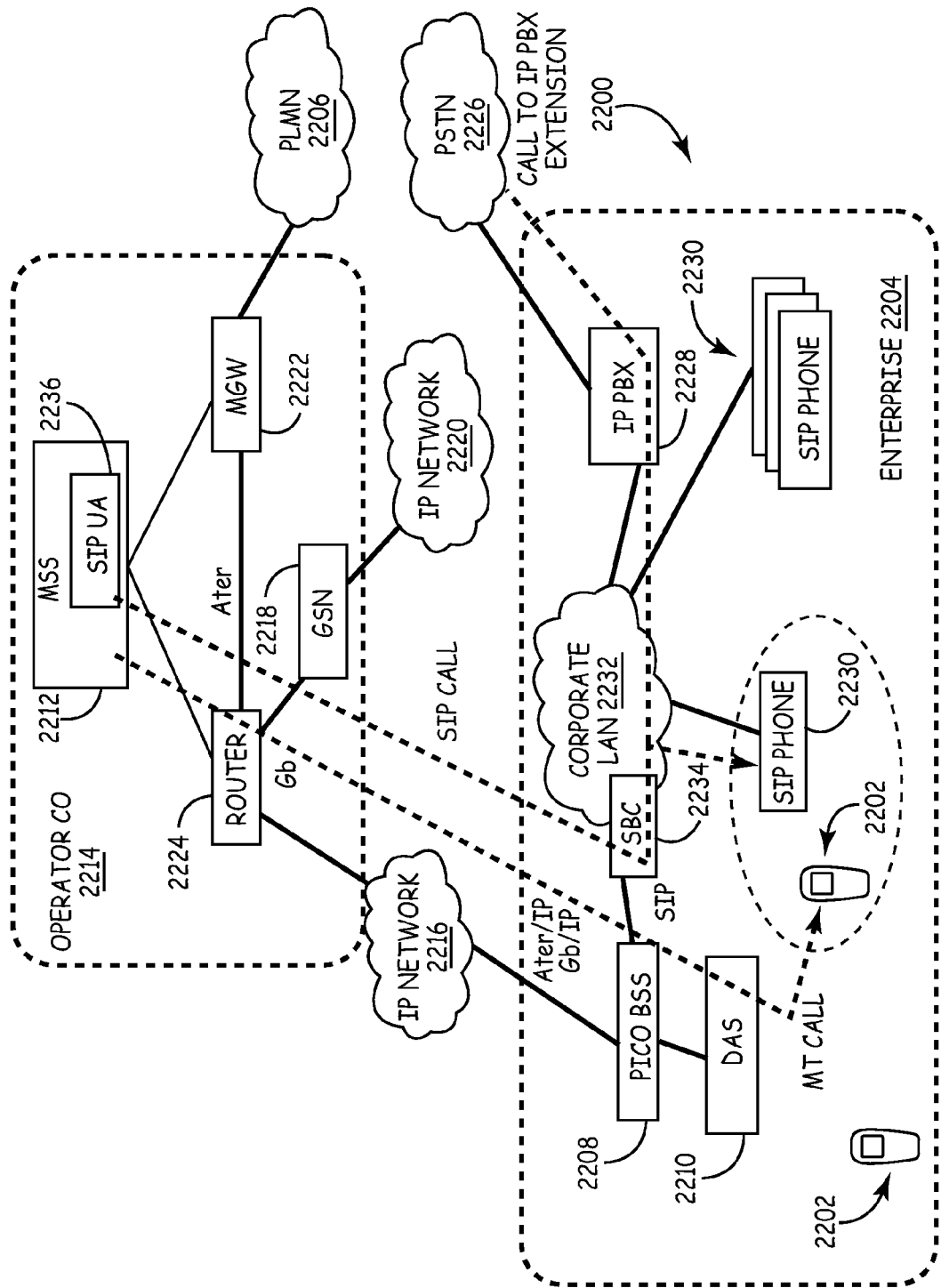
FIG. 26 illustrates how a call that is made to a PBX extension number associated with a local subscriber can be completed in the enterprise mobile network shown in FIG. 22.

FIG. 26 illustrates how a call that is made to a PBX extension number associated with a local subscriber can be completed in using the enterprise mobile network 2200 of FIG. 22. When a local subscriber is camped onto the enterprise mobile network 2200 and a call is made to a PBX extension associated with that local subscriber, the PSTN 2226 will route the signaling associated with such a call to the IP PBX 2228. The IP PBX 2228, in the conventional manner, will cause the local subscriber's SIP phone 2230 to ring by sending appropriate signaling messages to the SIP phone 2230. If the local subscriber uses the SIP phone 2230 to answer the call, the IP PBX 2228 sets up the media streams for the call in the conventional manner between the IP PBX 2228 and the SIP phone 2230. In this example, the IP BPX 2228 will also cause the mobile device 2202 associated with that local subscriber to ring as well (using the twin ring feature of the IP PBX 2228). The IP PBX 2228 does this by interacting with the SIP UA 2236 in the MSS 2212 as if the SIP UA 2236 was another SIP Phone. In response to this, the SIP UA 2236 causes the mobile device 2202 to ring using the pico base station subsystem 2208. If the local subscriber uses the mobile device 2202 to answer the call, the MSS 2212 sets up the call between the mobile device 2202 and the IP PBX 2228. Once the call is setup, the media streams for the call are routed between the mobile device 2202 and the IP PBX 2228 using the corporate LAN 2232 and the SBC 2234, where the SBC 2234 performs any needed media conversions between the media formats used by mobile device 2202 and the format used by the IP PBX 2228 and the IP PBX 2228 performs any needed media conversions between the format used by the IP PBX 2228 and the format used by the PSTN 2226.

Figure 27:
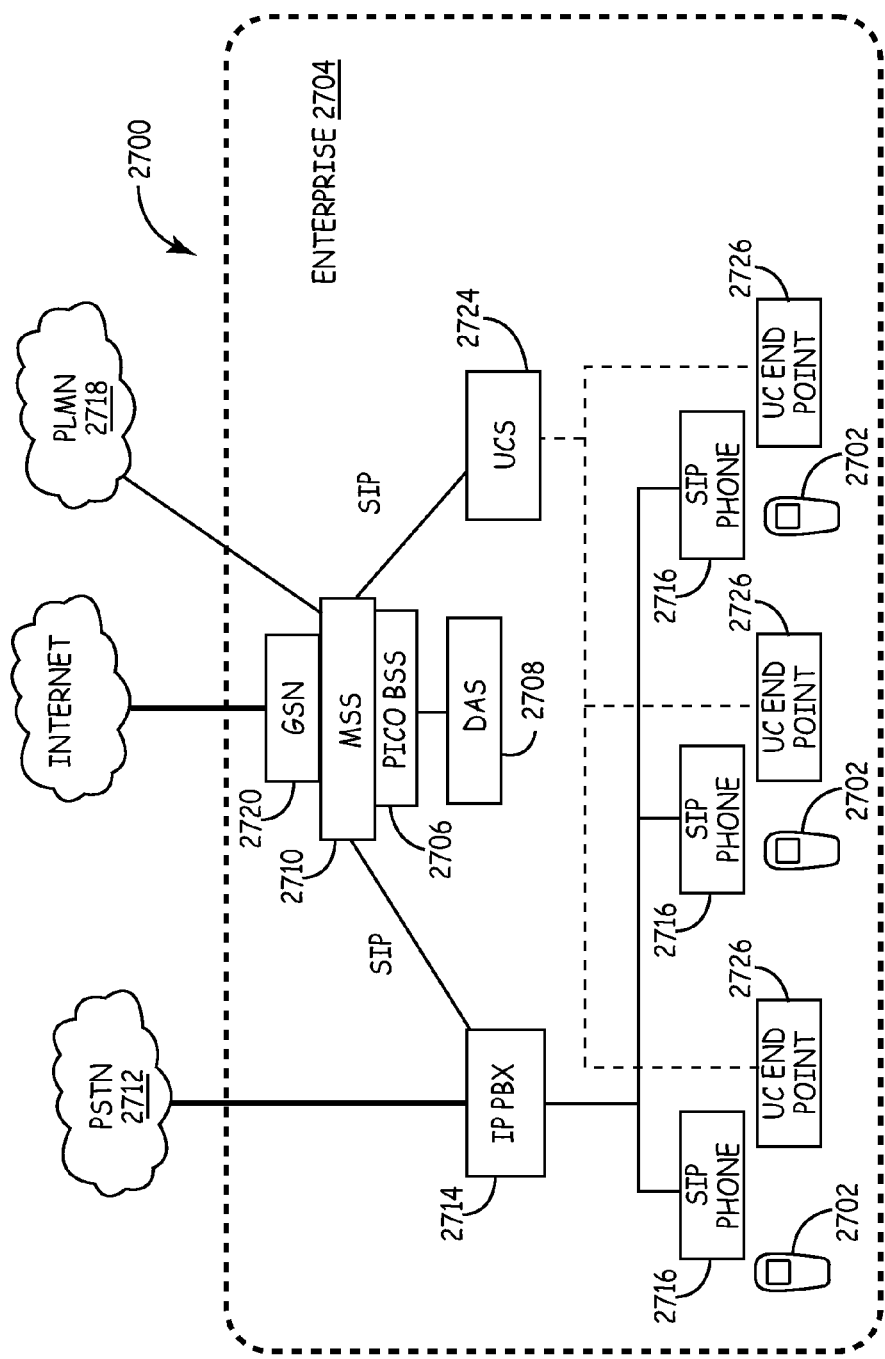
FIG. 27 illustrates an example of an enterprise mobile network.

FIG. 27 illustrates another example of an enterprise mobile network 2700 in which the technology described above (for example, a multiple-TRX pico base station and DAS) can be deployed to provide coverage and capacity to GSM/GPRS mobile devices 2702 located within an enterprise 2704.

In this example, a pico base station subsystem 2706 is coupled to a DAS 2708. The enterprise mobile network 2700 also comprises a mobile switching subsystem (MSS) 2710 that is coupled to the pico base station subsystem 2706 and is also located in the enterprise 2704. In this example, the enterprise mobile network 2700 is coupled to a PLMN 2718 with which the enterprise 2704 has an agreement. In this example, the local subscribers of the enterprise 2704 have both a local MSISDN numbers and a public MSISDN number as described above, and the MSS 2710 acts as the HLR (as well as the MSC/VLR) for the local subscribers with respect to their local MSISDN numbers but only acts as an MSC/VLR for the local subscribers with respect to their public MSISDN numbers.

In the example shown in FIG. 27, the MSS 2710 is also coupled to the PSTN 2712 via an IP PBX 2714. The MSS 2710 is coupled to the IP PBX 2714 via a corporate LAN and session border controller (both of which are not shown in FIG. 27). The IP PBX 2714 is also coupled to various SIP phones 2716. Any needed transcoding between the media formats used by the pico base station subsystem 2706 and those used by the IP PBX 2714 can be performed by the SBC and/or the IP PBX 274 itself.

The enterprise mobile network 2700 also includes a GSN 2720 that is coupled to the Internet 2722. The GSN 2720 is used to provide GPRS data service to the mobile device 2702 while they are camped on the enterprise mobile network 2700.

In this example, the enterprise 2704 has also deployed unified communications (UC) technology. The UC technology is implemented in the enterprise 2704 using one or more UC servers 2724 that are communicatively coupled to various UC end points 2726 (such as personal computers, telephones, and video conferencing equipment) and other IP devices (such as the SIP phones 2716 and the IP PBX 2714) using the corporate IP LAN. In particular, the UC servers 2724 integrate and manage real-time, synchronous communication services (such as VoIP telephony, instant messaging, audio and video conferencing, and private cellular telephony) and asynchronous communication services and unified messaging (such as asynchronous communication services like email, voice mail, faxes, calendaring, and presence) in order to, among other things, provide unified messaging to users' "inboxes". In one implementation of such an embodiment, the UC servers 2724 are implemented using Microsoft Office Communications Server 2007 to integrate and manage synchronous communication services and Microsoft Exchange Server 2007 to integrate and manage asynchronous communication services and to deliver unified messaging. In such an implementation, the UC server software is hosted locally within the enterprise 2704 (that is, the UC server software executes on server hardware that is deployed in the enterprise 2704). Although the UC servers 2724 are shown in FIG. 27 as being deployed within the enterprise 2704, it is to be understood that in other embodiments the UC servers 2724 include one or more UC servers or services that are provided by outside service providers (also referred to as "hosted" services), such as hosted Microsoft Exchange Server services or Microsoft Office Communications Server services).

In this example, various UC end points 2726 run UC client software that is compatible with the UC servers 2724 (such as Microsoft Office Communicator 2007 for synchronous communication service and/or Microsoft Outlook 2007 for asynchronous communication service and to access the user's unified messaging inbox). Also, the UC server 2724 that manages synchronous communication services integrates the IP PBX 2714 and the SIP phones 2716 into the overall UC solution. The MSS 2710 includes SIP User Agent (UA) (not shown in FIGS. 27-31) that the MSS 2710 uses to interact with the IP PBX 2714 and the UC server 2724. In this way, the mobile devices 2702 appear to the IP PBX 2714 and UC 2714 to be another SIP device.

Figure 28:
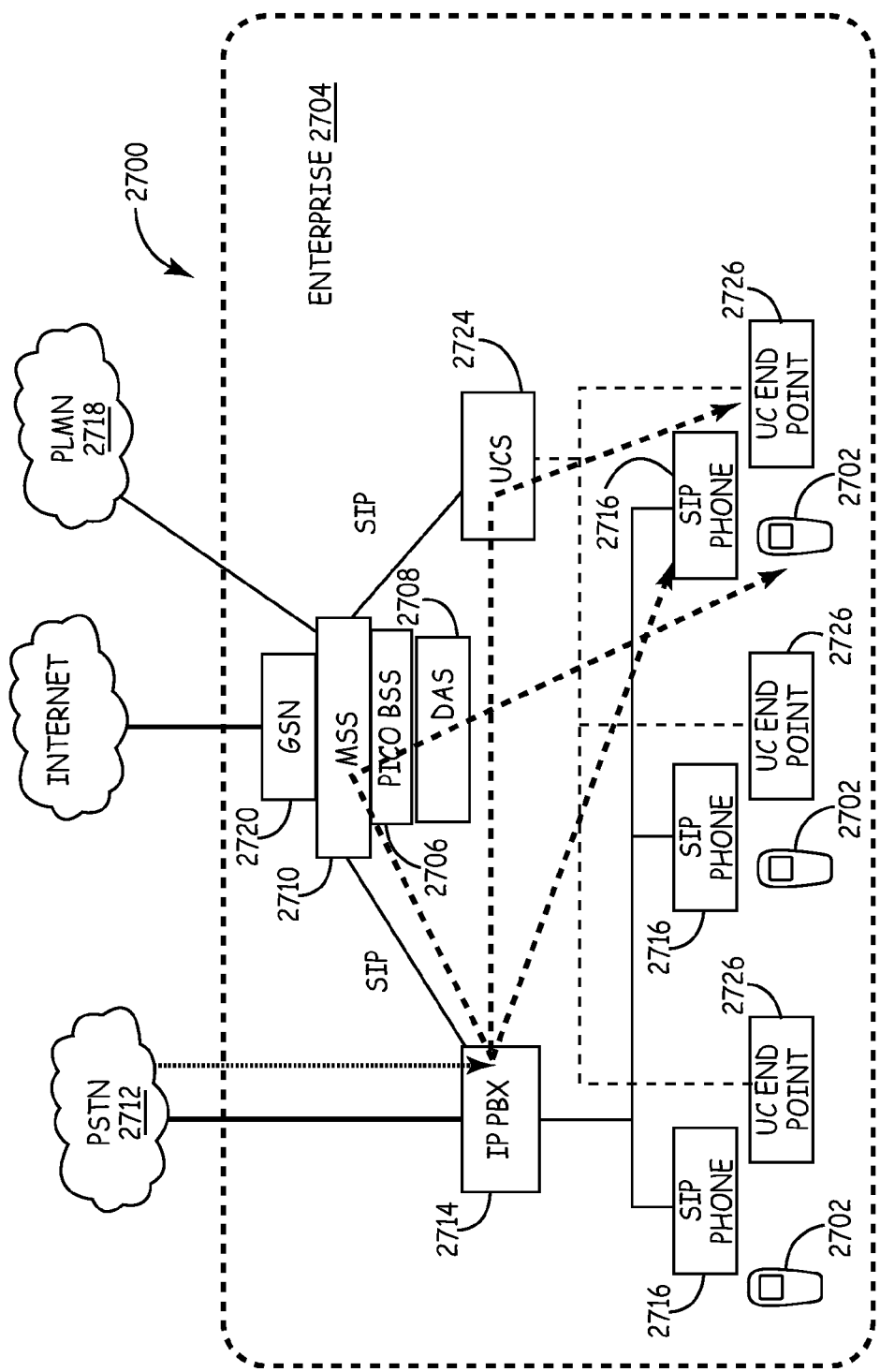
FIG. 28 illustrates an example of how a telephone call made to PBX extension associated with a local subscriber of an enterprise is handled in the enterprise mobile network shown in FIG. 27.

The UC technology can be used to unify each local subscriber's mobile device 2702, fixed SIP phone 2716, and other UC end points 2726 with respect to synchronous and asynchronous communications. For example, as shown in FIG. 28, when a telephone call is made to a PBX extension associated with a local subscriber of the enterprise 2704, the call will be received at the IP PBX 2714 from the PSTN 2712. The IP PBX 2714 is configured to ring the SIP phone 2716 of the called user in the normal manner. Also, the IP PBX 2714 is configured to interact with the SIP UA in the MSS 2710 in order to cause the called user's mobile device 2702 to ring (if the mobile device 2702 is camped onto the enterprise mobile network 2700 at that time). As noted above, the SIP UA in the MSS 2710 appears to be, from the perspective of the IP PBX 2714, another SIP device.

The IP PBX 2714 is also configured to interact with the UC server 2724 that handles synchronous communication services to indicate that there is an incoming call for the called user. The UC server 2724 causes the called user's UC end point 2726 to ring or otherwise indicate that an incoming call is being attempted.

If the called local subscriber uses the fixed SIP phone 2716 to answer the call, the IP PBX 2714 sets ups the media streams for the call in the conventional manner between the IP PBX 2714 and the fixed SIP phone 2716. If the user uses the UC end point 2726 to answer the call, the UC server 2724 and the IP PBX 2714 set up the call.

If the user uses the mobile device 2702 to answer the call, the IP PBX 2714 sets up the call with the SIP UA in the MSS 2710, and the MSS 2710 in turn sets up the call with the called user's mobile device 2702 (via the pico base station subsystem 2706 and DAS 2708). Once the call is setup, the media streams for the call are routed between the called mobile device 2702 and the calling device connected to the PSTN 2712 (where any needed transcoding can be performed by a SBC that is used to couple the pico base station subsystem 2706 to the corporate IP LAN and the IP PBX 2714).

Figure 29:
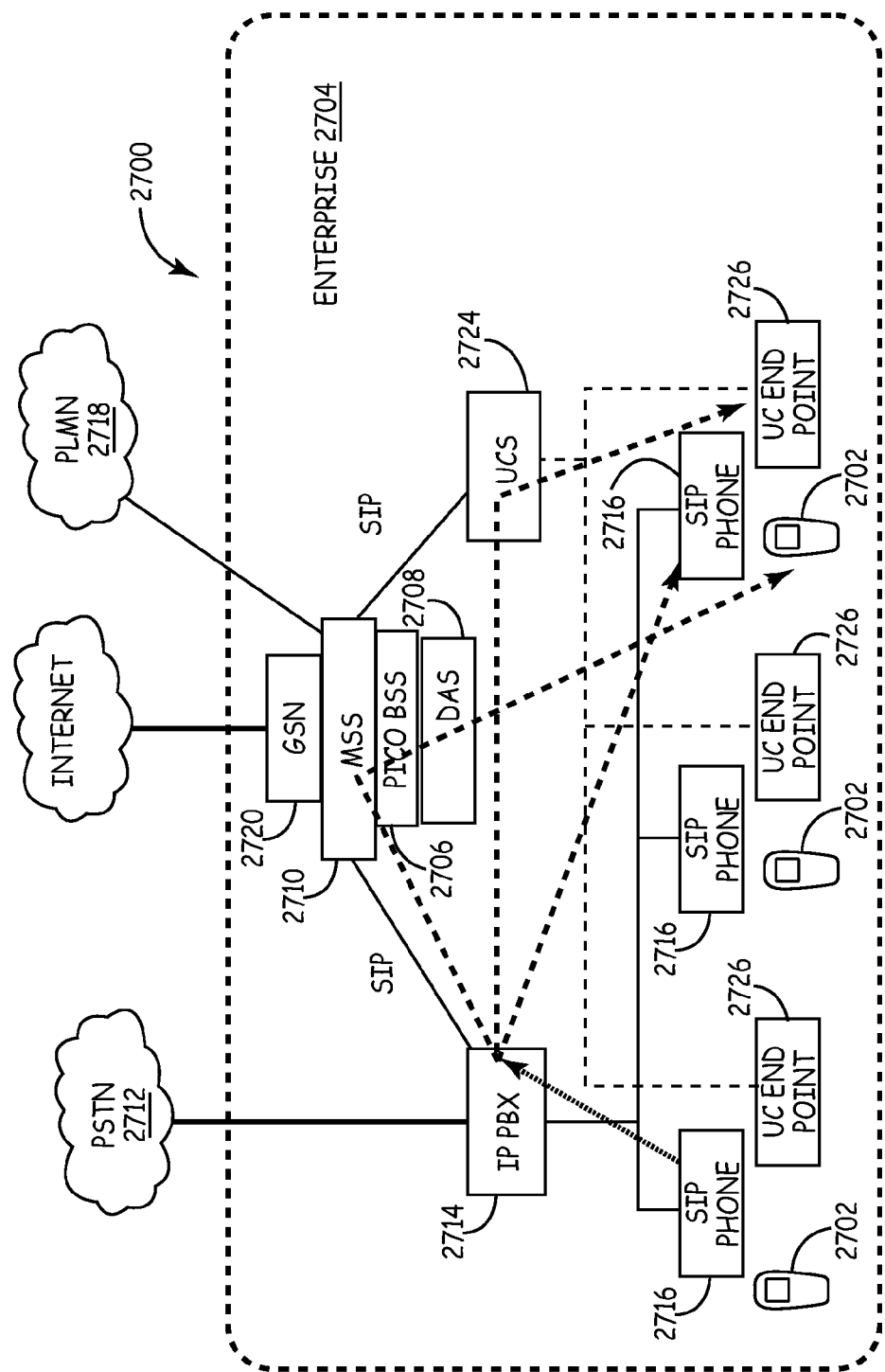
FIG. 29 illustrates an example in which someone uses a fixed SIP phone to call a user's PBX extension.

FIG. 29 illustrates an example in which someone uses a fixed SIP phone 2716 to call a user's PBX extension. The processing of such call is substantially similar to the processing described above in connection with FIG. 28.

Figure 30:
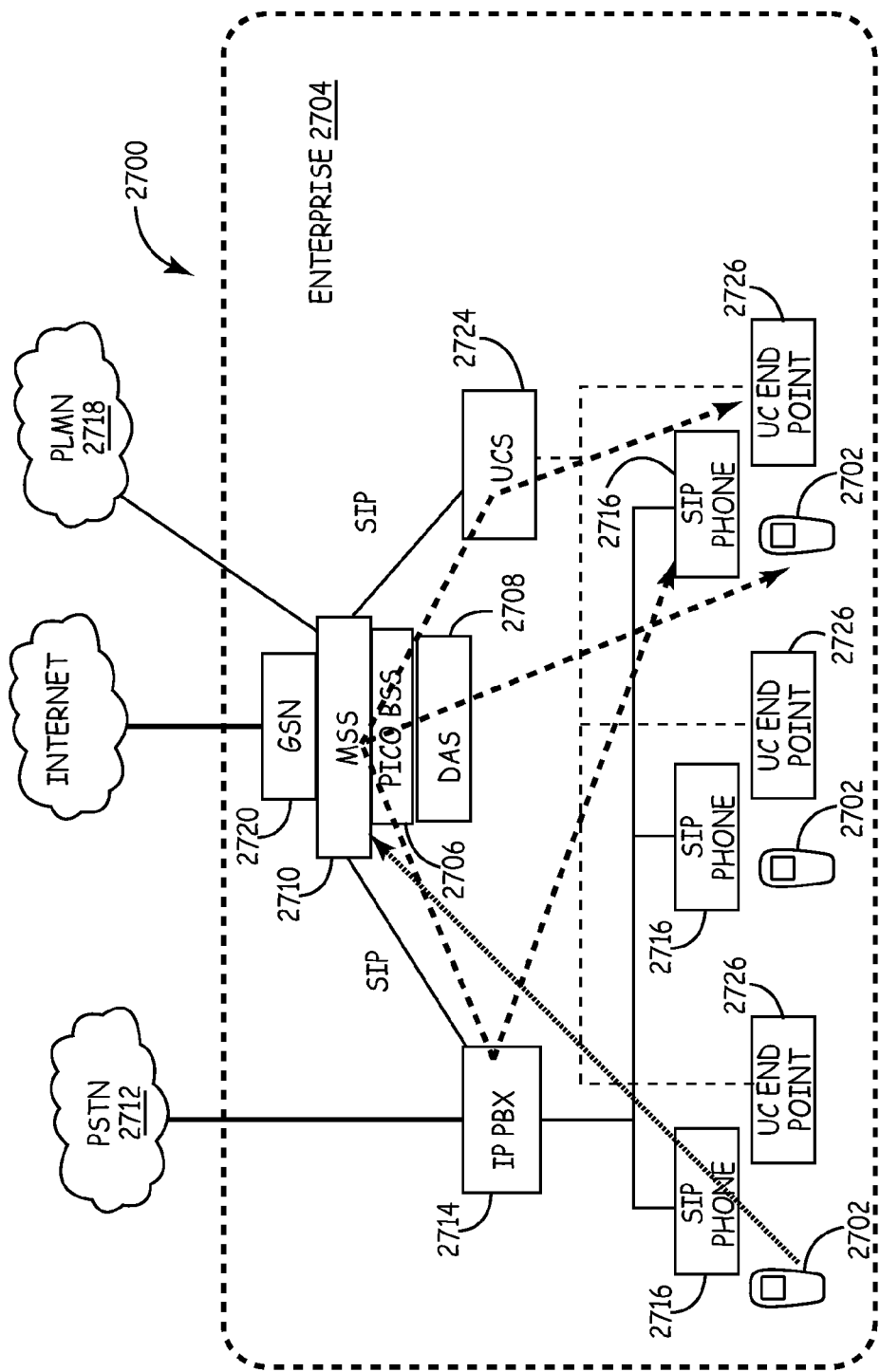
FIG. 30 illustrates an example in which someone uses a mobile device to call a user's local MSISDN number.

FIG. 30 illustrates an example in which someone uses a mobile device 2702 to call a user's local MSISDN number. The MSS 2710 is configured to ring the called local subscriber's mobile device 2702 in the normal manner. Also, the MSS 2710 uses the SIP UA to call both the IP PBX 2714 and the UC server 2724 that handles synchronous communication services. The IP PBX 2714 and the UC server 2724 cause the called user's fixed SIP phone 2716 and UC end point 2726, respectively, to ring or otherwise indicate that an incoming call is being attempted.

If the user uses the mobile device 2702 to answer the call, the MSS 2710 sets up the call in the normal manner.

If the local subscriber uses the fixed SIP phone 2716 to answer the call, the IP PBX 2714 sets up the call with the SIP UA in the MSS 2710, and the MSS 2710 in turn sets up the call with the calling user's mobile device 2702 (via the pico base station subsystem 2706 and DAS 2708). Once the call is setup, the media streams for the call are routed between the called mobile device 2702 and the calling fixed SIP phone 2716 (where any needed transcoding can be performed by a SBC that is used to couple the pico base station subsystem 2706 to the corporate IP LAN).

If the called user uses the UC end point 2726 to answer the call, the UC server 2724 sets up the call with the SIP UA in the MSS 2710, and the MSS 2710 in turn sets up the call with the calling user's mobile device 2702 (via the pico base station subsystem 2706 and DAS 2708). Once the call is setup, the media streams for the call are routed between the calling mobile device 2702 and the called UC end point 2726 (where any needed transcoding can be performed by a SBC that is used to couple the pico base station subsystem 2706 to the corporate IP LAN).

Figure 31:
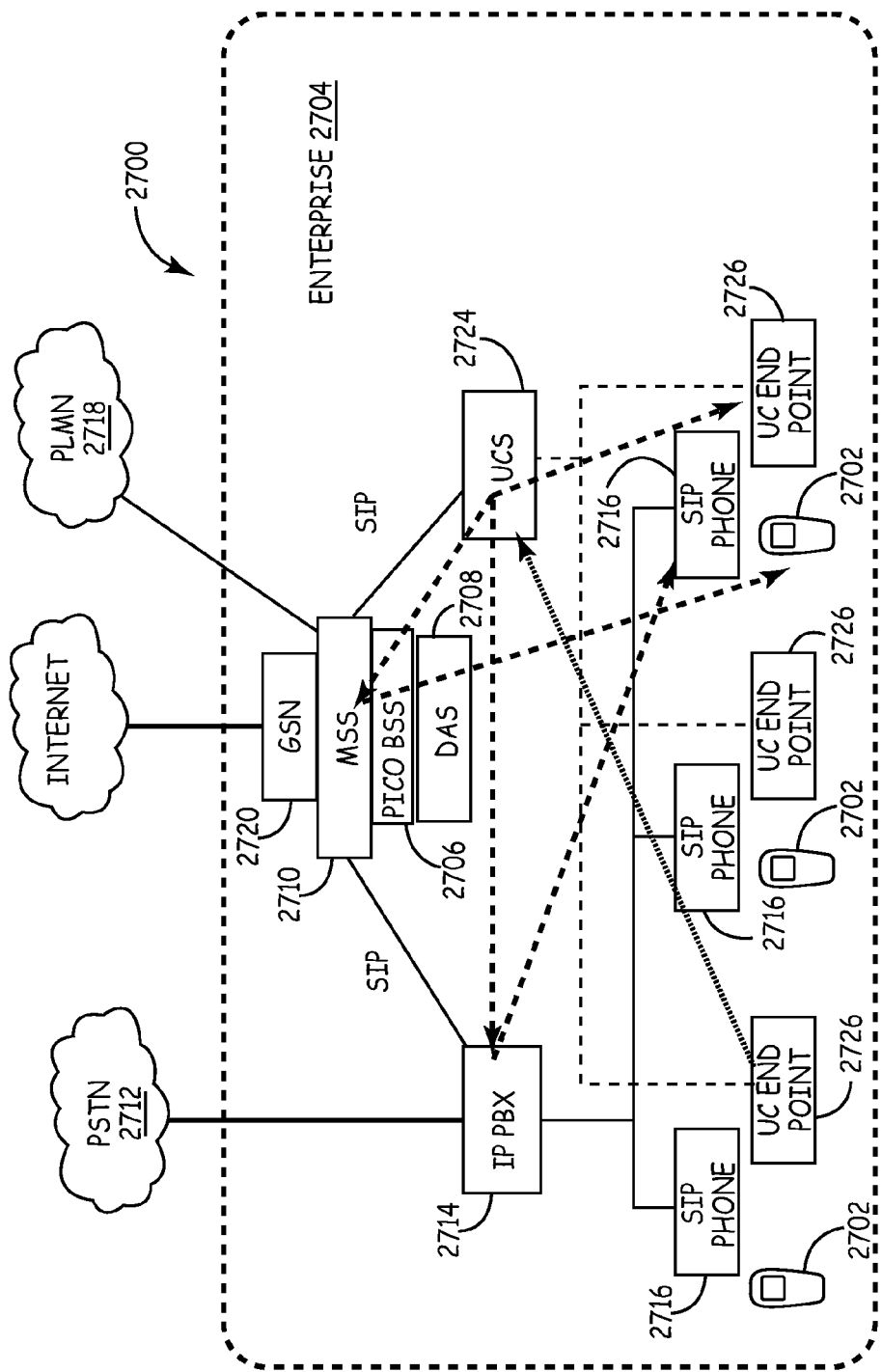
FIG. 31 illustrates an example in which someone uses a UC end point to call a user's UC end point.

FIG. 31 illustrates an example in which someone uses a UC end point 2726 (such as a computer) to call a user's UC end point 2726. The UC server 2724 that handles synchronous communications is configured to ring the called user's UC end point 2726 (or otherwise indicate at the called user's UC end point 2726 that an incoming call is being attempted) in the normal manner. Also, the UC server 2724 causes the called user's fixed SIP phone 2716 to ring using the IP PBX 2714 in the normal manner. In this example, the UC server 2724 is also configured to interact with the SIP UA in the MSS 2710 in order to cause the called user's mobile device 2702 to ring (if the mobile device 2702 is camped onto the enterprise mobile network 2700 at that time). As noted, the SIP UA in the MSS 2710 appears to be, from the perspective of the UC server 2724, another SIP device.

If the called user uses the UC end point 2726 to answer the call, the UC server 2724 sets up the call between the calling UC end point 2726 and the called UC end point 2726 in the normal manner. Likewise, if the called user uses the fixed SIP phone 2716 to answer call, the UC server 2724 and the IP PBX 2714 set up the call with the fixed SIP phone 2716 in the normal manner.

If the user uses the mobile device 2702 to answer the call, the UC server 2724 sets up the call with the SIP UA in the MSS 2710, and the MSS 2710 in turn sets up the call with the called user's mobile device 2702 (via the pico base station subsystem 2706 and DAS 2708). Once the call is setup, the media streams for the call are routed between the called mobile device 2702 and the calling UC server 2724 (where any needed transcoding can be performed by a SBC that is used to couple the pico base station subsystem 2706 to the corporate IP LAN).

Figure 32:
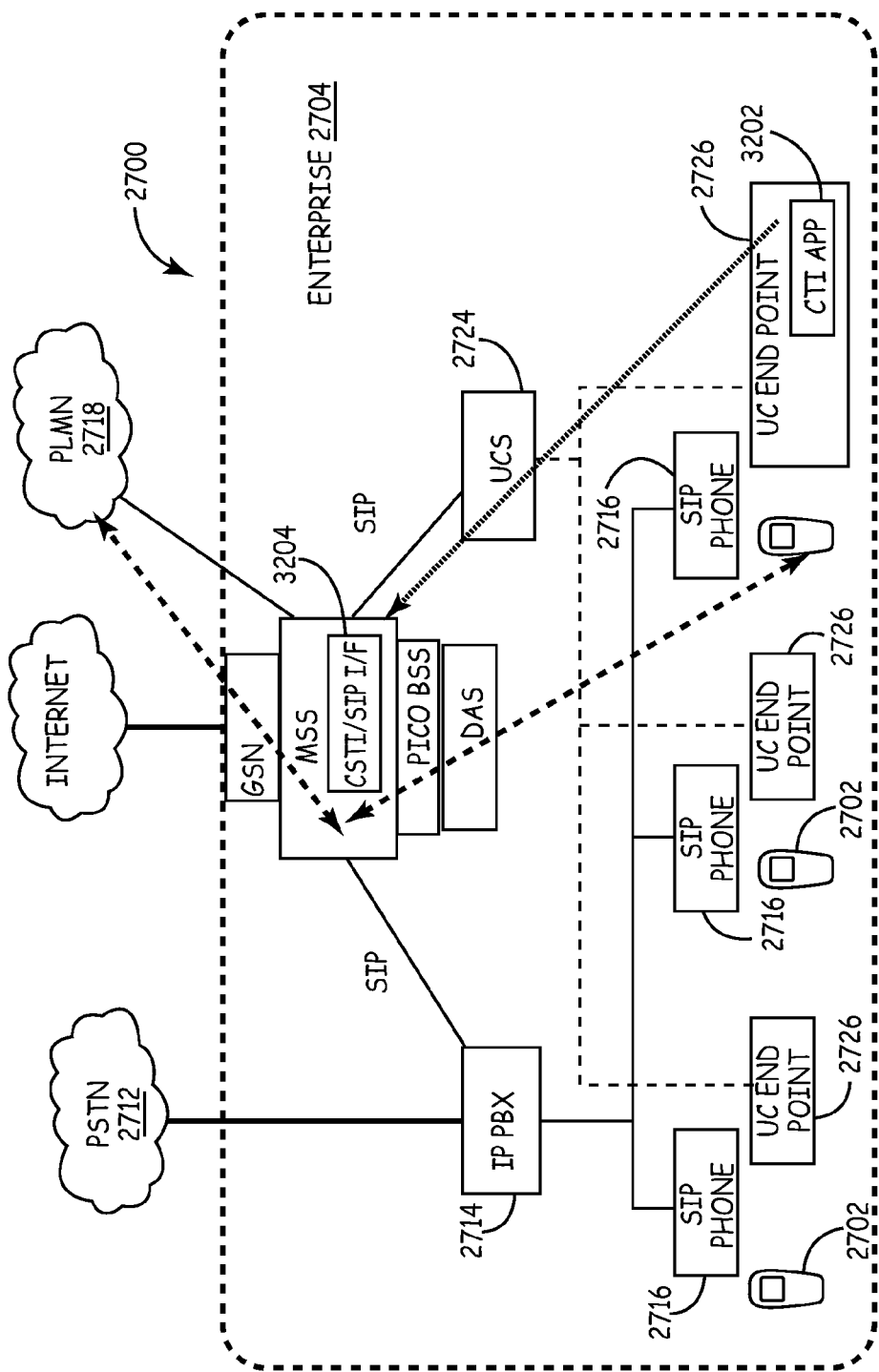
FIG. 32 illustrates an example in which a computer/telephone integration (CTI) application installed on a UC end point is used to remotely control a mobile device.

FIG. 32 illustrates an example in which a computer/telephone integration (CTI) application 3202 installed on the UC end point 2726 is used to remotely control the user's mobile device 2702. In this example, the MSS 2710 includes a Computer Supported Telecommunications Applications (CSTA)/SIP interface 3204 that is used to interact with CTI applications that may be executing on the UC end points 2726. In this example, the CTI application 3202 is designed to remotely control the user's mobile device 2702. For example, the UC technology may include a so called "click to call" function, whereby a user can click on some part of the user interface of the UC end point 2726 in order to initiate a call. This click-to-call function can be extended to initiate a call using the user's mobile device 2702. When the user make's such a click, the CTI application 3202 interacts with the CSTA/SIP interface 3204 in the MSS 2710 indicating the MSS 2710 should initiate an mobile originated (MO) call from the mobile device 2702, which the MSS 2710 proceeds to do if the user's mobile device 2702 is camped onto the enterprise mobile network 2702. If the call is answered, the MSS 2710 sets up the call with the mobile device 2702 and the called party as if the user used the mobile device 2702 to make the call.

In the examples described above in connection with FIGS. 27-32, the MSS 2710 can be configured to provide presence information to the UC server 2724 about the mobile device 2702 for use by the UC servers 2724 (for example, to display presence information about the mobile devices 2702 in an UC client (such as Microsoft Office Communicator 2007) executing on the UC end points 2726).

Figure 33:
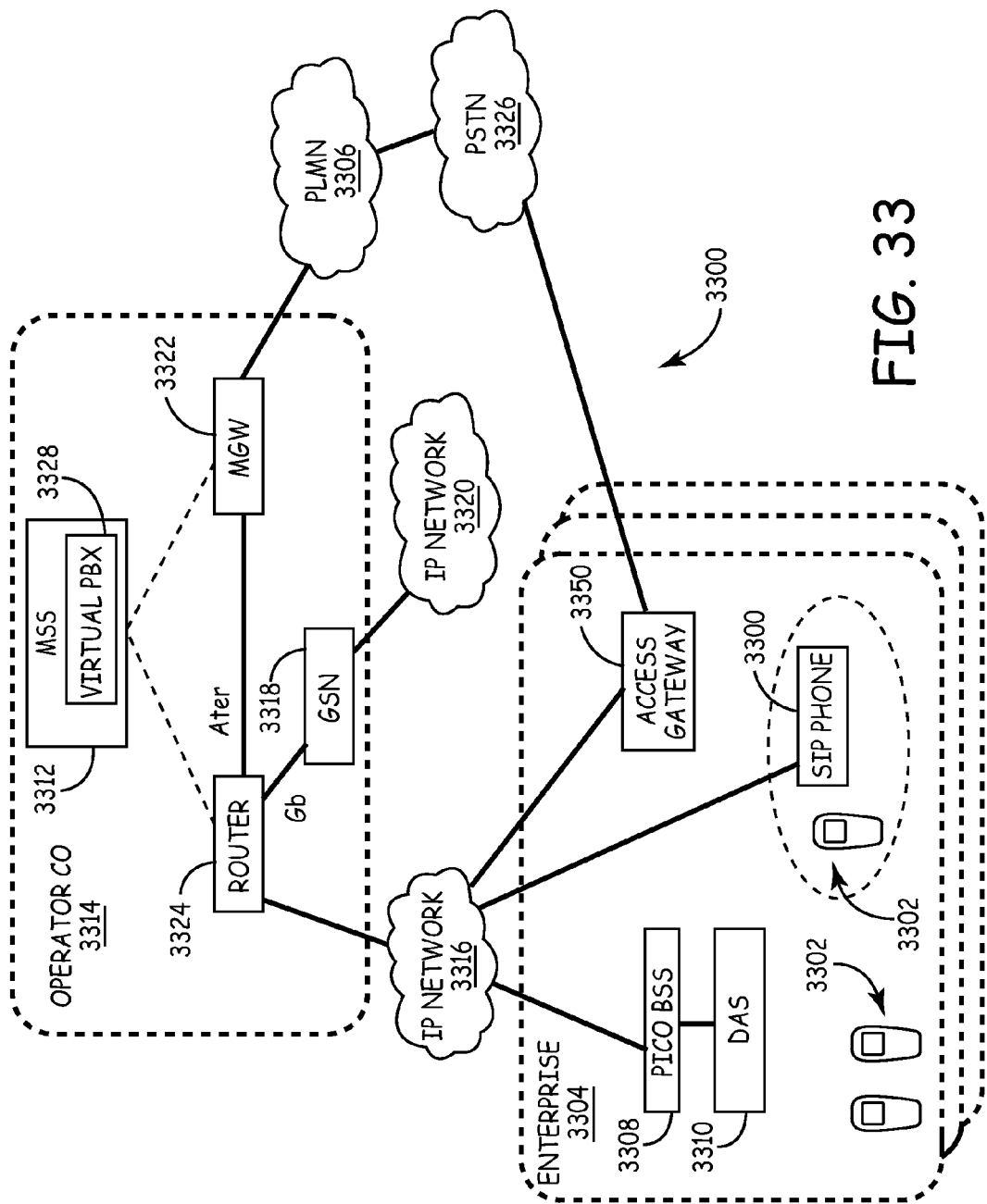
FIG. 33 illustrates an example deployment of an enterprise mobile network that includes a virtual IP PBX.

FIG. 33 illustrates another example deployment of an enterprise mobile network 3300 in which the technology described above (for example, a multiple-TRX pico base station and DAS) can be deployed to provide coverage and capacity to GSM/GPRS mobile devices 3302 located within an enterprise 3304.

The example shown in FIG. 33 is similar to the one shown in FIG. 22 except that there is no IP PBX deployed locally within one or more of the offices of the enterprise 3304. As with the example shown in FIG. 22, the enterprise mobile network 3300 shown in FIG. 33 includes a pico base station subsystem 3308 and DAS 3310 are provided within each office of the enterprise 3304. Also, each pico base station subsystem 3308 is coupled to a MSS 3312 located in the operator's central office 3314. In this example, the MSS 3312 serves as the MSC/VLR for those mobile devices 3302 that are located within a coverage area associated with the enterprise mobile network 3300. Also, the MSS 3312 implements the GMSC and HLR functionality for the local subscribers of all of the offices of the enterprise 3300. Each pico base station subsystem 3308 is coupled to the MSS 3312 over an IP Network 3316.

As with the example shown in FIG. 22, the enterprise mobile network 3300 shown in FIG. 33 includes a GSN 3318 that is coupled to the mobile devices 3302 in each office of the enterprise 3304 via the IP network 3316. The GSN 3318 is used to provide GPRS data service to the mobile device 3302 while they are camped on to the enterprise mobile network 3300. The GSN 3318 is also connected to an IP network 3320 via which the GPRS service is provided. The central office 3314 also includes a media gateway (MGW) 3322 that switches calls and performs any needed media conversion. The central office 3314 also includes a router 3324 for coupling the MSS 3312, GSN 3318, and MGW 3322 to the IP network 3316.

As noted above, in the example shown in FIG. 33, there is no IP PBX deployed locally within the offices of the enterprise 3304. Instead, virtual IP PBX software 3328 executes on the MSS 3312 so that the MSS 3312 can act as a PBX for the enterprise 3300 for both the mobile devices 3302 and any other SIP devices (such as fixed SIP telephones 3330). The virtual IP PBX software 3328 and the SIP devices communicate with one another over the IP Network 3316 using the SIP protocol for signaling and a suitable media format (such as the Real-time Transport Protocol (RTP)) for the call data. The virtual IP PBX 3328 is also configured to associate a PBX extension number with a respective fixed SIP telephone 3330 so that calls made to that PBX extension number will cause the associated fixed SIP telephone 3330 to ring.

In this example, each office of the enterprise 3304 includes an access gateway 3350 that is controlled by the virtual IP PBX software 3328 (for example, using the Media Gateway Control Protocol (MGCP)). The access gateway 3350 serves as a local gateway to the PSTN 3326 so that call data sent to or from SIP phones 3330 or the mobile devices 3302 can be communicated to the PSTN 3326 without having to pass through the MSS 3312 and the PLMN 3306. The access gateway 3350 is coupled to the SIP phones 3330 and the pico base station subsystem 3308 via a corporate IP LAN (not shown in FIG. 33). The access gateway 3350 performs any needed media conversion between the media formats used in the enterprise mobile network 3300 and the formats used in the PSTN 3326). The virtual IP PBX software 3328 (and the devices coupled thereto) can also accesses the PSTN 3326 via the PLMN 3306.

The virtual IP PBX software 3328 is used to provide Centrex-like services that wireless telephony providers have historically provided for fixed wireline telephones. The virtual IP PBX software 3328 executing on the MSS 3312 implements Centrex-type features such as short number dialing, outgoing calls using a special leading digit (for example, the number "9"), and outgoing call barring. The virtual IP PBX software 3328 can also be coupled to a voice mail server to provide voice mail service for user's of the enterprise mobile network 3300.

As with the local IP PBX shown in FIG. 22, the central virtual IP PBX software 3328 of FIG. 33 is configured to ring both the fixed SIP telephone 3330 and the mobile device 3302 associated with a given local subscriber when an incoming call is made to a number associated with either of those devices.

Figure 34:
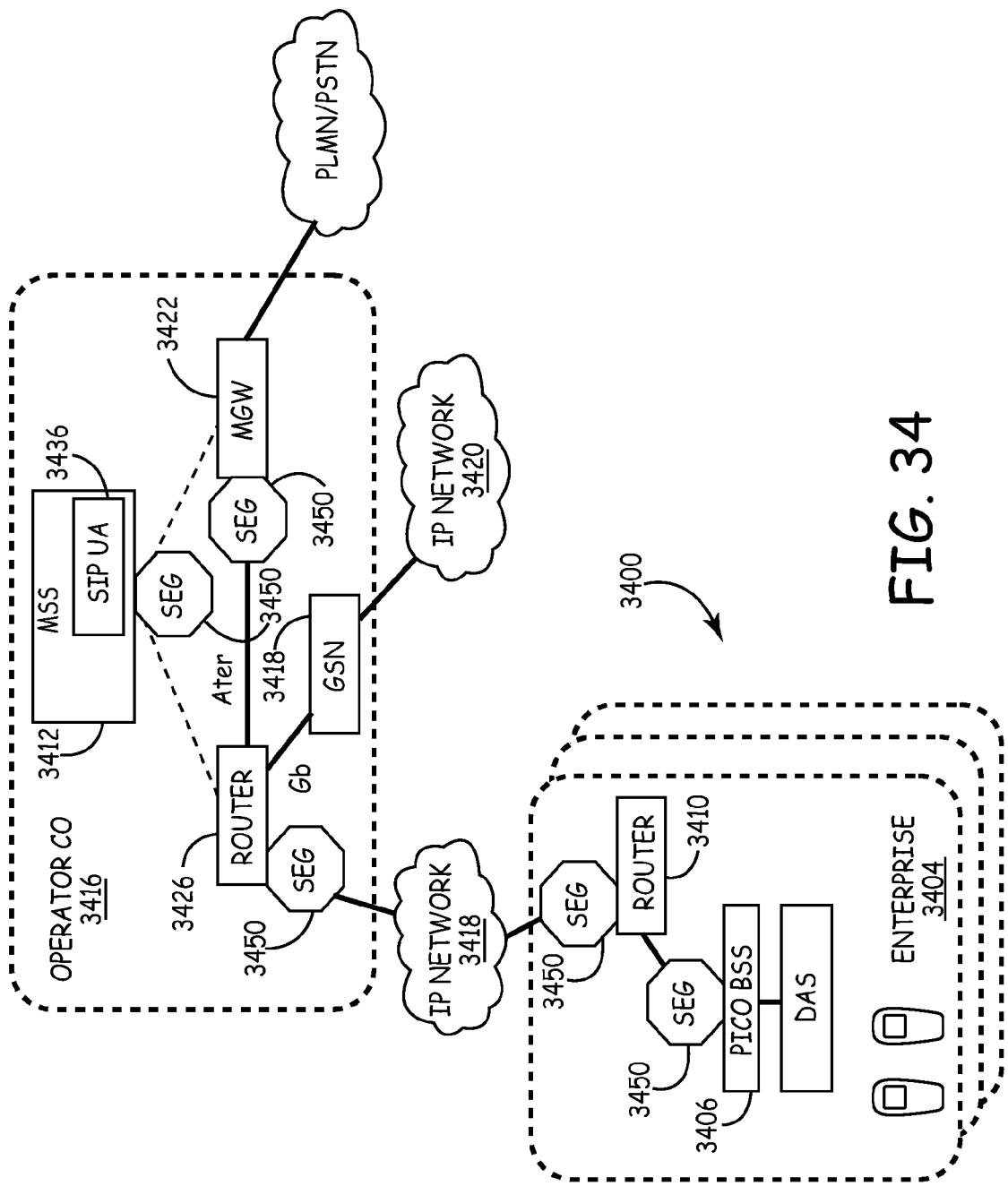
FIG. 34 is illustrates the use of security gateway (SEG) functionality in an enterprise mobile network.

In the above examples, a public IP network such as the Internet is used to communicatively couple the pico base station subsystem (and any MSS deployed within the enterprise) to wireless operator's equipment. As a result, the IP traffic carrying the signaling and call data needs to be secured. FIG. 34 illustrates one approach to securing such IP traffic. As shown in FIG. 34, security gateway (SEG) functionality 3450 is deployed at the pico base station subsystem 3406, a router 3410 used to couple elements deployed with in the enterprise 3400 to a public IP network 3418, the router 3426 used to couple the elements deployed at the wireless operator's office 3416 to the public IP network 3418, at the MSS 3412 deployed in the wireless operator's office 3416, and at the media gateway (MGW) 3422 deployed in the wireless operator's office 3416.

In this example, the IP traffic that passes between the enterprise 3404 and the wireless operator's office 3416 is secured using the Internet Protocol Security (IPSEC) protocol. The SEG functionality 3450 supports the IPSEC protocol and is used to implement a virtual private network over which such IP traffic can be communicated in a secure manner, where SEG functionality 3450 is used at each end of each VPN channel. In this example, the devices in the network 3400 use the Secure RTP (SRTP) protocol to further secure the media streams that are communicated over the public IP network 3418, while signaling data (for example, Ater-over-IP data, Gb-over-IP data, and/or SIP data) is secured using the underlying IPSEC channel.

The SEG functionality 3450 can be integrated into the relevant network element (for example, in the pico base station subsystem 3406 or the MSS 3412 (if there is sufficient processing capability to do so) and/or in the routers 3410 and 3426 and the media gateway 3422) or provided by a separate device deployed with the relevant network element where the relevant network element does not have sufficient processing capability to implement the SEG functionality 3450 (for example, by deploying a CISCO router supporting the relevant security functions where the MSS 3412 does not have sufficient processing capability to itself implement the SEG functionality 3450).

Also, in the example described here, a SIP user agent is deployed in the MSS in order to couple the mobile network elements to SIP-based network elements (including SIP servers such as an IP PBX or UC server). However, it is to be understood that fixed-mobile convergence (FMC) can be implemented in other ways. For example, the mobile devices themselves can execute a SIP client to act as a peer in such SIP systems (as defined in the 3GPP/IMS specifications) using a packet-switched core network. However, where the enterprise mobile network is not able to support such an approach (for example, because the enterprise mobile network does not implement UMTS), other approaches can be used. For example, SIP-server functionality can be integrated into the MSS, a SIP user agent can be deployed in the MSS, or a SIP user agent can be deployed in the base station subsystem.

Figure 35:
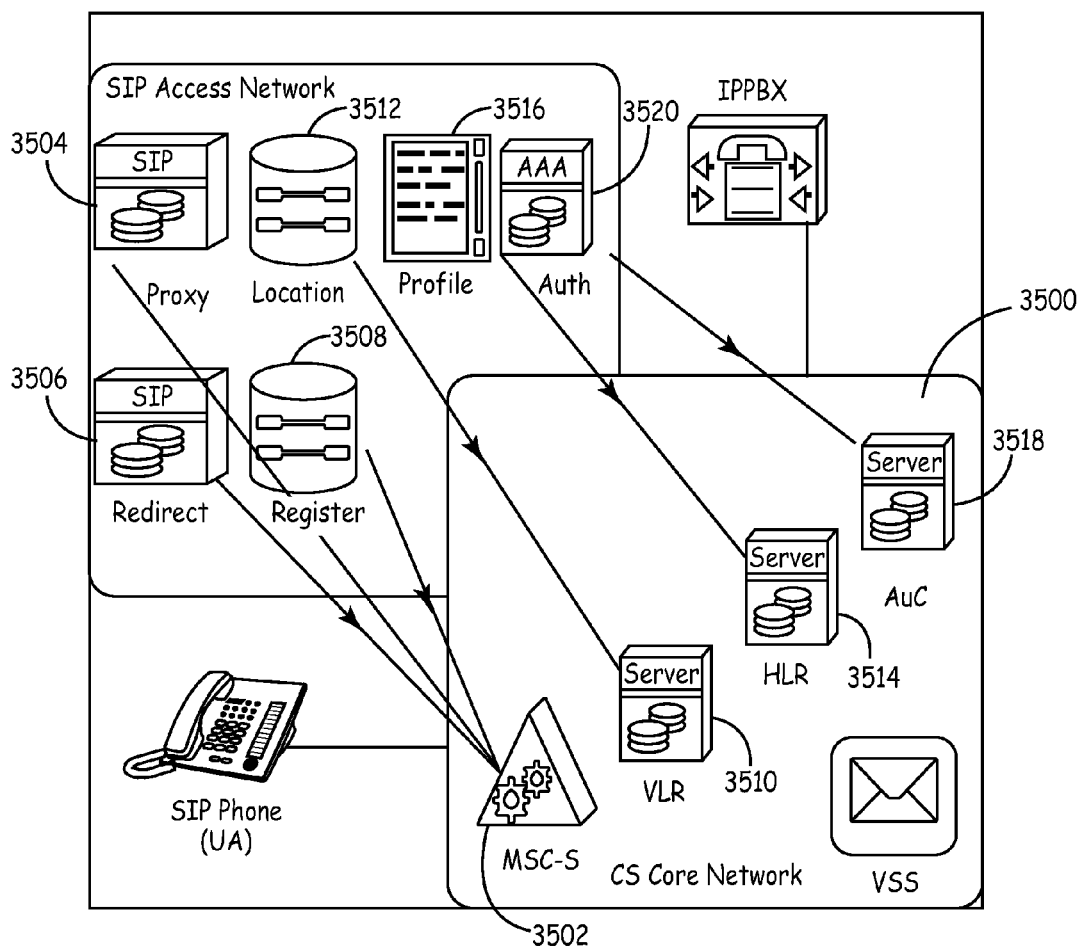
FIG. 35 illustrates how SIP-server functionality can be integrated into an MSS as a part of a FMC solution.

FIG. 35 illustrates how SIP-server functionality can be integrated into an MSS 3500 as a part of a FMC solution. As shown in FIG. 35, the MSC (switching) functionality 3502 of the MSS 3500 is extended to support the SIP Proxy function 3504, SIP Redirect function 3506, and SIP Registrar function 3508. The VLR 3510 of the MSS 3500 is enhanced to support the SIP Location function 3512. The HLR 3514 of the MSS 3500 is extended to store each subscriber's SIP Profile 3516 with the GSM subscription information. The authentication center (AUC) 3518 in the MSS 3500 is extended to support the SIP Authentication algorithms 3520.

In this example, the MSS 3500 can be used to support SIP devices and SIP servers such as SIP phones and an IP PBX. The MSS 3500 can also be configured to provide GSM services to SIP phones. Examples of such GSM services include basic call support, mobility management, supplementary services, prepaid services, call data record (CDR)/call statistics, voice announcements, and voice mail.

As discussed above in connection with FIGS. 22-26, the SIP User Agent can be implemented in the MSS.

Figure 36:
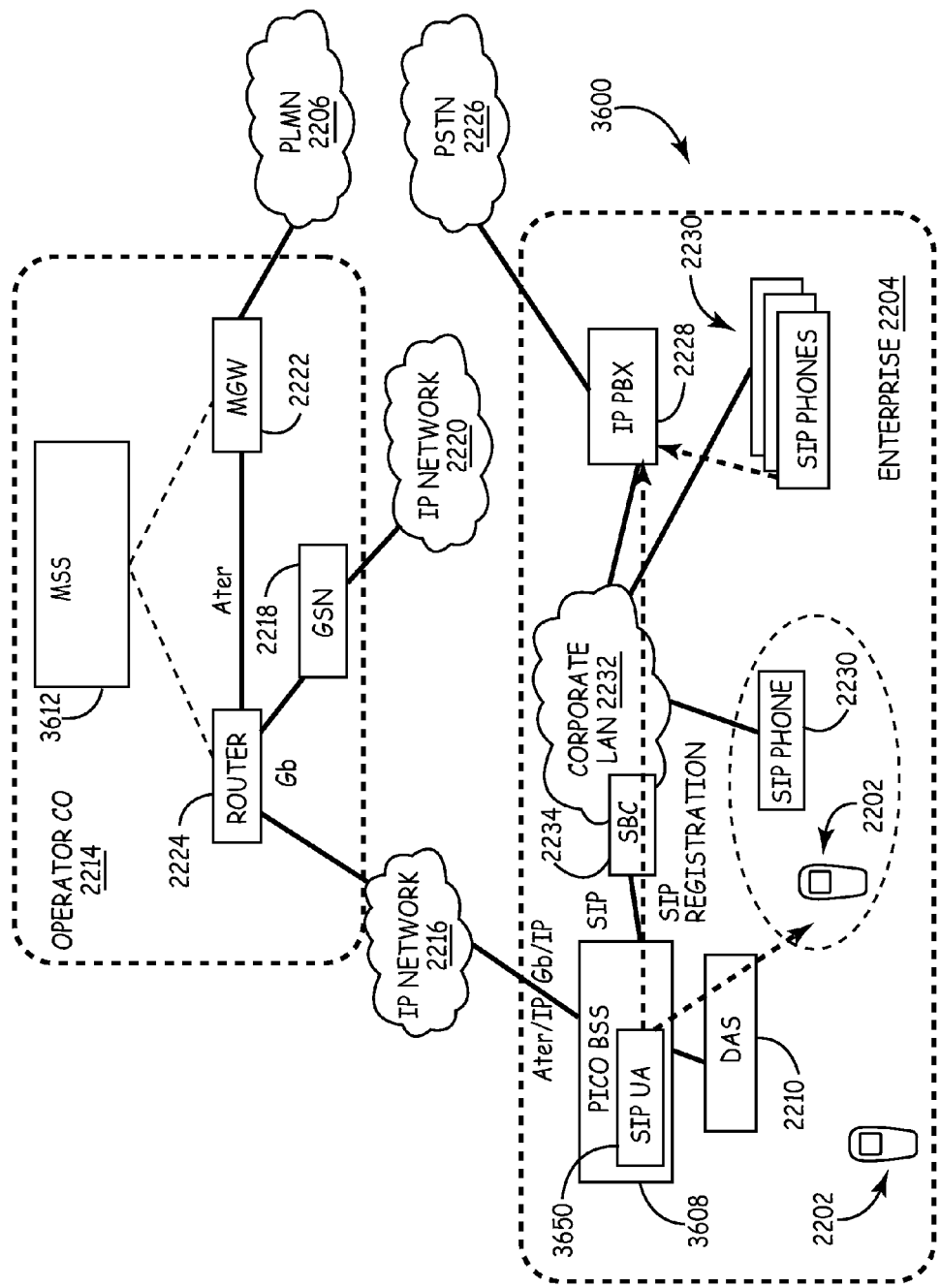
FIG. 36 illustrates how a SIP User Agent can be implemented in a base station subsystem.

FIG. 36 illustrates how a SIP User Agent can be implemented in a base station subsystem. The example shown in FIG. 36 is implemented in a modified version of the enterprise mobile network 2200 described above in connection with FIGS. 22-26.

In the example shown in FIG. 36, the SIP User Agent (SIP UA) 3650 is implemented in a pico base station subsystem 3608, instead of in a MSS 3612.

When a local subscriber's mobile device 2202 performs a location update, the SIP UA 3650 in the pico base station subsystem 3608 registers the local subscriber with the IP PBX 2228. The SIP UA 3650, from the perspective of the IP PBX 2228, appears to be another, normal SIP device.

When a user uses a SIP phone 2230 to call the PBX extension of a local subscriber of the enterprise mobile network 2200, the IP PBX 2228 causes the fixed SIP phone 2230 associated with the called PBX extension to ring. In this example, the IP PBX 2228 is also configured to interact with the SIP UA 3650 in order to ring the called party's mobile device 2202. From the perspective of the IP PBX 2228, the SIP UA 3650 in the pico base station subsystem 3608 appears to be a normal SIP device and the IP PBX 2228 uses standard SIP signaling to let the SIP UA 3650 know that an incoming call has been received for the called party. The SIP UA 3650, in turn, generates appropriate GSM signaling messages from the SIP messages received from the IP PBX 2228 and generates appropriate SIP messages from GSM signaling messages it receives from the mobile device 2202 (via the pico base station subsystem 3608). If the user uses the mobile device 2202 to answer the incoming call, the IP PBX 2228 sets up the call with the SIP UA in the pico base station subsystem 3608, and the pico base station subsystem 3608 in turn sets up the call with the called party's mobile device 2202 (via the pico base station subsystem 3608 and DAS 2208). Once the call is set up, the media streams for the call are routed between the called mobile device 2202 and the calling SIP Phone 2230 (where any needed transcoding can be performed by a SBC used to couple pico base station subsystem 3608 to the corporate IP LAN 2232).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An enterprise mobile network for providing wireless service within a coverage area associated with an enterprise using licensed radio frequency spectrum, the enterprise mobile network comprising:
   a base station subsystem (BSS) deployed on a premises of the enterprise to provide wireless capacity within the coverage area using the licensed radio frequency spectrum; and
   a mobile switching subsystem (MSS) communicatively coupled to a public land mobile network;
   wherein the BSS is communicatively coupled to the MSS using an Internet Protocol (IP) network;
   wherein the MSS is configured to implement at least some networking switching subsystem (NSS) functions for local subscribers of the enterprise mobile network; and
   wherein the MSS comprises a Session Initiation Protocol (SIP) user agent to communicate with at least one SIP server, wherein the SIP user agent is configured to function as a first SIP client when communicating with the SIP server; and
   wherein the MSS is configured to use the SIP user agent to establish a communication session between a mobile device that wirelessly communicates with the BSS using the licensed radio frequency spectrum and a second SIP client coupled to the SIP server.

2. The enterprise mobile network of claim 1, wherein the MSS is configured to use the SIP user agent to establish a communication session between a device using the PLMN to communicate with the MSS and a SIP client coupled to the SIP server.

3. The enterprise mobile network of claim 1, wherein the SIP server comprises an IP private branch exchange (PBX) and wherein the SIP user agent is configured to appear, from the perspective of the IP PBX, to be a SIP phone.

4. The enterprise mobile network of claim 1, wherein the MSS is configured to use the SIP user agent to establish a communication session between a device coupled to a public switched telephone network and a mobile device that wirelessly communicates with the BSS using the licensed radio frequency spectrum, wherein the device coupled to the public switched telephone network initiates the session by calling an extension number handled by the IP PBX.

5. The enterprise mobile network of claim 1, wherein the SIP server is communicatively coupled to a public switched telephone network (PSTN), and wherein the MSS is configured to use the SIP user agent to set up calls with devices coupled to the PSTN using the IP PBX.

6. The enterprise mobile network of claim 1, wherein the SIP server is communicatively coupled to the MSS over an IP network.

7. The enterprise mobile network of claim 1, wherein the MSS is deployed in one of: the premises of the enterprise or an office of a service provider that operates the PLMN.

8. The enterprise mobile network of claim 1, further comprising a distributed antenna system (DAS) communicatively coupled to the BSS.

9. The enterprise mobile network of claim 8, wherein the distributed antenna system comprises a hub unit located on the premises of the enterprise and a plurality of remote antenna units located on the premises of the enterprise, wherein the remote antenna units are located remotely from the hub unit and each of the plurality of antennas are coupled to at least one of a plurality of remote antenna units.

10. The enterprise mobile network of claim 9, wherein the hub unit is communicatively coupled to the remote antenna units, at least in part, using at least one of unshielded twisted pair cabling, cable television cabling, optical fiber, and coaxial cabling.

11. The enterprise mobile network of claim 9, wherein the hub and at least one of the plurality of remote antenna units are communicatively coupled to one another via an expansion hub.

12. The enterprise mobile network of claim 11, wherein the expansion hub is communicatively coupled to the remote antenna units, at least in part, using at least one of unshielded twisted pair cabling, cable television cabling, optical fiber, and coaxial cabling.

13. The enterprise mobile network of claim 1, wherein the BSS comprises a pico BSS.

14. The enterprise mobile network of claim 13, wherein the pico BSS comprises a pico base station having multiple transceiver units.

15. A mobile switching subsystem (MSS) for use with a base station subsystem (BSS) deployed on a premises of an enterprise to provide wireless service within a coverage area associated with the enterprise using licensed radio frequency spectrum as a part of an enterprise mobile network, the MSS comprising:
at least some networking switching subsystem (NSS) functions for local subscribers of the enterprise mobile network; and
a Session Initiation Protocol (SIP) user agent to communicate with at least one SIP server, wherein the SIP user agent is configured to function as a first SIP client when communicating with the SIP server; and
wherein the MSS is configured to use the SIP user agent to establish a communication session between a mobile device that wirelessly communicates with the BSS using the licensed radio frequency spectrum and a second SIP client coupled to the SIP server.

16. An enterprise mobile network for providing wireless service within a coverage area associated with an enterprise using licensed radio frequency spectrum, the enterprise mobile network comprising:
a base station subsystem (BSS) deployed on a premises of the enterprise to provide wireless capacity within the coverage area using the licensed radio frequency spectrum; and
wherein the BSS comprises a Session Initiation Protocol (SIP) user agent to communicate with at least one SIP server, wherein the SIP user agent is configured to function as a first SIP client when communicating with the SIP server; and
wherein the BSS is configured to use the SIP user agent to establish a communication session between a mobile device that wirelessly communicates with the BSS using the licensed radio frequency spectrum and a second SIP client coupled to the SIP server.

17. The enterprise mobile network of claim 16, further comprising a mobile switching subsystem (MSS) communicatively coupled to a public land mobile network;
wherein the BSS is communicatively coupled to the MSS using an Internet Protocol (IP) network;
wherein the MSS is configured to implement at least some networking switching subsystem (NSS) functions for local subscribers of the enterprise mobile network.

18. The enterprise mobile network of claim 16, wherein the BSS is configured to use the SIP user agent to establish a communication session between a device using a public land mobile network to communicate with the BSS and a SIP client coupled to the SIP server.

19. The enterprise mobile network of claim 16, wherein the SIP server comprises an IP private branch exchange (PBX) and wherein the SIP user agent is configured to appear, from the perspective of the IP PBX, to be a SIP phone.

20. The enterprise mobile network of claim 16, wherein the BSS is configured to use the SIP user agent to establish a communication session between a device coupled to a public switched telephone network and a mobile device that wirelessly communicates with the BSS using the licensed radio frequency spectrum, wherein the device coupled to the public switched telephone network initiates the session by calling an extension number handled by the IP PBX.

21. The enterprise mobile network of claim 16, wherein the SIP server is communicatively coupled to a public switched telephone network (PSTN), and wherein the BSS is configured to use the SIP user agent to set up calls with devices coupled to the PSTN using the IP PBX.

22. The enterprise mobile network of claim 16, wherein the SIP server is communicatively coupled to the BSS over an IP network.

23. The enterprise mobile network of claim 16, wherein the BSS comprises a pico BSS.

24. The enterprise mobile network of claim 23, wherein the pico BSS comprises a pico base station having multiple transceiver units.

25. The enterprise mobile network of claim 16, further comprising a distributed antenna system (DAS) communicatively coupled to the BSS.

26. The enterprise mobile network of claim 25, wherein the distributed antenna system comprises a hub unit located on the premises of the enterprise and a plurality of remote antenna units located on the premises of the enterprise, wherein the remote antenna units are located remotely from the hub unit and each of the plurality of antennas are coupled to at least one of a plurality of remote antenna units.

27. The enterprise mobile network of claim 26, wherein the hub unit is communicatively coupled to the remote antenna units, at least in part, using at least one of unshielded twisted pair cabling, cable television cabling, optical fiber, and coaxial cabling.

28. The enterprise mobile network of claim 26, wherein the hub and at least one of the plurality of remote antenna units are communicatively coupled to one another via an expansion hub.

29. The enterprise mobile network of claim 28, wherein the expansion hub is communicatively coupled to the remote antenna units, at least in part, using at least one of unshielded twisted pair cabling, cable television cabling, optical fiber, and coaxial cabling.

* * * * *